(12) United States Patent
Uchida et al.

(10) Patent No.: US 12,538,044 B2
(45) Date of Patent: Jan. 27, 2026

(54) IMAGING DEVICE AND ELECTRONIC APPARATUS WITH MULTIPLE CHARGE STORAGE REGIONS

(71) Applicant: SONY SEMICONDUCTOR SOLUTIONS CORPORATION, Kanagawa (JP)

(72) Inventors: Tetsuya Uchida, Kanagawa (JP); Shinji Miyazawa, Kanagawa (JP); Takeshi Ishizaki, Tokyo (JP); Hirosato Shintaku, Yamagata (JP); Hiroshi Horikoshi, Kanagawa (JP)

(73) Assignee: Sony Semiconductor Solutions Corporation, Kanagawa (JP)

( * ) Notice: Subject to any disclaimer, the term of this patent is extended or adjusted under 35 U.S.C. 154(b) by 13 days.

(21) Appl. No.: 18/568,373

(22) PCT Filed: Jun. 10, 2022

(86) PCT No.: PCT/JP2022/023465
§ 371 (c)(1),
(2) Date: Dec. 8, 2023

(87) PCT Pub. No.: WO2022/264939
PCT Pub. Date: Dec. 22, 2022

(65) Prior Publication Data
US 2024/0276114 A1    Aug. 15, 2024

(30) Foreign Application Priority Data

Jun. 15, 2021 (JP) .................. 2021-099195

(51) Int. Cl.
*H04N 25/59* (2023.01)
*H04N 25/771* (2023.01)
*H10F 39/00* (2025.01)

(52) U.S. Cl.
CPC ........... *H04N 25/59* (2023.01); *H04N 25/771* (2023.01); *H10F 39/8037* (2025.01); *H10F 39/8057* (2025.01); *H10F 39/811* (2025.01)

(58) Field of Classification Search
CPC .. H04N 25/59; H04N 25/771; H10F 39/8037; H10F 39/8057; H10F 39/811;
(Continued)

(56) References Cited

U.S. PATENT DOCUMENTS 8,917,341 B2 * 12/2014 Sakano ............... H04N 25/771
348/308
2009/0045319 A1    2/2009 Sugawa et al.
(Continued)

FOREIGN PATENT DOCUMENTS

JP    2006-245522    9/2006
JP    2017-169216    9/2017
(Continued)

OTHER PUBLICATIONS

International Search Report and Written Opinion prepared by the Japan Patent Office on Aug. 15, 2022, for International Application No. PCT/JP2022/023465, 3 pgs.

*Primary Examiner* — Kelly L Jerabek
(74) *Attorney, Agent, or Firm* — Sheridan Ross PC

(57) ABSTRACT

The present technology relates to an imaging device and an electronic apparatus each capable of expanding a dynamic range without lowering a saturation charge quantity of a photodiode. There are provided a photoelectric conversion unit that converts light into charge, multiple storage portions that temporarily store charge, multiple transfer units that transfer charge to the storage portions, and a penetration trench that separates pixels. At least one of the multiple storage portions is a capacitive element. At least one of the multiple storage portions stores charge overflowing from the photoelectric conversion unit. For example, the present (Continued)

technology is applicable to an imaging device for capturing images.

20 Claims, 56 Drawing Sheets

(58) Field of Classification Search
CPC .... H10F 39/014; H10F 39/182; H10F 39/199; H10F 39/1865; H10F 39/1807; H10F 39/809; H10F 39/813; H10F 39/802; H10F 39/803
See application file for complete search history.

(56) References Cited

U.S. PATENT DOCUMENTS

| | | |
|---|---|---|
| 2017/0345854 A1 | 11/2017 | Kwon |
| 2018/0124335 A1 | 5/2018 | Machida et al. |
| 2018/0350854 A1 | 12/2018 | Miura et al. |
| 2019/0075261 A1 | 3/2019 | Machida et al. |
| 2019/0122918 A1 | 4/2019 | Mizuta |
| 2020/0186732 A1 | 6/2020 | Takizawa et al. |
| 2020/0266221 A1 | 8/2020 | Uchida et al. |
| 2020/0279878 A1 | 9/2020 | Ebiko |
| 2020/0350346 A1* | 11/2020 | Ohura .................... H04N 25/70 |

FOREIGN PATENT DOCUMENTS

| | | |
|---|---|---|
| JP | 2021040048 A | 3/2021 |
| KR | 20180128823 A | 12/2018 |
| KR | 20200010040 A | 1/2020 |
| WO | WO 2017/061295 | 4/2017 |
| WO | WO 2017/169216 | 10/2017 |
| WO | WO 2018/221261 | 12/2018 |
| WO | WO 2019/093479 | 5/2019 |

* cited by examiner

IMAGING DEVICE AND ELECTRONIC APPARATUS WITH MULTIPLE CHARGE STORAGE REGIONS

CROSS REFERENCE TO RELATED APPLICATIONS

This application is a national stage application under 35 U.S.C. 371 and claims the benefit of PCT Application No. PCT/JP2022/023465, having an international filing date of 10 Jun. 2022, which designated the United States, which PCT application claimed the benefit of Japanese Patent Application No. 2021-099195, filed 15 Jun. 2021, the entire disclosures of each of which are incorporated herein by reference.

TECHNICAL FIELD

The present technology relates to an imaging device and an electronic apparatus, such as an imaging device and an electronic apparatus each capable of expanding a dynamic range and forming higher-quality images.

BACKGROUND ART

Generally, an imaging device such as a CMOS (Complementary Metal Oxide Semiconductor) image sensor and a CCD (Charge Coupled Device) is incorporated in a wide variety of devices such as a digital still camera and a digital video camera. There is a demand for improvement of characteristics of an imaging device, such as a demand for expansion of a dynamic range. PTL 1 proposes a configuration which includes multiple storage capacitive elements each storing charge overflowing from a photodiode to expand a dynamic range.

CITATION LIST

Patent Literature

PTL 1: JP 2006-245522A

SUMMARY

Technical Problem

For storing charge overflowing from a photodiode in a storage capacitive element, it is necessary to lower an overflow barrier set for a transfer transistor which transfers charge received from the photodiode. In this case, a Qs (saturation charge quantity) of the photodiode may be lowered. It is demanded that expansion of a dynamic range is achievable without lowering the saturation charge quantity of the photodiode.

The present technology developed in consideration of the above-mentioned circumstances achieves expansion of a dynamic range.

Solution to Problem

An imaging device according one aspect of the present technology includes a photoelectric conversion unit that converts light into charge, multiple storage portions that temporarily store charge, multiple transfer units that transfer charge to the storage portions, and a penetration trench that separates pixels. At least one of the multiple storage portions is a capacitive element. At least one of the multiple storage portions stores charge overflowing from the photoelectric conversion unit.

An electronic apparatus according one aspect of the present technology includes an imaging device including a photoelectric conversion unit that converts light into charge, multiple storage portions that temporarily store charge, multiple transfer units that transfer charge to the storage portions, and a penetration trench that separates pixels, at least one of the multiple storage portions being a capacitive element, and at least one of the multiple storage portions storing charge overflowing from the photoelectric conversion unit, and a processing unit that processes a signal received from the imaging device.

An imaging device according one aspect of the present technology includes a photoelectric conversion unit that converts light into charge, multiple storage portions that temporarily store charge, multiple transfer units that transfer charge to the storage portions, and a penetration trench that separates pixels. At least one of the multiple storage portions is a capacitive element. At least one of the multiple storage portions stores charge overflowing from the photoelectric conversion unit.

An electronic apparatus according one aspect of the present technology includes the above-mentioned imaging device.

Note that the electronic apparatus may be either an independent device, or an internal block constituting one device.

DESCRIPTION OF EMBODIMENTS

Modes for carrying out the present technology (hereinafter referred to as embodiments) will be hereinafter described.

<Configuration Example of Imaging Apparatus>

Figure 1:
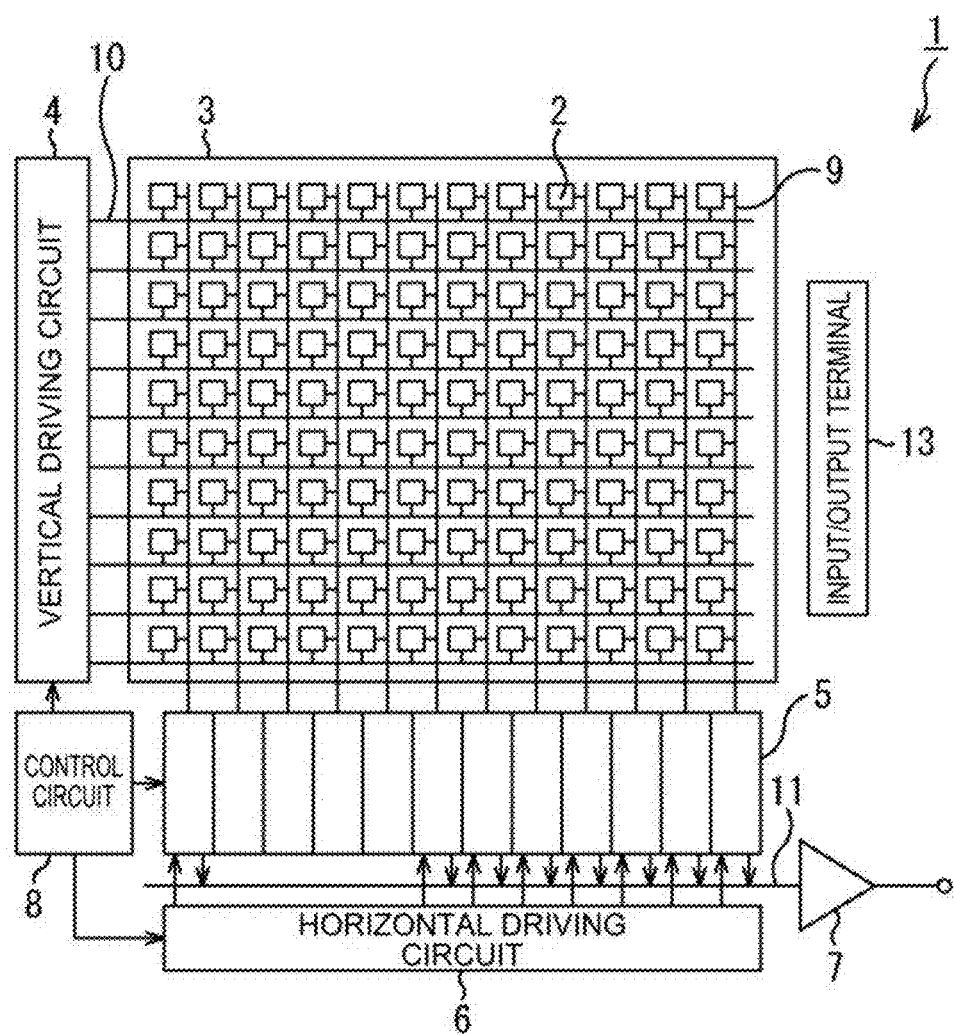
FIG. 1 is a diagram depicting a configuration example of an imaging apparatus according to one embodiment to which the present technology is applied.

FIG. 1 depicts a configuration example of an imaging apparatus according to one embodiment to which the present technology is applied.

An imaging apparatus 1 depicted in FIG. 1 includes a pixel array unit 3 where pixels 2 are arranged in a two-dimensional array, and peripheral circuit units surrounding the pixel array unit 3. The peripheral circuit units include a vertical driving circuit 4, column signal processing circuits 5, a horizontal driving circuit 6, an output circuit 7, a control circuit 8, and others.

Each of the pixels 2 includes a photodiode corresponding to a photoelectric conversion element, and multiple pixel transistors. For example, the multiple pixel transistors include a transfer transistor, a selection transistor, a reset transistor, and an amplification transistor each constituted by an MOS transistor.

The control circuit 8 receives an input clock and data for issuing an operation mode command or other commands, and outputs data such as internal information associated with the imaging apparatus 1. Specifically, the control circuit 8 generates a clock signal and a control signal corresponding to operation references for the vertical driving circuit 4, the column signal processing circuits 5, the horizontal driving circuit 6, and others on the basis of a vertical synchronized signal, a horizontal synchronized signal, and a master clock. The control circuit 8 outputs the clock signal and the control signal thus generated to the vertical driving circuit 4, the column signal processing circuits 5, the horizontal driving circuit 6, and others.

For example, the vertical driving circuit 4 includes a shift register, and is configured to select a designated pixel drive line 10, and supply a pulse for driving the pixels 2 to the selected pixel drive line 10 to drive the pixels 2 for each row. Specifically, the vertical driving circuit 4 sequentially performs selective scanning for the respective pixels 2 of the pixel array unit 3 in a vertical direction for each row, and causes each of the pixels 2 to supply a pixel signal, which corresponds to signal charge generated according to a light amount received by a photoelectric conversion unit of the corresponding pixel 2, to the column signal processing circuit 5 via a vertical signal line 9.

The column signal processing circuits 5 are disposed one for each column of the pixels 2, and performs signal processing, such as noise removal, for signals output from one row of the pixels 2 for each pixel column. For example, each of the column signal processing circuits 5 performs signal processing such as CDS (Correlated Double Sampling) or DDS (double data sampling) for removing fixed pattern noise unique to pixels, and AD conversion.

For example, the horizontal driving circuit 6 includes a shift register, and sequentially outputs a horizontal scanning pulse to sequentially select the respective column signal processing circuits 5, and causes each of the column signal processing circuits 5 to output a pixel signal to a horizontal signal line 11.

The output circuit 7 performs signal processing for signals sequentially supplied from the respective column signal processing circuits 5 via the horizontal signal 11, and outputs the processed signals. For example, the output circuit 7 performs only buffering in some cases, or performs black level adjustment, column variation correction, various types of digital signal processing, or the like in other cases. An input/output terminal 13 exchanges signals with the outside.

The imaging apparatus 1 configured as described above is a CMOS image sensor called a column AD system where the column signal processing circuits 5 performing CDS processing or DDS processing, and AD conversion processing are arranged one for each pixel column.

<Circuit Configuration Example of Pixel>

A configuration of a unit pixel provided in the pixel array unit 3 will be described. For example, the unit pixel provided in the pixel array unit 3 has a configuration depicted in FIG. 2. Note that parts in FIG. 2 identical to corresponding parts in FIG. 1 are given identical reference numbers, and will not be repeatedly described where appropriate.

The pixel 2 corresponding to the unit pixel has a photoelectric conversion unit 51, a first transfer transistor 52, a first FD (floating diffusion) portion 53, a second transfer transistor 54, a second FD portion 55, a third transfer transistor 56, a third FD portion 57, an MIM (Metal-Insulator-Metal) capacitive element 58, a reset transistor 59, an amplification transistor 60, and a selection transistor 61.

For example, multiple drive lines are wired as the pixel drive lines 10 one for each pixel row of the pixels 2. In addition, a drive signal TG, a drive signal FDG, a drive signal FCG, a drive signal RST, and a drive signal SEL are supplied to the first transfer transistor 52, the second transfer transistor 54, the third transfer transistor 56, the reset transistor 59, and the selection transistor, respectively, from the vertical driving circuit 4 via the multiple drive lines.

Each of these drive signals is a pulse signal defined such that a high-level (e.g., power source voltage VDD) state corresponds to an active state, and that a low-level (e.g., negative potential) state corresponds to a non-active state. Specifically, when any of the drive signals TG to SEL set to a high-level signal is supplied, the transistor receiving this signal is brought into an electrically conductive state, i.e., an on-state. When any of the drive signals set to a low-level signal is supplied, the transistor receiving this signal is brought into a non-conductive state, i.e., an off-state.

For example, the photoelectric conversion unit 51 includes a PN junction photodiode. The photoelectric conversion unit 51 receives incident light, photoelectrically converts the received light, and stores charge thus obtained.

The first transfer transistor 52 is provided between the photoelectric conversion unit 51 and the first FD portion 53. The drive signal TG is supplied to a gate electrode of the first transfer transistor 52. When the high-level drive signal TG is supplied, the first transfer transistor 52 is turned on. As a result, charge stored in the photoelectric conversion unit 51 is transferred to the first FD portion 53 via the first transfer transistor 52.

Each of the first FD portion 53, the second FD portion 55, and the third FD portion 57 is a floating diffusion region called floating diffusion, and functions as a storage portion for temporarily storing transferred charge, and charge overflowing from the photoelectric conversion unit 51. The third FD portion 57 is connected to the MIM capacitive element 58 to allow the MIM capacitive element 58 to function as the third FD portion 57.

The second transfer transistor 54 is provided between the first FD portion 53 and the second FD portion 55. The drive signal FDG is supplied to a gate electrode of the second transfer transistor 54. When a high-level drive signal FDG is supplied, the second transfer transistor 54 is turned on. As a result, charge received from the first FD portion 53 is transferred to the second FD portion 55 via the second transfer transistor 54.

After the second transfer transistor 54 is turned on, charge is allowed to be stored in a sum region of the first FD portion 53 and the second FD portion 53. Accordingly, conversion efficiency at the time of conversion from charge generated at the photoelectric conversion unit into voltage is allowed to be switched. The second transfer transistor 54 functions as a conversion efficiency switching transistor for switching conversion efficiency.

The third transfer transistor 56 is provided between the second FD portion 55 and the third FD portion 57. The drive signal FCG is supplied to a gate electrode of the third transfer transistor 56. When the high-level drive signal FCG is supplied, the third transfer transistor 56 is turned on. As a result, charge received from the second FD portion 55 is transferred to the third FD portion 57 via the third transfer transistor 56.

After the third transfer transistor 56 is turned on, charge is allowed to be stored in a sum region of the first FD portion 53, the second FD portion 55, and the third FD portion 57. Accordingly, conversion efficiency at the time of conversion from charge generated at the photoelectric conversion unit into voltage is allowed to be switched. The third transfer transistor 56 functions as a conversion efficiency switching transistor for switching conversion efficiency.

The third FD portion 57 is connected to the MIM capacitive element 58. The MIM capacitive element 58 capable of achieving high capacitance is connected to the third FD portion 57 without sacrificing an area of an Si (silicon) substrate surface where the pixel transistors are disposed.

Accordingly, the third FD portion 57 has larger capacitance than the first FD portion 53 and the second FD portion 55.

The reset transistor 59 is connected between the power source VDD and the third FD portion 57. The drive signal RST is supplied to a gate electrode of the reset transistor 59. When the high-level drive signal RST is supplied, the reset transistor 59 is turned on. As a result, potential at the third FD portion 57 is reset to a level of the power source voltage VDD.

A gate electrode of the amplification transistor 60 is connected to the first FD portion 53, and a drain of the amplification transistor 60 is connected to the power source VDD. The amplification transistor 60 thus functions as an input unit of a readout circuit which reads a signal corresponding to charge retained in the first FD portion 53, i.e., a generally-called source follower circuit. Specifically, by connection between a source of the amplification transistor 60 and the vertical signal line 9 via the selection transistor 61, the amplification transistor 60 is allowed to constitute a source follower circuit in cooperation with a constant-current source (not depicted) connected to one end of the corresponding vertical signal line 9.

The selection transistor 61 is connected between the source of the amplification transistor 60 and the vertical signal line 9. The drive signal SEL is supplied to a gate electrode of the selection transistor 61. When the high-level drive signal SEL is supplied, the selection transistor 61 is turned on. As a result, the pixel 2 is brought into a selective state. Accordingly, a pixel signal output from the amplification transistor 60 is output to the vertical signal line 9 via the selection transistor 31.

Note that switching of the respective drive signals into the active state, i.e., the high-level state will be hereinafter also referred to as turning on the respective drive signals, and that switching of the respective drive signals into the non-active state, i.e., a low-level state will be hereinafter also referred to as turning off the respective drive signals.

Figure 2:
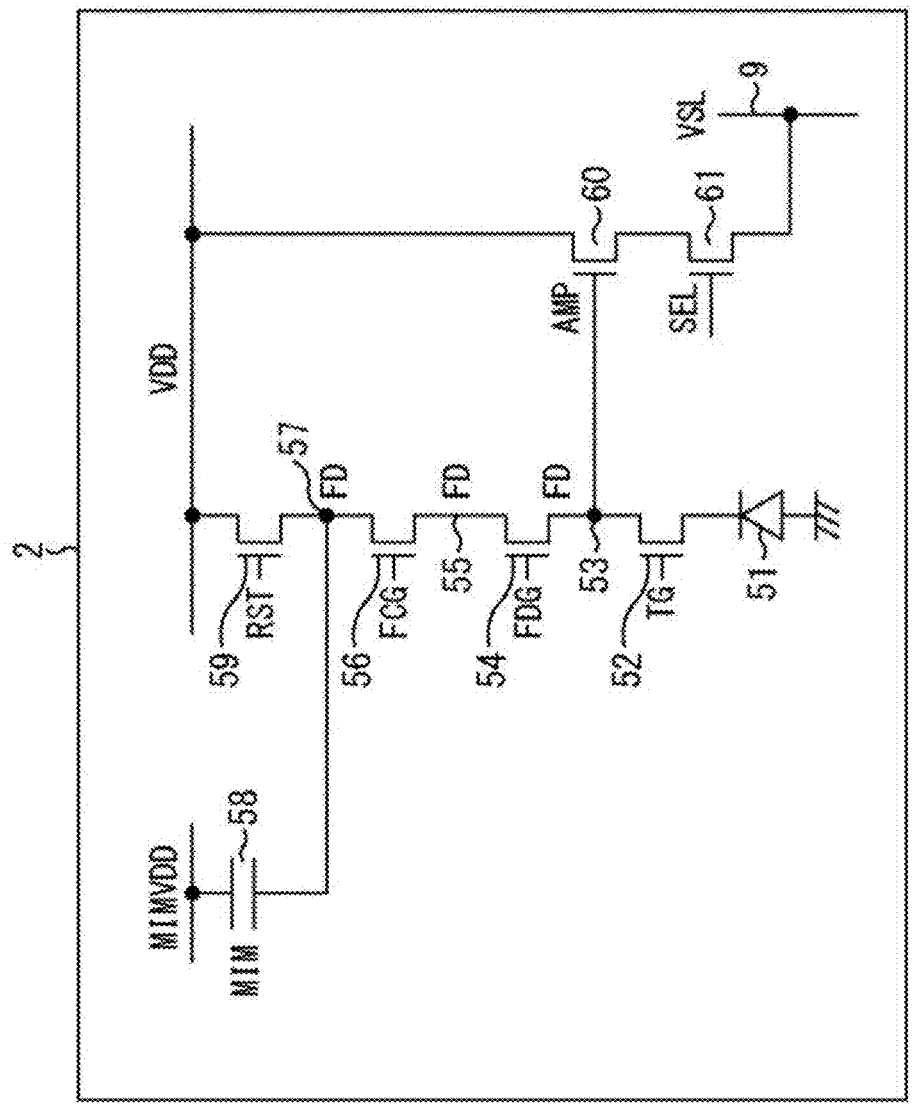
FIG. 2 is a diagram depicting a circuit configuration example of a pixel.

The pixel 2 depicted in FIG. 2 includes the first FD portion 53, the second FD portion 55, and the third FD portion 57 (MIM capacitive element 58), and is configured such that these FD portions are connected in series to provide a configuration capable of switching between three levels of conversion efficiency from charge generated at the photoelectric conversion unit into voltage.

High conversion efficiency (HCG) is achieved by the first FD portion 53. Middle conversion efficiency (MCG) is achieved by a sum of the first FD portion 53 and the second FD portion 55. Low conversion efficiency (LCG) is achieved by a sum of the first FD portion 53, the second FD portion 55, and the third FD portion 57 (=MIM capacitive element).

When the first transfer transistor 52 is turned on, charge stored in the photoelectric conversion unit 51 is received by the first FD portion 53 (high conversion efficiency) or the sum of the first FD portion 53 and the second FD portion 55 (middle conversion efficiency), and output.

In a configuration adopted during high illuminance, charge stored in the photoelectric conversion unit 51 overflows via the first transfer transistor 52 toward the first FD portion 53, and is stored in the first FD portion 53, the second FD portion 55, and the third FD portion 57 (MIM capacitive element 58).

During a small signal corresponding to a small amount of received light, the high conversion efficiency is selected to store charge in the first FD portion 53. During a large signal corresponding to a large amount of received light, the low conversion efficiency is selected to store charge in the sum of the first FD portion 53, the second FD portion 55, and the third FD portion 57 (=MIM capacitive element 58). According to this example, the middle conversion efficiency between the high conversion efficiency and the lower conversion efficiency is further provided as conversion efficiency achieved by storing charge in the sum of the first FD portion 53 and the second FD portion 55.

Charge overflowing from the photoelectric conversion unit 51 and stored in the first FD portion 53, the second FD portion 55, and the third FD portion 57 is received by the sum of the first FD portion 53, the second FD portion 55, and the third FD portion 57 (=MIM capacitive element 58), and output together with charge accumulated in the photoelectric conversion unit 51.

AD conversion of readout of the high conversion efficiency, the middle conversion efficiency, and the low conversion efficiency is separately achieved for each. Which readout signal is to be used is determined on the basis of respective readout signal levels. Two readout signals may be blended and used as a blended signal at a connection portion between a high conversion efficiency signal and a middle conversion efficiency signal, and a connection portion between a middle conversion efficiency signal and a low conversion efficiency signal. Image quality deterioration at these connection portions can be reduced by using the blended signal.

The FD portions provided at three points as described above achieve 160 uV/e for the high conversion efficiency, 80 uV/e for the middle conversion efficiency, and 10 uV/e for the low conversion efficiency, for example, and therefore can provide a configuration capable of handling three levels of conversion efficiency. Accordingly, reduction of S/N differences produced at the connection portions is achievable.

<Planar Configuration Example of Pixel>

Figure 3:
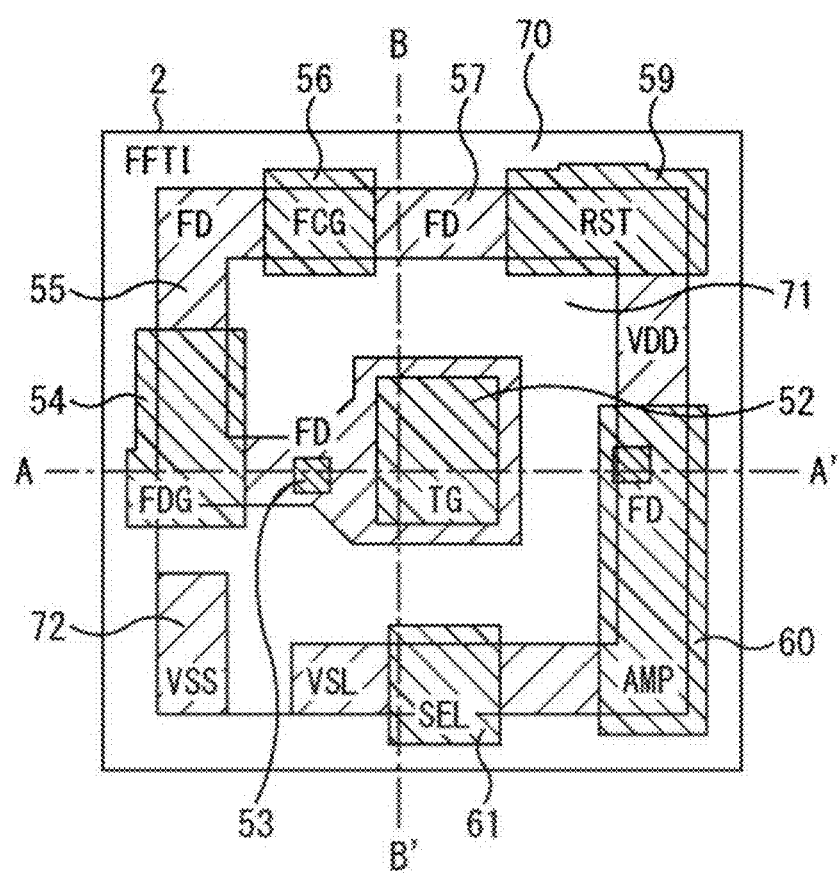
FIG. 3 is a diagram depicting a planar configuration example of the pixel.
Figure 4:
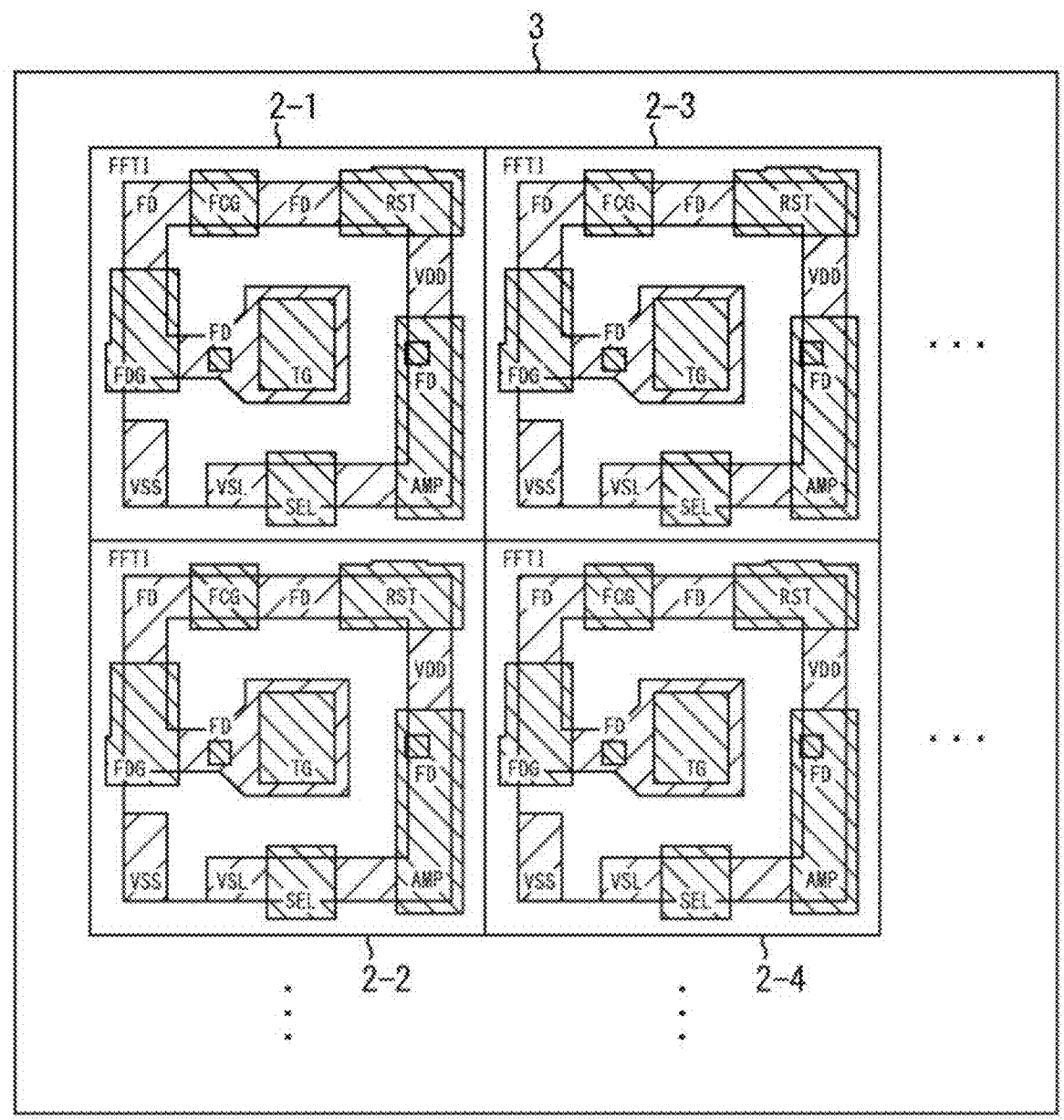
FIG. 4 is a diagram depicting a planar configuration example of a pixel array unit.
Figure 5:
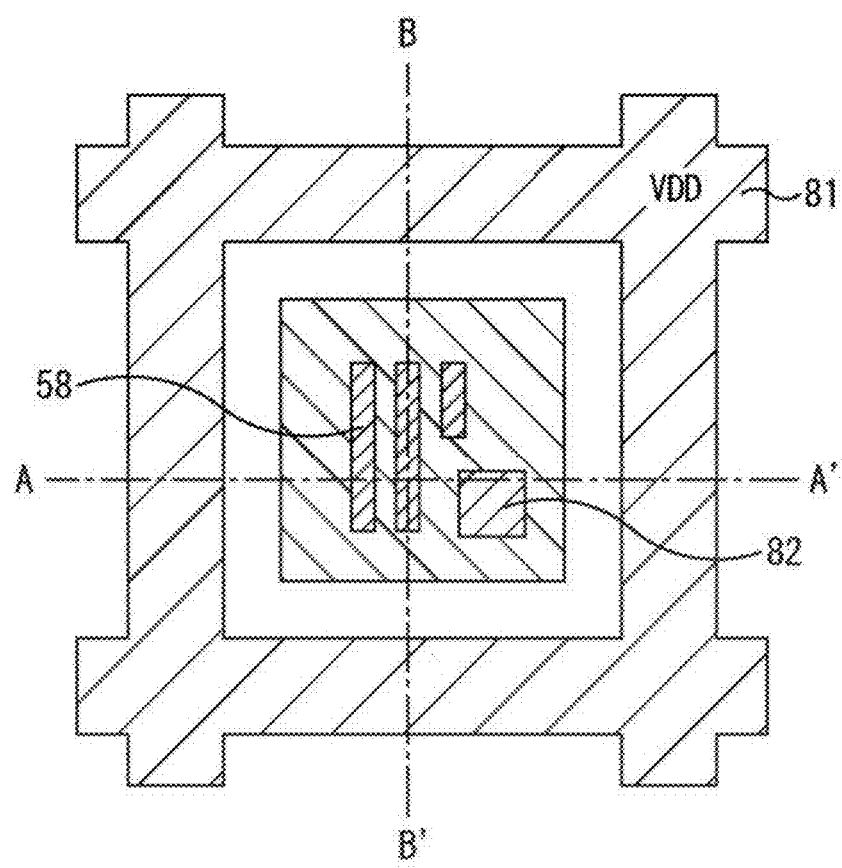
FIG. 5 is a diagram depicting a planar configuration example of the pixel.
Figure 6:
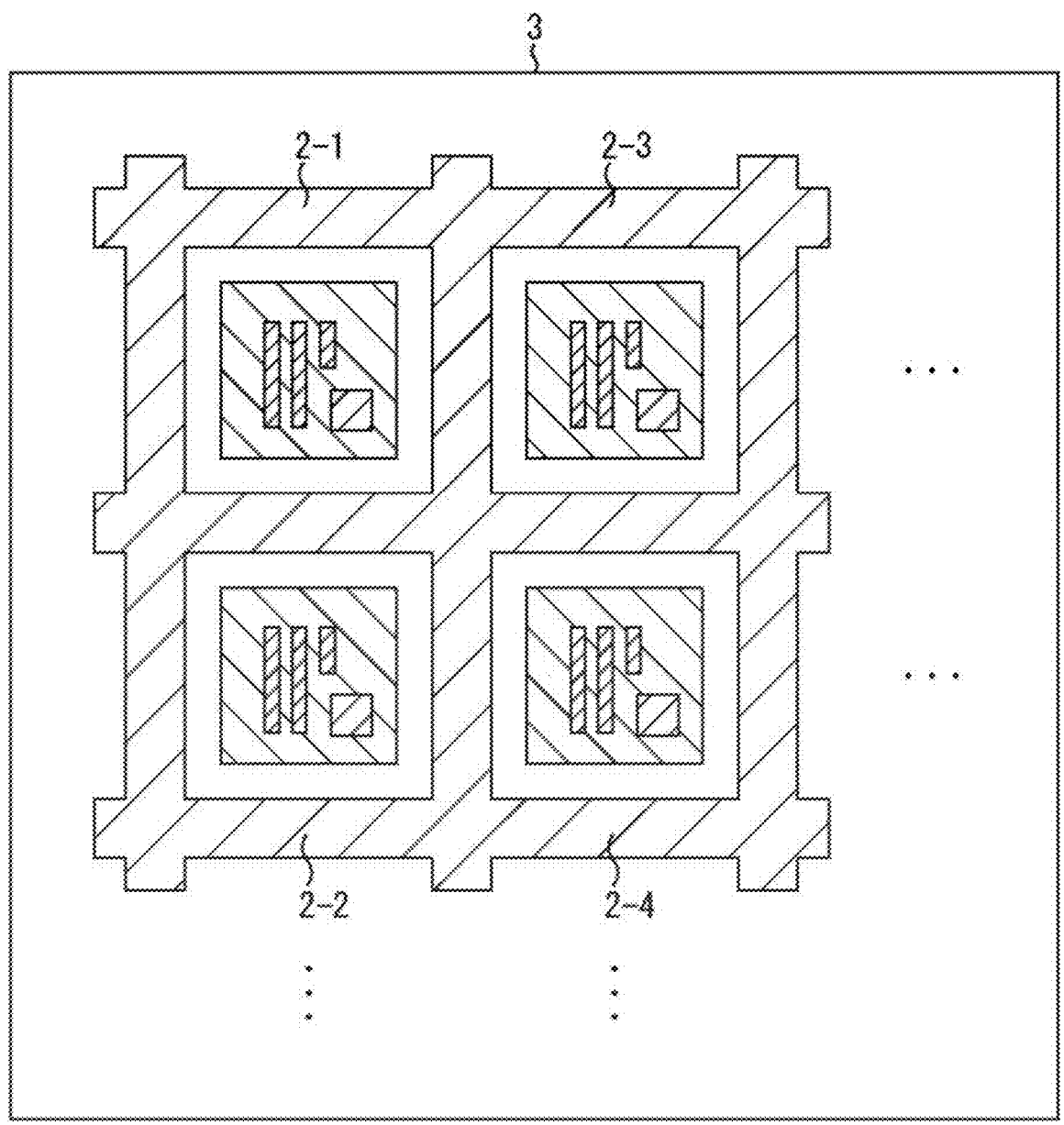
FIG. 6 is a diagram depicting a planar configuration example of the pixel array unit.

FIGS. 3 to 6 each depict a planar configuration example of the pixel 2. Each of FIGS. 3 and 4 is a plan diagram of a silicon substrate surface where the transistors are disposed, while each of FIGS. 5 and 6 is a plan diagram of a part where the MIM capacitive element 58 is disposed.

FIG. 3 depicts a planar configuration example of the transistors of the one pixel 2. A gate electrode TG of the first transfer transistor 52 is formed near a center of the pixel 2, while a gate electrode FDG of the second transfer transistor 54 is formed on the left side of the gate electrode TG in the figure. The first FD portion 53 including an N+ diffusion layer is formed within the silicon substrate between the gate electrode TG and the gate electrode FDG.

A gate electrode FCG of the third transfer transistor 56 is formed on an upper side of the second transfer transistor 54 in the figure. The second FD portion 55 is provided between the second transfer transistor 54 and the third transfer transistor 56. A gate electrode RST of the reset transistor 59 is formed on the right side of the third transfer transistor 56 in the figure. The third FD portion 57 is provided between the third transfer transistor 56 and the reset transistor 59. A via (wire) connected to the MIM capacitive element 58 is formed in the third FD portion 57.

A gate electrode AMP of the amplification transistor 60 is formed on a lower side of the reset transfer transistor 59 in the figure. A gate electrode SEL of the selection transistor 61 is formed on the left side of the amplification transistor 60 in the figure. A VSS region 72 including a P+ diffusion layer is formed in a lower left part in the figure.

As depicted in FIG. 4, the pixels 2 each depicted in FIG. 3 are arranged in an array form in the pixel array unit 3. While FIG. 4 depicts 2×2 pixels, i.e., four pixels, the pixels 2 are arranged in a form of m×n matrix.

Figure 7:
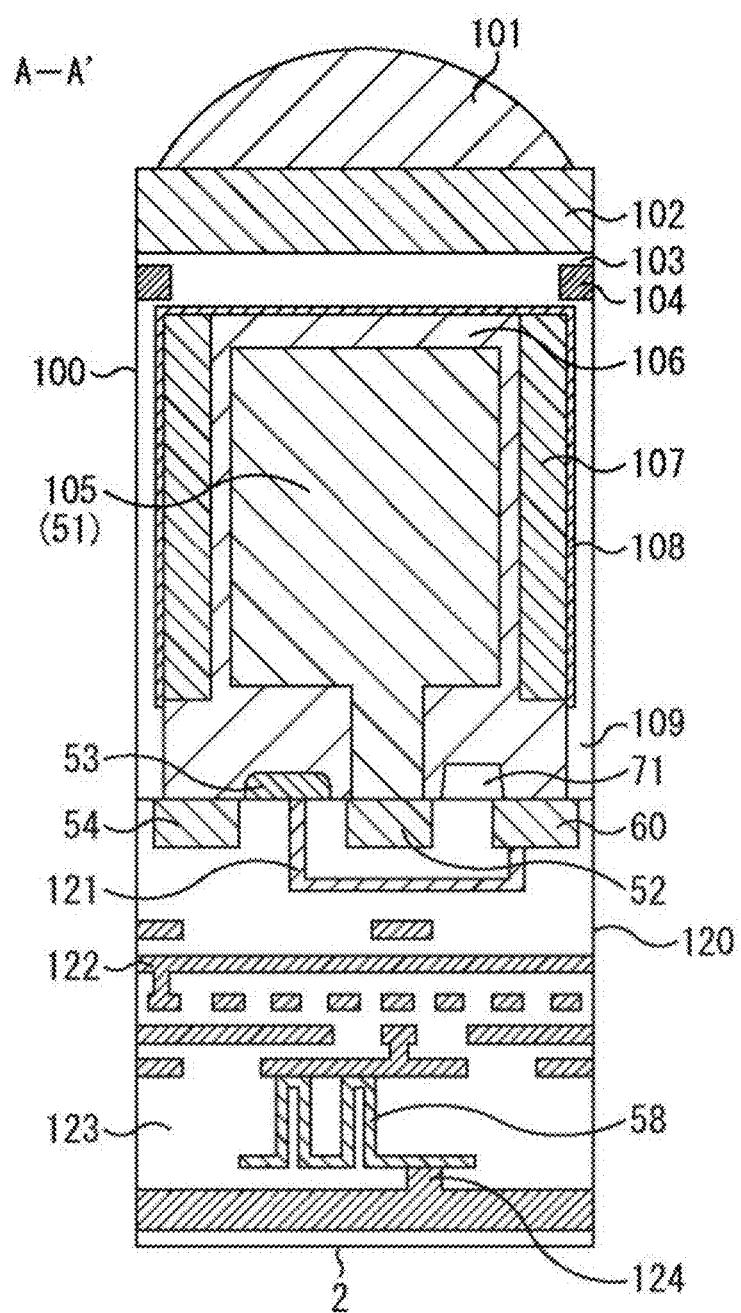
FIG. 7 is a diagram depicting a cross-sectional configuration example of the pixel.

An FFTI (Front Full Trench Isolation) 70 is formed between the respective pixels 2. As will be explained with reference to FIG. 7, the FFTI 70 is a trench penetrating a semiconductor substrate 100 (FIG. 7). The FFTI 70 forms such a configuration which separates the pixels 2 by insulators to achieve electric isolation between the respective pixels 2. An STI (Shallow Trench Isolation) 71 is provided between the respective transistors. The STI 71 has a structure which includes a shallow trench formed in an element separation region, and an insulation film embedded in this trench.

Each of the pixels 2 has the FFTI 70 in a pixel boundary region. Element separation in the active region is achieved by the STI 71. Each of the pixel transistors other than the first transfer transistor 52 (second transfer transistor 54, third transfer transistor 56, reset transfer transistor 59, amplification transistor 60, and selection transistor 61) is provided with not only the STI 71 but also the FFTI 70 for element separation.

As depicted in FIG. 3, the gate electrode of each of the pixel transistors other than the first transfer transistor 52 is configured to overlap with the FFTI 70. In other words, in the state of this configuration, a part of the region of the gate electrode of each of the gate electrodes of the pixel transistors includes a portion overlapping with the FFTI 70 in a planar view. This configuration overlapping with the FFTI 70 reliably produces a region available for the electrode gate.

FIG. 5 is a diagram depicting a planar configuration of a region where the MIM capacitive element 58 is formed. The MIM capacitive element 58 is configured to constantly connect to the third FD portion 57 to increase capacitance of the third FD portion 57. The MIM capacitive element 58 is a trench-type capacitor, and has a U-shaped three-dimensional structure as will be described below with reference to FIGS. 7 and 8. This configuration produces relatively large capacitance by a small mounting area.

According to the example depicted in FIG. 5, the MIM capacitive element 58 includes three trenches, and has capacitive films provided on side walls of the trenches to form a three-dimensional structure. The MIM capacitive element 58 has a grid-shaped configuration within the pixel 2, and is in a state covered with a VDD wire. The VDD wire is configured to shield the MIM capacitive element 58 from the adjoining pixels 2.

As depicted in FIG. 6, the pixels 2 each depicted in FIG. 4 are arranged in an array form in the pixel array unit 3. While FIG. 6 depicts 2×2 pixels, i.e., four pixels, the pixels 2 are arranged in a form of m×n matrix.

Incidentally, while the description of the MIM capacitive element 58 will further continue hereinbelow by way of example, capacitive elements other than the MIM capacitive element may be adopted. Examples of the adoptable capacitive elements include an MOM (Metal Oxide Metal) capacitive element, poly-poly capacitive element (capacitive element including counter electrodes both including polysilicon), and an additional capacitor constituted by a wire and containing parasitic capacitance and the like.

<Cross-Sectional Configuration Example of Pixel>

Figure 8:
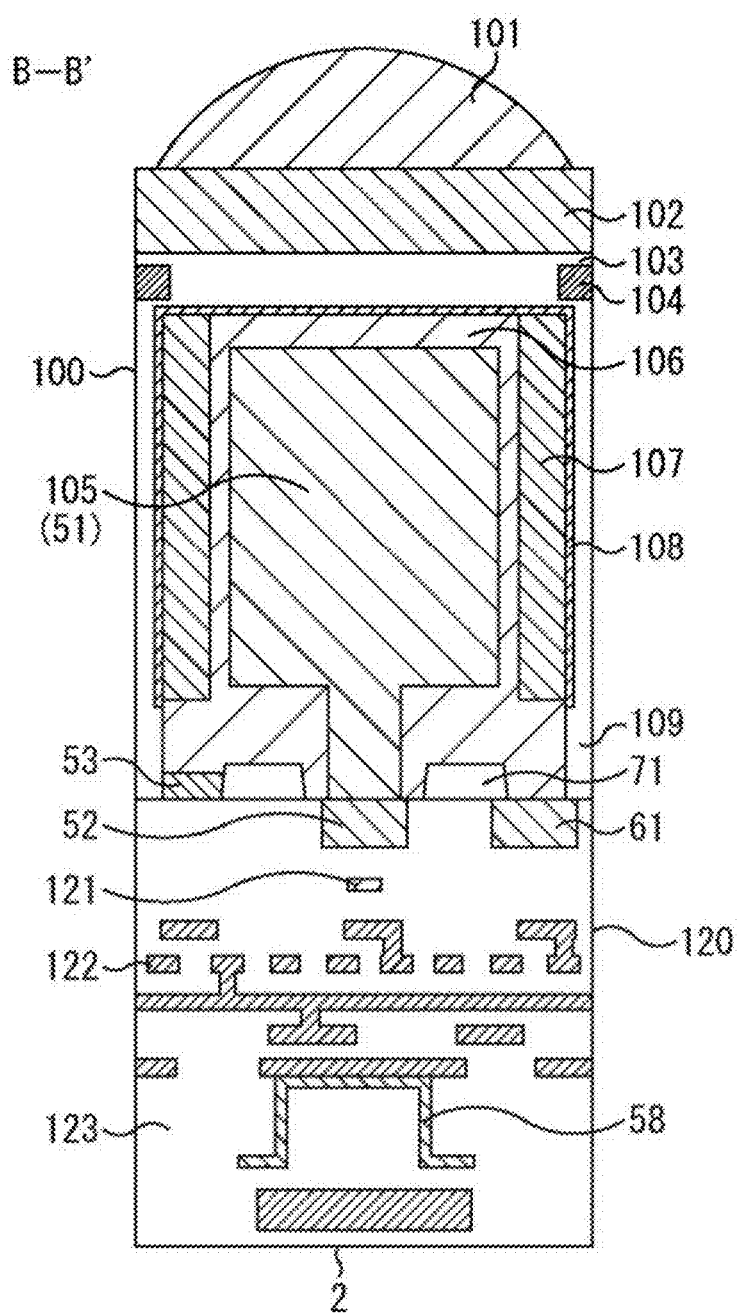
FIG. 8 is a diagram depicting a cross-sectional configuration example of the pixel.

FIG. 7 is a diagram depicting a cross-sectional configuration example taken along a line A-A' in the plan diagram of the pixel 2 depicted in FIG. 3 or FIG. 5, while FIG. 8 is a diagram depicting a cross-sectional configuration example taken along a line B-B'.

An N-type semiconductor region 105 constituting the photoelectric conversion unit 51 of the pixel 2 receives incident light entering from a back surface (an upper surface in the figure) of the semiconductor substrate 100. The N-type semiconductor region 105 has an embedded structure inside the semiconductor substrate 100, and is so structured as to be substantially absent in a substrate surface portion.

A flattening film 103, a CF (color filter) 102, and a micro-lens 101 are provided above the N-type semiconductor region 105 (photoelectric conversion unit 51). The photoelectric conversion unit 51 receives, via a light reception surface, incident light sequentially entering through the respective components, and performs photoelectric conversion for the incident light.

For example, the N-type semiconductor region 105 formed in the photoelectric conversion unit 51 is a charge storage region for storing charge (electrons). The N-type semiconductor region 105 of the photoelectric conversion unit 51 is provided inside a P-type semiconductor region 106 of the semiconductor substrate 100.

A pixel separation portion 109 which electrically separates the multiple pixels 2 is provided inside the semiconductor substrate 100. The photoelectric conversion unit 51 is provided in a region sectioned by the pixel separation portion 109. The pixel separation portion 109 corresponds to the FFTI 70 in FIG. 3. In a view of the pixels 2 from the upper surface side in FIG. 7, the pixel separation portion 109 has a grid shape, for example, so as to lie between the multiple pixels 2. The photoelectric conversion unit 51 is formed within each of the regions sectioned by the pixel separation portion 109.

A wiring layer 120 is provided on a front surface (lower surface) of the semiconductor substrate 100 on the side opposite to the back surface (upper surface) where the respective components, such as the light shielding film 104, the CF 102, and the micro-lens 101, are provided.

The wiring layer 120 includes a wire 122 and an insulation layer 123, and is formed such that the wire 122 is electrically connected to the respective elements within the insulation layer 123. The wiring layer 120 is a generally-called multilayered wiring layer, and is formed by alternately laminating an interlayer dielectric constituting the insulation layer 123, and the wire 122 multiple times. The wire 122 herein is formed by laminating, via the insulation layer 123, respective wires, such as wires for the first transfer transistor 52 and other transistors reading charge from the photoelectric conversion unit 51 of the transistors, and the VSL 9.

Also adoptable is such a configuration which includes a support substrate (not depicted) on a surface of the wiring layer 120 on the side opposite to the side where the photoelectric conversion unit 51 is formed. For example, a substrate including a silicon semiconductor having a thickness of several hundreds μm is provided as the support substrate.

The light shielding film 104 is provided on the back surface (the upper surface in the figure) of the semiconductor substrate 100.

The light shielding film 104 is so configured as to shield a part of incident light traveling from the upper side of the semiconductor substrate 100 toward the lower side of the semiconductor substrate 100.

The light shielding film 104 includes a light shielding material capable of shielding light. For example, the light shielding film 104 is formed by sequentially laminating a titanium (Ti) film and a tungsten (W) film. Alternatively, for example, the light shielding film 104 may be formed by sequentially laminating a titanium nitride (TiN) film and a tungsten (W) film. In addition, the light shielding film 104 may be covered with nitride (N) or the like.

The light shielding film 104 is covered with the flattening film 103. The flattening film 103 includes an insulation material capable of transmitting light.

An SCF (fixed charge film) 108 and a P-type semiconductor region 107 are formed on a side surface of the pixel separation portion 109 (FFTI 70).

The fixed charge film 108 includes a high dielectric having negative fixed charge so as to produce a positive charge (hole) storage region at a portion of an interface with the semiconductor substrate 100 and thus reduce generation of dark current. By the presence of the fixed charge film 108 so formed as to have negative fixed charge, an electric field is added to the interface with the semiconductor substrate 100 by the negative fixed charge. As a result, the positive charge (hole) storage region is produced.

For example, the fixed charge film 108 may be constituted by a hafnium oxide film (HfO2 film). Alternatively, for example, the fixed charge film 108 may contain at least one of oxides such as hafnium, zirconium, aluminum, tantalum, titanium, magnesium, yttrium, and a lanthanoid element.

The P-type semiconductor region 107 is conformally formed on a side wall of the FFTI 70 as a solid-phase diffusion layer formed by solid-phase diffusion. A PN junction is formed between the P-type semiconductor region 107 and the N-type semiconductor region 105 such that photoelectrically converted charge is stored in this PN junction.

Note that described herein will be an example where the PN junction is formed between the N-type semiconductor region 105 accommodated in the semiconductor substrate 100 and the P-type semiconductor region 107 provided around the N-type semiconductor region 105 to constitute a photodiode. However, the N type and the P type may be switched to the opposite types. In a case where the N type and the P type are switched to the opposite types, the N type and the P type are replaced with the P type and the N type, respectively, in the above description and the following description to constitute the pixel 2.

If the P-type semiconductor region 107 and the fixed charge film 108 formed on the side surface of the FFTI 70 are provided up to an N+ diffusion layer where the pixel transistors are formed, junction leak current may increase at a PN junction portion with this N+ diffusion layer. For preventing the junction leak current, adopted is such a configuration where the P-type semiconductor region 107 and the fixed charge film 108 are eliminated from the portion where the pixel transistors are formed, i.e., a region corresponding to a lower part (wiring layer 120 side) of the FFTI 70 in the figure in this case. In other words, adopted is such a configuration where the P-type semiconductor region 107 (solid-phase diffusion layer) and the fixed charge film 108 are formed up to an intermediate position of the FFTI 70.

While described herein will be an example of a configuration where the P-type semiconductor region 107 and the fixed charge film 108 are provided on the side surface of the FFTI 70, a configuration which includes only one of the P-type semiconductor region 107 and the fixed charge film 108, or a configuration which includes neither the P-type semiconductor region 107 nor the fixed charge film 108 may be adopted.

Such a structure which includes SiO2 or the like embedded inside the FFTI may be adopted. This configuration including SiO2 or the like embedded inside the FFTI 70 more reliably achieves separation from the adjoining pixels 2.

The FFTI 70 thus provided achieves electric separation between the pixels 2, and prevents leakage of charge from the photoelectric conversion unit 51 (PD: photo Diode) into the adjoining pixels 2. Accordingly, an overflow barrier on the first transfer transistor 52 side can be tightened, and therefore Qs (saturation charge quantity) of the photoelectric conversion unit 51 can be raised.

As described with reference to FIG. 3, the pixel transistors are separated from each other by the FFTI 70 on the pixel boundary, and by the STI 71 inside the pixel. The gate electrodes of a part of the pixel transistors are overlapped with the FFTI 70. As described above, neither the P-type semiconductor region 107 nor the fixed charge film 108 is formed in the region corresponding to the portion where the pixel transistors are formed. This configuration allows the gate electrodes of a part of the pixel transistors to have a shape overlapping with the FFTI 70. This overlapping shape between the gate electrodes and the FFTI 70 achieves size reduction of the pixels.

According to the cross-sectional configuration example of the pixel 2 depicted in FIG. 7, the gate electrode FDG of the second transfer transistor 54 formed on the lower side in the figure with respect to the FFTI 70 provided in the left part in the figure is positioned and sized such that a part of the gate electrode FDG overlaps with the FFTI 70. The gate electrode AMP of the amplification transistor 60 formed on the lower side in the figure with respect to the FFTI 70 provided in the right part in the figure is positioned and shaped such that a part of the gate electrode AMP overlaps with the FFTI 70. According to the cross-sectional configuration example of the pixel 2 depicted in FIG. 8, the gate electrode FDG of the selection transistor 61 which has a position and a size determined such that a part of the gate electrode FDG overlaps with the FFTI 70 is formed on the lower side of the FFTI 70 provided in the left part in the figure.

According to the cross-sectional configuration example of the pixel 2 depicted in FIGS. 7 and 8, the first transfer transistor 52 is formed substantially at the center, and an extended part of the N-type semiconductor region 105 formed inside the semiconductor substrate 100 is connected to the first transfer transistor 52.

The first FD portion 53 formed inside the semiconductor substrate 100 constitutes an N+ region, and is formed between the first transfer transistor 52 and the second transfer transistor 54 inside the semiconductor substrate 100 in the cross-sectional configuration example of the pixel 2 depicted in FIG. 7. The first FD portion 53 and the amplification transistor 60 are connected to each other via a local wire 121.

The local wire 121 includes polysilicon or an advanced contact (MIS contact). The advanced contact is a contact including a high permittivity insulation film. In a case where the local wire 121 is the advanced contact including a high permittivity insulation film, the local wire 121 is a metallic insulation film inserted between the first FD portion 53 and the gate electrode of the amplification transistor 60 in the example depicted in FIG. 7. For example, the high permittivity insulation film includes a metallic oxide having high permittivity, such as titanium dioxide (TiO2), and constitutes a thin film having a small thickness of approximately 2.0 to 3.0 nm.

In a case where the advanced contact is adopted for the local wire 121, contact resistance can be reduced by lowering an N-type concentration of the first FD portion 53. By lowering the N-type concentration of the first FD portion 53, electric field intensity at the PN junction portion with the semiconductor substrate 100 (P-type semiconductor region 106) decreases. Accordingly, generation of dark current can be reduced. In such a manner, mixture of dark current into a charge signal of the pixel 2 is avoidable. Accordingly, FPN (Fixed Pattern Noise) caused by variations in an FD dark current leak is prevented, and S/N at multiple conversion efficiency connection portions caused by FPN improves. As a result, image quality improves.

Incidentally, while the example where the first FD portion 53 and the amplification transistor 60 are connected by the local wire 121 has been described herein, a configuration which includes the local wire 121 (advanced contact) constituting a contact other than the contact of the first FD portion 53 may be adopted. In other words, the advanced contact may be provided as a contact of the second FD portion 55 or the third FD portion 57.

The wire 122 has six layers in the wiring layer 120 of the pixel 2 depicted in FIGS. 7 and 8. Assuming that a first layer, a second layer, a third layer, a fourth layer, a fifth layer, and a sixth layer are provided in this order from the upper side (semiconductor substrate 100 side) in the figure, the MIM capacitive element 58 is three-dimensionally formed between the fifth layer of the wire 122 and the sixth layer of the wire 122. As described with reference to FIG. 5, the MIM capacitive element 58 is a capacitor which has a three-dimensional shape including the trenches and the capacitive film formed on the side walls of the trenches.

One of electrodes of the MIM capacitive element 58 is connected to the fifth layer of the wire 122, while the other electrode is connected to the sixth layer of the wire 122 by a via 124. The wire 122 connected via the via 124, i.e., the sixth layer of the wire 122 in this case, is a wire for supplying potential MIMVDD to the MIM capacitive element 58. The fifth layer of the wire 122 is electrically connected to a diffusion layer of the third FD portion 57 to connect the MIM capacitive element 58 with the third FD portion 57.

The wire included in the fifth layer of the wire 122 and depicted in the left part and the right part of the fifth layer in the figure as a wire other than the wire connected to the MIM capacitive element 58 is a wire for supplying potential VDD, and so disposed as to surround the MIM capacitive element 58 as described with reference to FIG. 5.

<Operation of Pixel>

Figure 9:
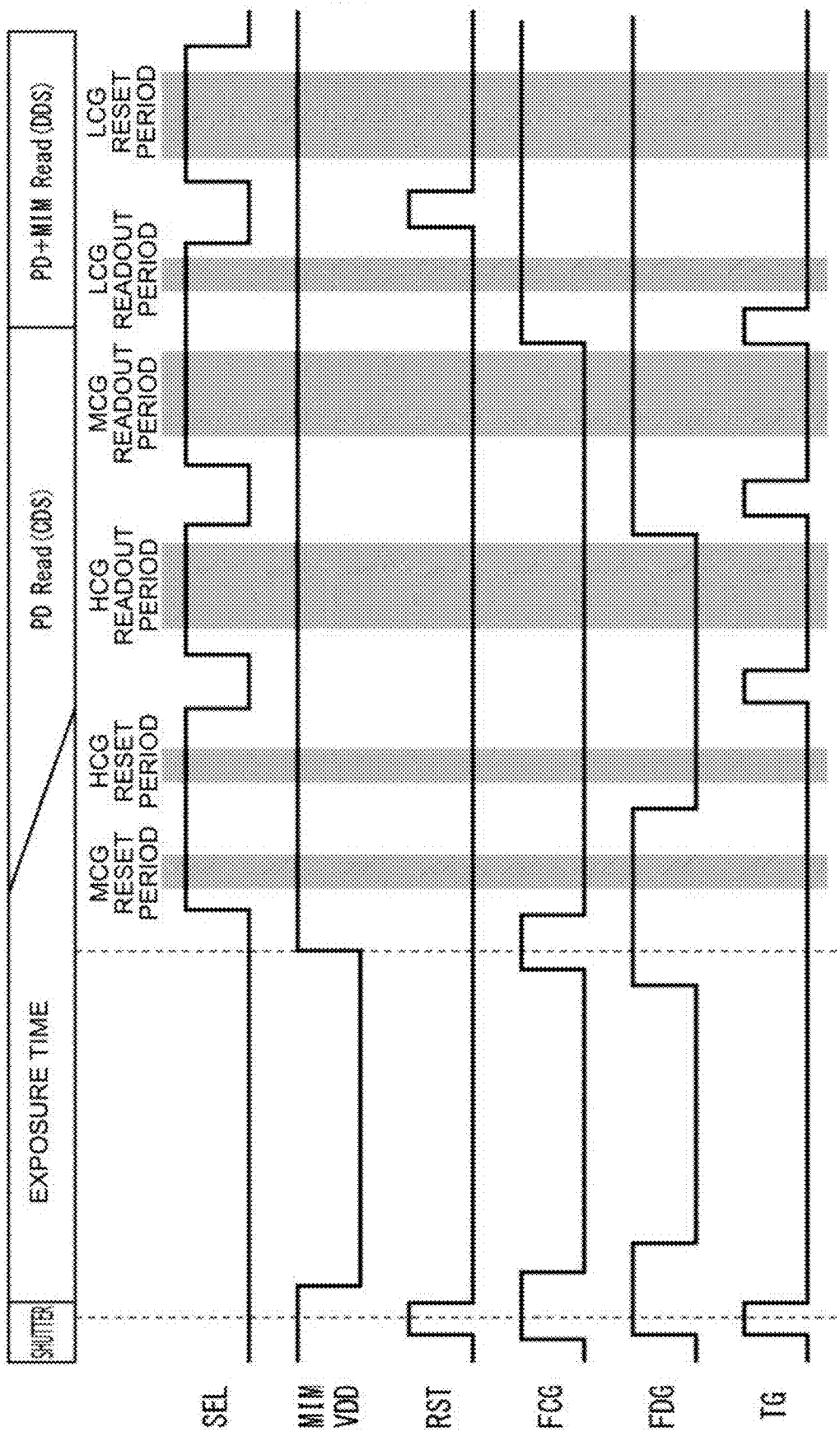
FIG. 9 is a diagram for explaining an operation of the pixel.

An operation performed by the pixel 2 will be further explained with reference to a timing chart illustrated in FIG. 9.

When a shutter is operated, the voltage MIMVDD supplied to the MIM capacitive element 58, the drive signal RST supplied to the reset transistor 59, the drive signal FCG supplied to the third transfer transistor 56, the drive signal FDG supplied to the second transfer transistor 54, and the drive signal TG supplied to the first transfer transistor 52 are turned on. Each of the drive signals is turned on for only a predetermined period and is subsequently turned off.

During an elapse of an exposure time, an MCG (middle conversion efficiency) reset period is provided. Thereafter, an HCG (high conversion efficiency) reset period is provided. From a start point of the HCG (high conversion efficiency) reset period, the supply voltage VDD to the MIM capacitive element 58 is brought into the on-state.

Before a start of the MCG reset period, the drive signal FCG and the drive signal FDG are turned on for only a predetermined period. The MCG (middle conversion efficiency) is achieved using the first FD portion 53 and the second FD portion 55. Accordingly, the first FD portion 53 and the second FD portion 55 are reset in the MCG reset period. Thereafter, the drive signal FCG is turned off with the drive signal FDG kept on, and the drive signal SEL is turned on. In such a manner, the MCG reset is achieved. After the MCG reset, the drive signal FDG is turned off to achieve the HCG reset.

With a start of readout from the photodiode (PD), the drive signal TG supplied to the first transfer transistor 52 is turned on for only a predetermined period. Readout from the photodiode is achieved by CDS (correlated double sampling) driving. CDS driving is driving achieved by resetting the FD to predetermined potential, and reading from the FD while designating this predetermined potential as reset potential, and then transferring signal charge stored in the PD to the FD, and reading the signal charge in the FD as a signal level.

As will be described below, readout from the photodiode by CDS driving is carried out, and subsequently readout from the photodiode and the MIM capacitive element 58 is executed by DDS (double data sampling) driving. DDS driving is driving achieved by reading signal charge retained or stored in the FD as a signal level, and subsequently resetting the FD to predetermined potential and reading from the FD while designating this predetermined potential as a reset level.

Readout from the PD is achieved by CDS driving. Accordingly, as described above, the MCG reset period and the HCG reset period are provided, and a reset signal during the middle conversion efficiency and a reset signal during the high conversion efficiency are acquired for each of these periods. The reset potential at this time corresponds to potential MINVDD.

Thereafter, the operation shifts to an HCG readout period. The drive signal TG is turned on for only a predetermined time before a start of the HCG readout period to turn on the first transfer transistor 52. As a result, charge is transferred from the photoelectric conversion unit 51 to the first FD portion 53.

When the drive signal TG is returned to the off-state, the HCG (high conversion efficiency) readout period starts. In the HGC readout period, the drive signal SEL is turned on to bring the selection transistor 61 into the on-state. The high conversion efficiency is achieved by the first FD portion 53. Accordingly, charge stored in the first FD portion 53 is read during the HGC readout period.

The drive signal FDG is turned on at the time when the drive signal SEL is returned to the off-state to turn on the second transfer transistor 54. When the second transfer transistor 54 is turned on, the drive signal TG is turned on to turn on the first transfer transistor 52. Charge is allowed to flow to the first FD portion 53 and the second FD portion 55 by turning on the first transfer transistor 52 and the second transfer transistor 54.

When the drive signal TR is returned to the off-state, an MCG (middle conversion efficiency) readout period starts. With the start of the MCG readout period, the selection transistor 61 is brought into the on-state by turning on the drive signal SEL. As a result, charge stored in the first FD portion 53 and the second FD portion 55 is read out.

After an elapse of the MCG readout period, the drive signal FCG and the drive signal TG are brought into the on-state. The drive signal FDG is maintained in the on-state. Accordingly, the first transfer transistor 52, the second transfer transistor 54, and the third transfer transistor 56 are brought into the on-state, in which state charge is transferred to the first FD portion 53, the second FD portion 55, and the third FD portion 57 (MIM capacitive element 58).

When the drive signal TG is turned off, an LCG (low conversion efficiency) readout period starts. The low conversion efficiency is achieved by the sum of the first FD portion 53, the second FD portion 55, and the third FD portion 57 (MIM capacitive element 58). Accordingly, charge stored in the sum of the first FD portion 53, the second FD portion 55, and the third FD portion 57 (MIM capacitive element 58) is read during the LCG readout period.

Readout from the PD and the MIM capacitive element 58 is achieved by DDS driving. Accordingly, signals are read during the LCG readout period, and then an LCG reset period is provided to read a reset signal.

At an end of the LCG readout period, the drive signal SEL is turned off. After the drive signal SEL is turned off, the drive signal RST is turned on for only a predetermined time. In such a manner, the reset transistor 59 is brought into the on-state, and the first FD portion 53, the second FD portion 55, and the third FD portion 57 are reset. The reset potential at this time corresponds to the potential VDD.

Thereafter, readout of the reset signal during the LCG reset period is executed by turning on the drive signal SEL. In the LCG reset period, the drive signal SEL, the drive signal FCG, and the drive signal FDG are brought into the on-state.

At an end of the LCG reset period, the drive signal SEL is returned to the off-state. Signals during the HCG (high conversion efficiency), signals during the MCG (middle conversion efficiency), and signals during the LCG (low conversion efficiency) are read by performing a series of the foregoing operations.

According to the configuration and the operation of the pixel 2 described above, the Qs (saturation charge quantity) can be expanded by overflow driving which uses the capacitive element 58 as a capacitive element. Separation between the pixels by the penetration trench (FFTI 70) penetrating the semiconductor substrate 100 can prevent blooming to the adjoining pixels, and tighten potential under the transfer transistor transistors. Accordingly, the Qs of the photodiode (photoelectric conversion unit 51) increases, and therefore reduction of S/N differences is achievable at high illuminance connection portions.

Separation between the pixel transistors is achieved not only by the STI 71 but also by the FFTI 70. Accordingly, the region for the pixel transistors is reliably produced even in a case where a penetration trench is formed. Neither the SCF 108 nor the P-type semiconductor region 107 is provided on the side wall of the FFTI 70 near the N+ diffusion layer region (FD portion). This configuration can reduce leak current from the N+ diffusion layer.

Readout is carried out three times by using the three types of conversion efficiency. This configuration can reduce deterioration of S/N differences at the connection portions.
<Configuration Example of Pixel According to Second Embodiment>

Figure 10:
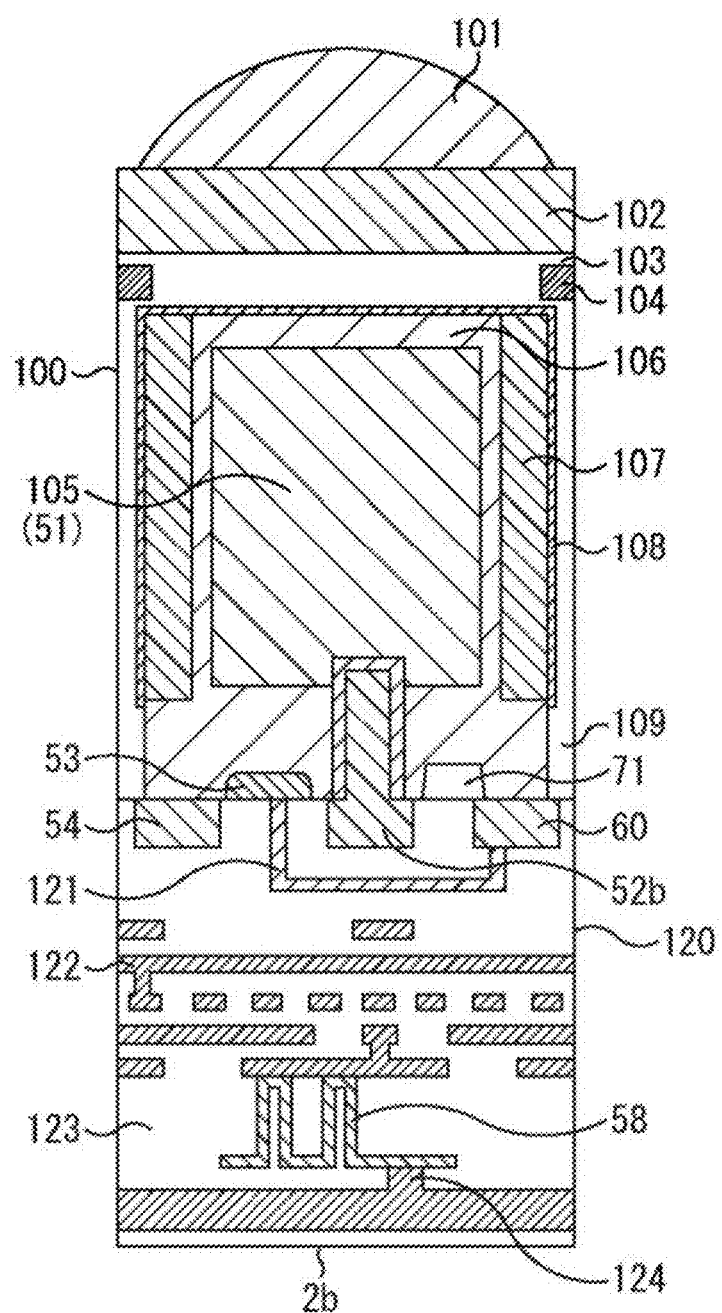
FIG. 10 is a diagram depicting a cross-sectional configuration of a pixel according to a second embodiment.

FIG. 10 is a diagram depicting a cross-sectional configuration of a pixel 2b according to a second embodiment. In the following description, the pixel 2 described above will be referred to as a pixel 2a corresponding to the pixel 2 of the first embodiment. In the following description, parts identical to the corresponding parts of the pixel 2a of the first embodiment will be given identical reference numbers, and will not be repeatedly explained where appropriate.

The pixel 2b according to the second embodiment is similar to the pixel 2a of the first embodiment depicted in FIG. 7 except for a point that the first transfer transistor 52 is constituted by a vertical transistor. A trench for the vertical transistor is opened in the vertical transistor. A transfer gate for reading charge from the photoelectric conversion unit 51 is formed in this opened region.

The first transfer transistor 52b depicted in FIG. 10 is constituted by a vertical transistor. The first transfer transistor 52b constituted by the vertical transistor is allowed to have a configuration capable of increasing efficiency of readout of charge from the photoelectric conversion unit 51.
<Configuration Example of Pixel According to Third Embodiment>

Figure 11:
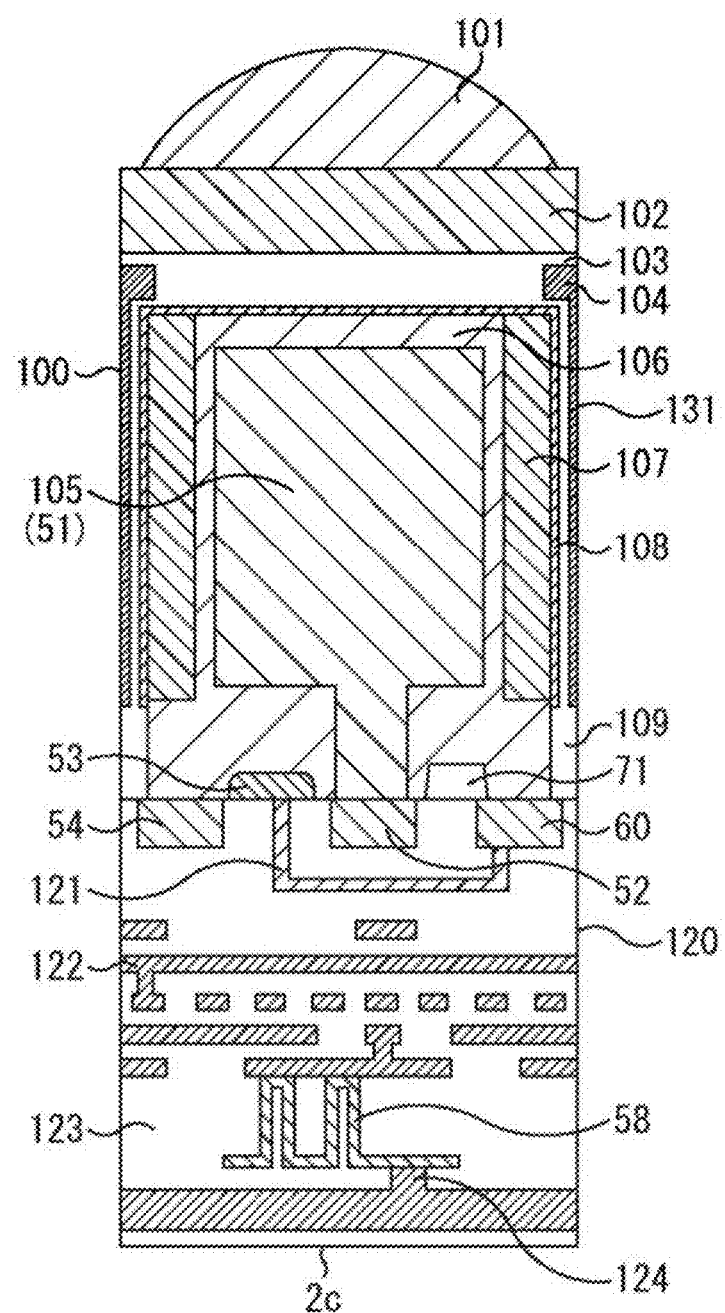
FIG. 11 is a diagram depicting a cross-sectional configuration of a pixel according to a third embodiment.

FIG. 11 is a diagram depicting a cross-sectional configuration of a pixel 2c according to a third embodiment.

The pixel 2c according to the third embodiment is similar to the pixel 2a of the first embodiment depicted in FIG. 7 except for a point that a light shielding wall 131 including a material having excellent light-shielding properties is provided on the side wall of the FFTI 70 of the pixel 2a. The light shielding wall 131 may include a material having excellent light-shielding properties. For example, aluminum (AL), titanium (Ti), and tungsten (W) are available.

The light shielding wall 131 and the light shielding film 104 may include the same material. As depicted in FIG. 11, the light shielding wall 131 and the light shielding film 104 may have a shape connected to each other (shape formed integrally with each other).

In such a manner, the light shielding wall 131 and an insulator including SiO2 or the like provided on the FFTI 70 can reduce light leaking from the pixel to the other pixel, and reliably achieve insulation between the respective pixels.
<Configuration Example of Pixel According to Fourth Embodiment>

Figure 12:
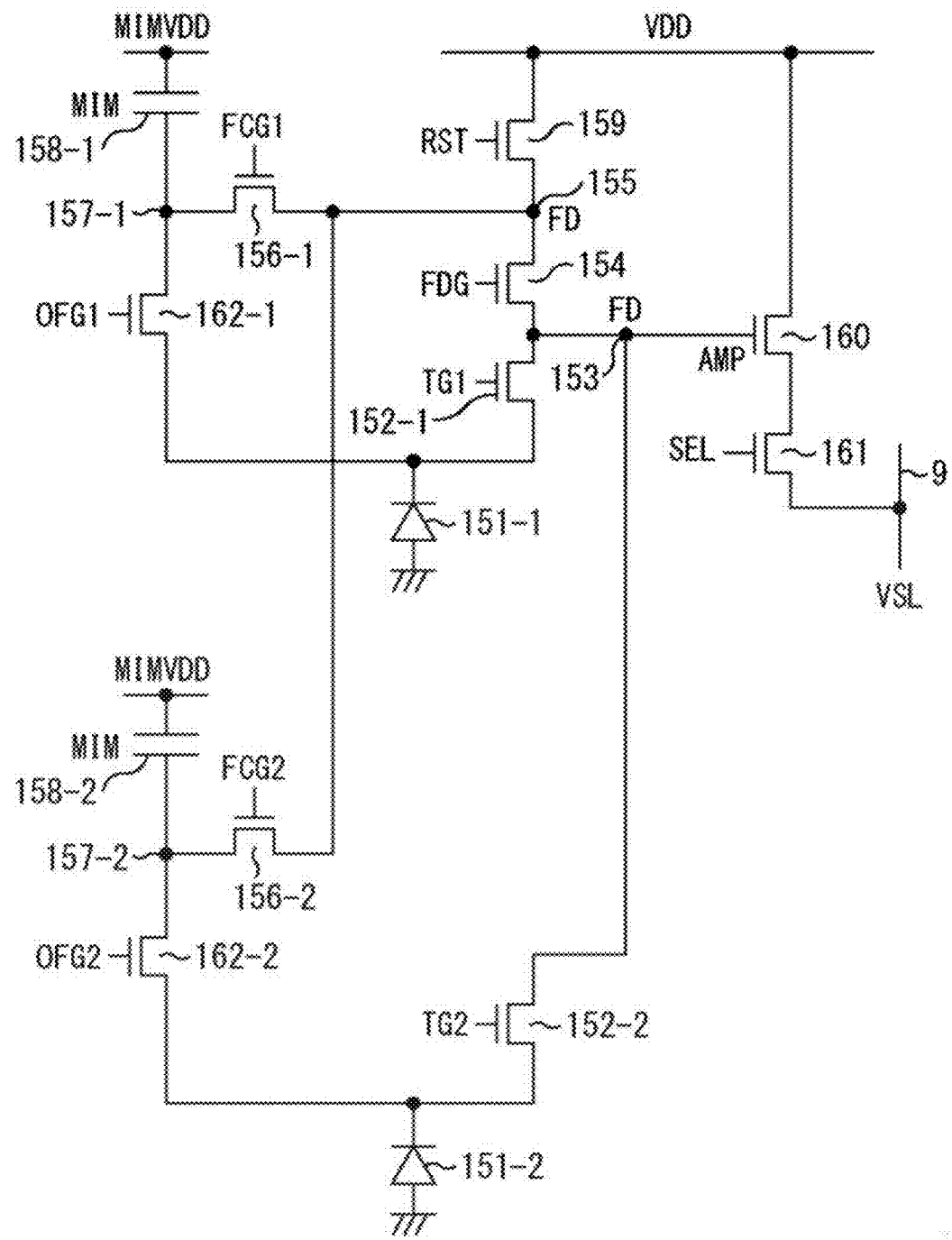
FIG. 12 is a diagram depicting a circuit configuration example of a pixel according to a fourth embodiment.

FIG. 12 is a diagram depicting a circuit configuration example of a pixel 2d according to a fourth embodiment.

The pixel 2d depicted in FIG. 12 is configured to supply charge overflowing from the photodiode not to the FD portion side but to the MIM capacitive element side, and has a configuration which includes two pixels disposed in the longitudinal direction and sharing a reset transistor and the like (hereinafter referred to as sharing by two pixels where appropriate).

The double pixel 2d disposed in the longitudinal direction includes a photoelectric conversion unit 151-1, a first transfer transistor 152-1, a first FD portion 153, a second transfer transistor 154, a second FD portion 155, a third transfer transistor 156-1, a third FD portion 157-1, an MIM (Metal-Insulator-Metal) capacitive element 158-1, a reset transistor 159, an amplification transistor 160, a selection transistor 161, and a fourth transfer transistor 162-1. The double pixel 2d further includes a photoelectric conversion unit 151-2, a first transfer transistor 152-2, a third transfer transistor 156-2, a third FD portion 157-2, an MIM capacitive element 158-2, and a fourth transfer transistor 162-2.

Note that each of the photoelectric conversion unit 151-1 and the photoelectric conversion unit 151-2 will be simply referred to as a photoelectric conversion unit 151, for example, in the following description in a case where distinction between these units is unnecessary. This expression will be applied to other components.

The first FD portion 153, the second transfer transistor 154, the second FD portion 155, the reset transistor 159, the amplification transistor 160, and the selection transistor 161 of the double pixel 2d are shared by the two pixels of the double pixel 2d.

For example, multiple drive lines are wired as the pixel drive lines 10 of the pixels 2d for each pixel row. In addition, a drive signal TG1, a drive signal TG2, a drive signal FDG, a drive signal FCG1, a drive signal FCG2, a drive signal RST, and a drive signal SEL, a drive signal OFG1, and a drive signal OFG2 are supplied to the first transfer transistor 152-1, the first transfer transistor 152-2, the second transfer transistor 154, the third transfer transistor 156-1, the third transfer transistor 156-2, the reset transistor 159, the selection transistor 161, the fourth transfer transistor 162-1, and the fourth transfer transistor 162-1, respectively, from the vertical driving circuit 4 via the multiple drive lines.

For example, each of the photoelectric conversion units 151 includes a PN junction photodiode. Each of the photoelectric conversion units 151 receives incident light, photoelectrically converts the received light, and stores charge thus obtained.

The first transfer transistor 152-1 constituting a pixel 2*d*-1 is provided between the photoelectric conversion unit 151-1 and the first FD portion 153. The drive signal TG1 is supplied to a gate electrode of the first transfer transistor 152-1. Similarly, the first transfer transistor 152-2 constituting the pixel 2*d*-2 is provided between the photoelectric conversion unit 151-2 and the first FD portion 153. The drive signal TG2 is supplied to a gate electrode of the first transfer transistor 152-2.

When the high-level drive signal TG is supplied, the first transfer transistors 152 are turned on. As a result, charge stored in the photoelectric conversion units 151 is transferred to the first FD portion 153 via the first transfer transistor 152.

Each of the first FD portion 153, the second FD portion 155, and the third FD portions 157 is a floating diffusion region called floating diffusion, and stores transferred charge. The third FD portions 157 are connected to the MIM capacitive elements 158 to allow the MIM capacitive elements 158 to function as the third FD portions 157.

The second transfer transistor 154 is provided between the first FD portion 153 and the second FD portion 155. The drive signal FDG is supplied to a gate electrode of the second transfer transistor 154. When the high-level drive signal FDG is supplied, the second transfer transistor 154 is turned on. As a result, charge from the first FD portion 153 is transferred to the second FD portion 155 via the second transfer transistor 154.

The third transfer transistor 156-1 constituting the pixel 2*d*-1 is provided between the second FD portion 155 and the third FD portion 157-1. The drive signal FCG1 is supplied to a gate electrode of the third transfer transistor 156-1. The third transfer transistor 156-2 constituting the pixel 2*d*-2 is provided between the second FD portion 155 and the third FD portion 157-2. The drive signal FCG2 is supplied to a gate electrode of the third transfer transistor 156-2.

When the high-level drive signals FCG are supplied, the third transfer transistors 156 are turned on. As a result, charge stored in the third FD portions 157 is read out. The third FD portion 157-1 is connected to the MIM capacitive element 158-1, while the third FD portion 157-2 is connected to the MIM capacitive element 158-2.

The fourth transfer transistor 162-1 constituting the pixel 2*d*-1 is provided between the photoelectric conversion unit 151-1 and the third FD portion 157-1 (MIM capacitive element 158-1). The drive signal OFG1 is supplied to a gate electrode of the fourth transfer transistor 162-1. The fourth transfer transistor 162-2 constituting the pixel 2*d*-2 is provided between the photoelectric conversion unit 151-2 and the third FD portion 157-2 (MIM capacitive element 158-2). The drive signal OFG2 is supplied to a gate electrode of the fourth transfer transistor 162-2.

The reset transistor 159 is connected between the power source VDD and the second FD portion 155. The drive signal RST is supplied to a gate electrode of the reset transistor 159. When the high-level drive signal RST is supplied, the reset transistor 159 is turned on. As a result, potential at the second FD portion 155 is reset to a level of the power source voltage VDD.

A gate electrode of the amplification transistor 160 is connected to the first FD portion 153, and a drain of the amplification transistor 160 is connected to the power source VDD. The amplification transistor 160 thus functions as an input unit of a readout circuit which reads a signal corresponding to charge retained in the first FD portion 153, i.e., a generally-called source follower circuit. The selection transistor 161 is connected between the source of the amplification transistor 160 and the vertical signal line 9. The drive signal SEL is supplied to a gate electrode of the selection transistor 161. When the high-level drive signal SEL is supplied, the selection transistor 61 is turned on. As a result, the pixel 2*d*-1 or the pixel 2*d*-2 is brought into a selective state. Accordingly, a pixel signal output from the amplification transistor 160 is output to the vertical signal line 9 via the selection transistor 31.

The pixel 2*d* depicted in FIG. 12 has the fourth transfer transistor 162-1 connected to the photoelectric conversion unit 151-1 separately from the first transfer transistor 152-1 provided for transfer to the first FD portion 153. In this configuration, charge overflowing from the fourth transfer transistor 162-1 is stored in the third FD portion 157-1 (MIM capacitive element 158-1).

Similarly, the pixel 2*d* has the fourth transfer transistor 162-2 connected to the photoelectric conversion unit 151-2 separately from the first transfer transistor 152-2 provided for transfer to the first FD portion 153. In this configuration, charge overflowing from the fourth transfer transistor 162-2 is stored in the third FD portion 157-2 (MIM capacitive element 158-2).

Each of the fourth transfer transistor functions as an overflow gate (OFG: Over Flow Gate) for overflow from the photoelectric conversion unit 151.

Charge photoelectrically converted by the photoelectric conversion unit 151-1 and stored in the photoelectric conversion unit 151-1 without overflowing from the fourth transfer transistor 162-1 is read to the first FD portion 153 by the first transfer transistor 152-1 similarly to sharing by two pixels of an ordinary CIS (CMOS Image Sensor). Similarly, charge photoelectrically converted by the photoelectric conversion unit 151-2 and stored in the photoelectric conversion unit 151-2 without overflowing from the fourth transfer transistor 162-2 is read to the first FD portion 153 by the first transfer transistor 152-2.

Charge overflowing from the fourth transfer transistors 162 and stored in the MIM capacitive elements 158 is read in addition to the charge in the first FD portion 153 and the second FD portion 155.

Readout of the charge stored in the MIM capacitive element 158-1 is achieved in a following manner. Initially, the third transfer transistor 156-1 is turned off, and the first transfer transistor 152-1 is turned on. Subsequently, charge in the photoelectric conversion unit 151-1 is read to the first FD portion 153-1, and output to the VSL 9 via the amplification transistor 160. Thereafter, the second transfer transistor 154 is turned on, and the charge stored in the first FD portion 153 and the second FD portion 155 is output to the VSL 9 via the amplification transistor 160.

Thereafter, the third transfer transistor 156-1 is turned on, and charge stored in the MIM capacitive element 158-1 is added to the charge stored in the first FD portion 153 and the second FD portion 155. The summed charge is output to the VSL 9 via the amplification transistor 160.

Charge stored in the MIM capacitive element 158-2 is also read by an operation similar to the foregoing operation.

<Planar Configuration Example of Pixel>

Figure 13:
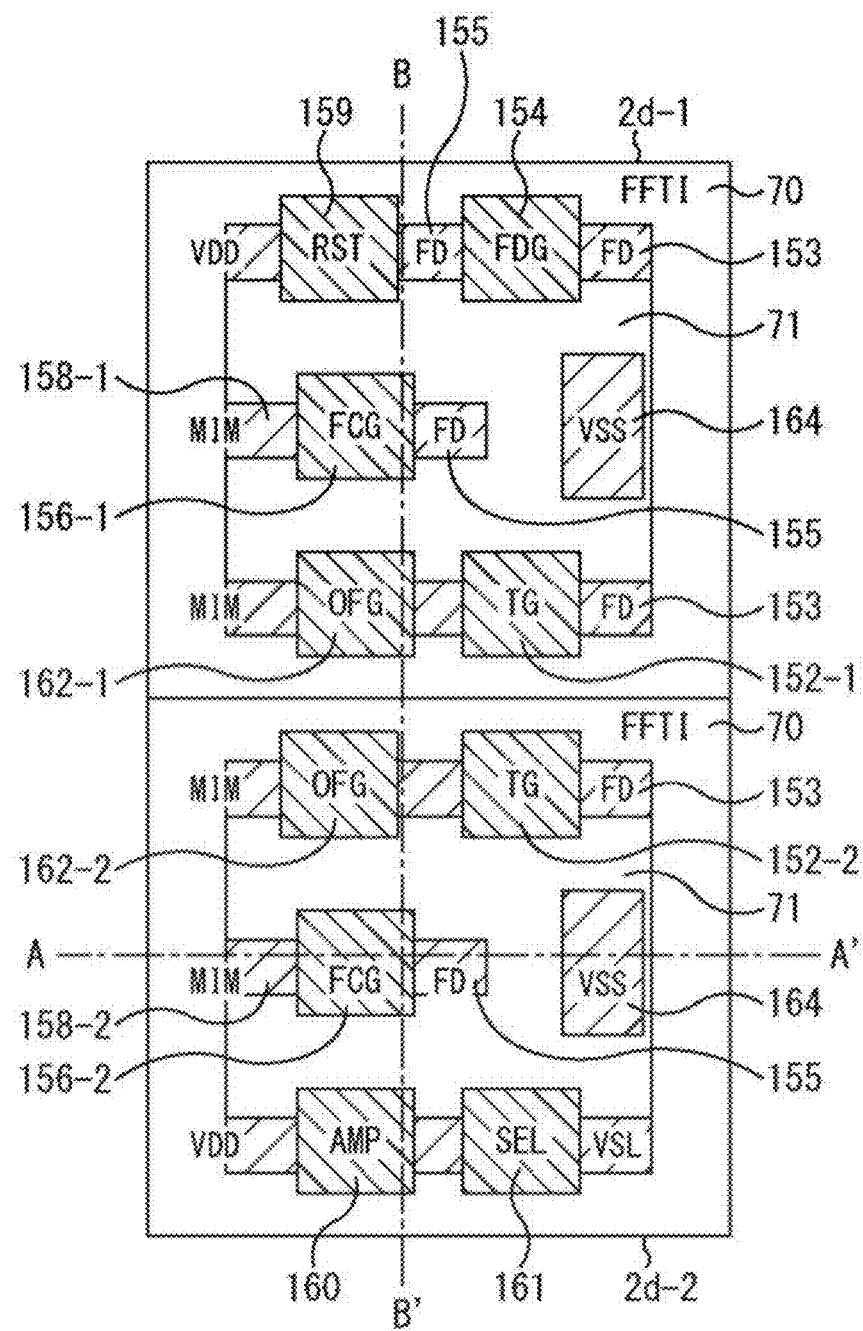
FIG. 13 is a diagram depicting a planar configuration example of pixels according to the fourth embodiment.
Figure 14:
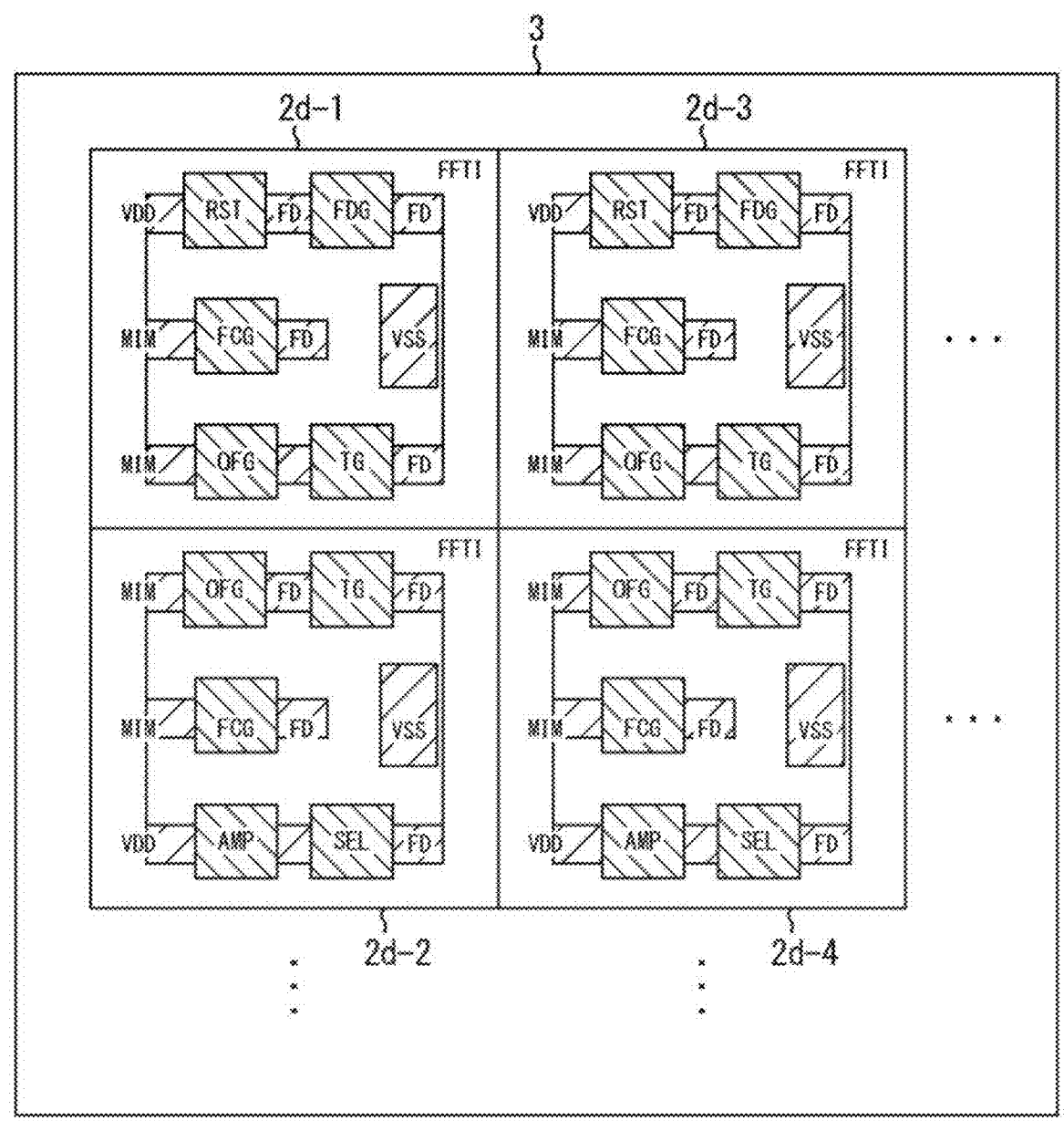
FIG. 14 is a diagram depicting a planar configuration example of a pixel array according to the fourth embodiment.

FIGS. 13 and 14 each depict a planar configuration example of the pixel 2d. Each of FIGS. 13 and 14 is a plan diagram of a silicon substrate surface where the transistors are disposed.

Figure 15:
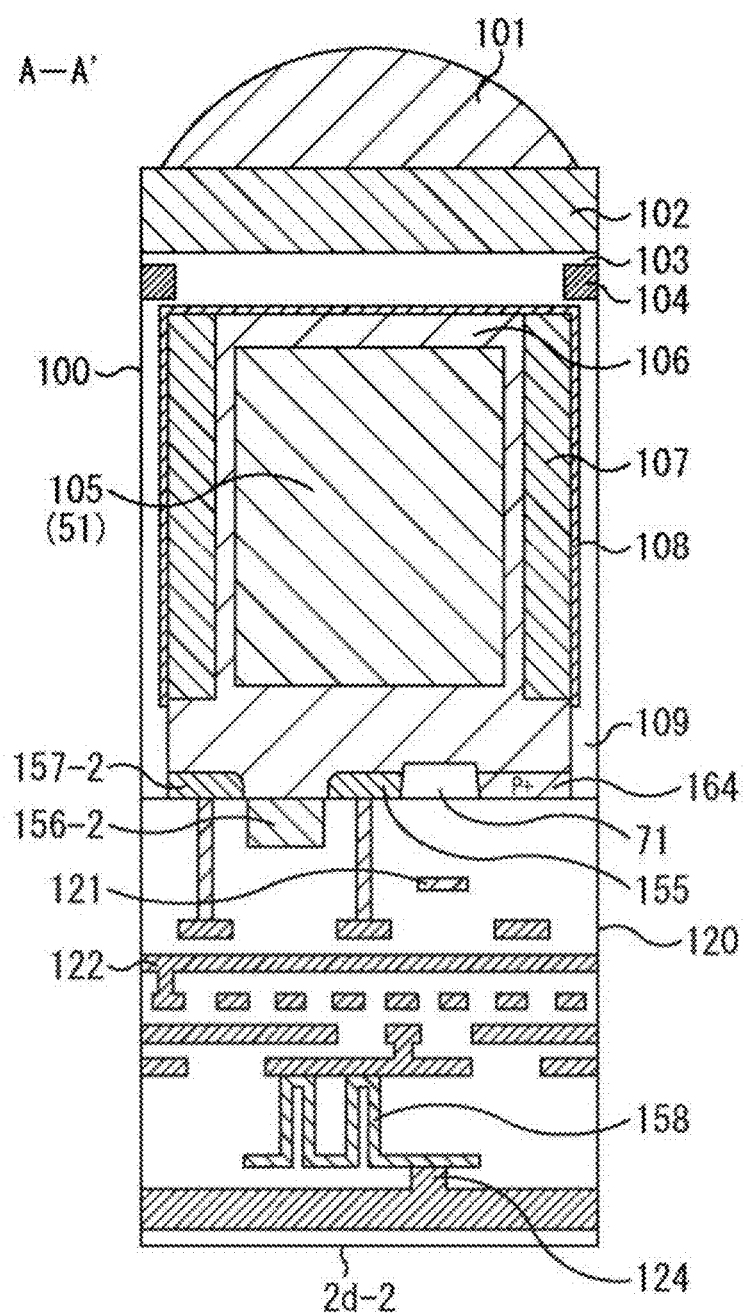
FIG. 15 is a diagram depicting a cross-sectional configuration example of the pixel according to the fourth embodiment.

FIG. 13 depicts a planar configuration example of the transistors of the double pixel 2d. A gate electrode TG of the first transfer transistor 152-1 is formed in a lower right part of the pixel 2d-1 in the figure, while a gate electrode OFG of the fourth transfer transistor 162-1 is formed on the left side of the gate electrode TG in the figure. The gate electrode TG of the first transfer transistor 152-1 is connected to the first FD portion 153 (an N+ region constituting the first FD portion 153) formed inside the semiconductor substrate 100 (FIG. 15).

A gate electrode FCG of the third transfer transistor 156-1 is formed on the upper side of the fourth transfer transistor 162-1 in the figure. The fourth transfer transistor 162-1 and the third transfer transistor 156-1 are connected to the MIM capacitive element 158-1 disposed in the wiring layer 120 (FIG. 15). The third transfer transistor 156-1 is also connected to an N+ region constituting the second FD portion 155.

A gate electrode RST of the reset transistor 159 is formed on the upper side of the third transfer transistor 156-1 in the figure. A gate electrode FDG of the second transfer transistor 154 is formed on the right side of the reset transistor 159 in the figure. The second FD portion 155 is formed between the gate electrode RST of the reset transistor 159 and the gate electrode FDG of the second transfer transistor 154. Each of these gate electrodes is connected to the N+ region constituting the second FD portion 155. The gate electrode FDG of the second transfer transistor 54 is also connected to the N+ region constituting the first FD portion 153.

A gate electrode SEL of the selection transistor 161 is formed in a lower right part of the pixel 2d-2 in the figure, while a gate electrode AMP of the amplification transistor 160 is formed on the left side of the gate electrode SEL in the figure. The gate electrode SEL of the selection transistor 161 is connected to the VSL 9, while the gate electrode AMP of the amplification transistor 160 is connected to a supply line of the potential VDD.

A gate electrode FCG of the third transfer transistor 156-2 is formed on the upper side of the amplification transistor 160 in the figure. The third transfer transistor 156-2 is connected to the MIM capacitive element 158-2 disposed in the wiring layer 120 (FIG. 15). The third transfer transistor 156-2 is also connected to an N+ region constituting the second FD portion 155.

A gate electrode OFG of the fourth transfer transistor 162-2 is formed on the upper side of the third transfer transistor 156-2 in the figure. The gate electrode OFG of the fourth transfer transistor 162-2 is connected to the MIM capacitive element 158-2 disposed in the wiring layer 120 (FIG. 15). A gate electrode TG of the first transfer transistor 152-2 is formed on the right side of the fourth transfer transistor 162-2 in the figure. The gate electrode TG of the first transfer transistor 152-2 is connected to the first FD portion 153 (an N+ region constituting the first FD portion 153) formed inside the semiconductor substrate 100 (FIG. 15).

As depicted in FIG. 14, the pixels 2d each depicted in FIG. 13 are arranged in an array form in the pixel array unit 3. While FIG. 14 depicts 2×2 pixels, i.e., four pixels, the pixels 2d are arranged in a form of m×n matrix.

The FFTI 70 is formed between the respective pixels 2. The FFTI 70 forms such a configuration which separates the pixels 2d by insulators to achieve electric isolation between the respective pixels 2. The STI 71 is provided between the respective transistors.

A p-well contact for fixing p-well potential within the pixel 2d is formed in an active region indicated as a VSS region 164 for each of the pixel 2d-1 and the pixel 2d-2 in a right center in the figure.

The configuration depicted in FIG. 13 is a configuration corresponding to sharing by two pixels. Accordingly, this configuration includes the reset transistor 159, the second transfer transistor 154, the amplification transistor 160, and the selection transistor 161 shared by the two pixels of the double pixel 2d. In the example depicted in the figure, the reset transistor 159 and the second transfer transistor 154 are arranged in the pixel 2d-1 located in an upper part in the figure, while the amplification transistor 160 and the selection transistor 161 are arranged in the pixel 2d-2 located in a lower part in the figure.

The arrangement of the transistors (gate electrodes) depicted herein is presented only by way of example, and is not required to be adopted. The present technology is applicable to other transistor arrangements.

Each of the pixels 2d has the FFTI 70 in a pixel boundary region. Element separation in the active region is achieved by the STI 71. Each of the pixel transistors other than the third transfer transistor 156 (first transfer transistor 152, second transfer transistor 154, reset transistor 159, amplification transistor 160, selection transistor 161, fourth transfer transistor 162) has not only the STI 71 but also the FFTI 70 for element separation.

As depicted in FIG. 13, the gate electrode of each of the pixel transistors other than the third transfer transistor 156 is configured to overlap with the FFTI 70. This configuration overlapping with the FFTI 70 reliably produces a region necessary for the electrode gate. The region for the electrode gate can be also reliably produced by a configuration where the two pixels share predetermined pixel transistors.

A planar configuration example of the region where the MIM capacitive elements 158 are formed is similar to the configuration described with reference to FIGS. 5 and 6, and therefore will not be repeatedly explained herein.

<Cross-Sectional Configuration Example of Pixel>

Figure 16:
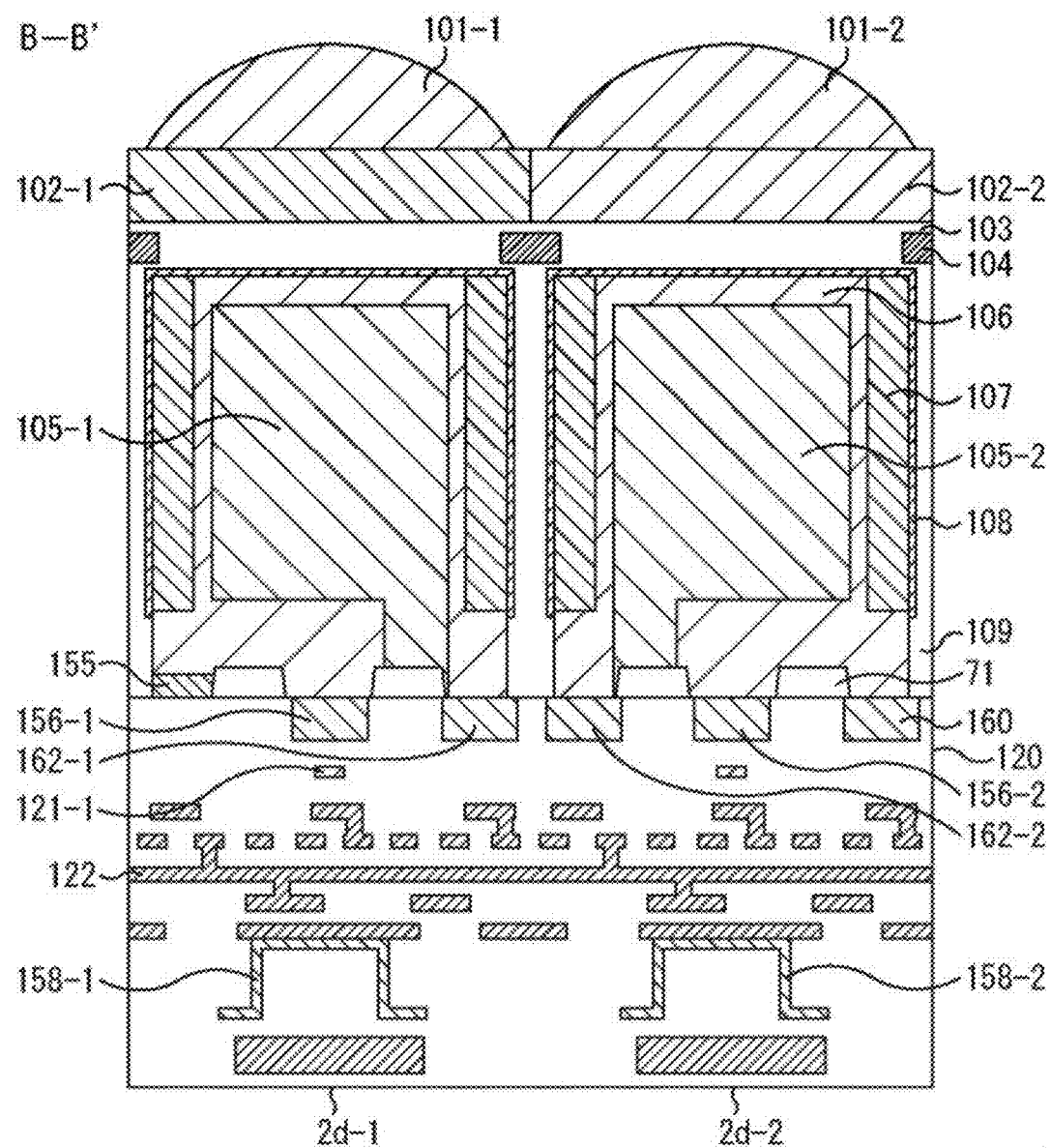
FIG. 16 is a diagram depicting a cross-sectional configuration example of the pixels according to the fourth embodiment.

FIG. 15 is a diagram of a cross-sectional configuration example taken along a line A-A' in the plan diagram of the pixel 2d depicted in FIG. 13, while FIG. 16 is a diagram of a cross-sectional configuration example taken along a line B-B'. Parts identical to the corresponding parts of the pixel 2a of the first embodiment depicted in FIGS. 7 and 8 will be given identical reference numbers, and will not be repeatedly explained where appropriate.

An N+ region of the third FD portion 157-2 is formed in a lower left part of the semiconductor substrate 100 in the figure. The third FD portion 157-2 is connected to the MIM capacitive element 158-2 formed within the wiring layer 120 via the wire 122 formed within the wiring layer 120. The gate electrode FCG of the third transfer transistor 156-2 is formed within the wiring layer 120 on the right side of the third FD portion 157-2 in the figure.

An N+ region of the second FD portion 155 is formed on the right side of the third transfer transistor 156-2 in the figure (in a lower central part of the semiconductor substrate 100 in the figure). As described with reference to the planar configuration example in FIG. 13, the second FD portion 155 is also formed within the pixel 2d-1, and connected to the N+ region of the second FD portion 155 formed in the pixel 2d-1 via the wire 122 within the wiring layer 120.

The STI 71 is formed on the right side of the N+ region of the second FD portion 155, and a P+ region constituting the VSS region 164 is further formed on the right side of the STI 71. The MIM capacitive element 158 is formed between the fifth layer of the wire 122 and the sixth layer of the wire 122 in the wiring layer 120. One side of the MIM capacitive element 158 is connected to the fifth layer of the wire 122, while the other side is connected to the sixth layer of the wire 122 via the via 124.

FIG. 16 is a diagram depicting a cross-sectional configuration example taken along a line B-B'. FIG. 16 presents the double pixel 2d for sharing by two pixels. The N+ region of the second FD portion 155 is formed in a lower left part in the figure in the semiconductor substrate 100 of the pixel 2d-1 depicted in a left part in the figure. The gate electrode FCG of the third transfer transistor 156-1 is formed within the wiring layer 120 on the right side of the second FD portion 155 in the figure. The gate electrode OFG of the fourth transfer transistor 162-1 is formed on the right side of the third transfer transistor 156-1 in the figure.

The gate electrode OFG of the fourth transfer transistor 162-2 is formed on the lower left side in the figure with respect to the semiconductor substrate 100 of the pixel 2d-2 depicted in a right part in the figure. The gate electrode FCG of the third transfer transistor 156-2 is formed on the right side of the fourth transfer transistor 162-2 in the figure. The gate electrode AMP of the amplification transistor 160 is formed in the right side of the third transfer transistor 156-2 in the figure.

The STI 71 is formed between the third transfer transistor 156-1 and the fourth transfer transistor 162-1, between the fourth transfer transistor 162-2 and the third transfer transistor 156-2, and between the third transfer transistor 156-2 and the amplification transistor 160 to provide a separated configuration.

According to the cross-sectional configuration example of the pixel 2d depicted in FIG. 16, the gate electrode OFG of the fourth transfer transistor 162-1 formed on the lower side in the figure with respect to the FFTI 70 provided in the right part of the pixel 2d-1 in the figure is positioned and sized such that a part of the gate electrode OFG overlaps with the FFTI 70. The gate electrode OFG of the fourth transfer transistor 162-2 formed on the lower side in the figure with respect to the FFTI 70 provided in the left part of the pixel 2d-2 in the figure is positioned and sized such that a part of the gate electrode OFG overlaps with the FFTI 70. The gate electrode AMP of the amplification transistor 160 formed on the lower side in the figure with respect to the FFTI 70 provided in the right part of the pixel 2d-2 in the figure is positioned and shaped such that a part of the gate electrode AMP overlaps with the FFTI 70.

Neither the P-type semiconductor region 107 nor the SCF 108 is formed on the side of the FFTI 70 where the gate electrodes are disposed. This configuration allows overlap between the gate electrodes and a part of the FFTI 70 as well.

The pixel 2b in the second embodiment (FIG. 10) may be applied to the pixel 2d in the fourth embodiment to constitute the first transfer transistor 152 by a vertical transistor.

The pixel 2c in the third embodiment (FIG. 11) may be applied to the pixel 2d in the fourth embodiment to provide the light shielding wall 131 on the FFTI 70.

<Operation of Pixel 2d>

Figure 17:
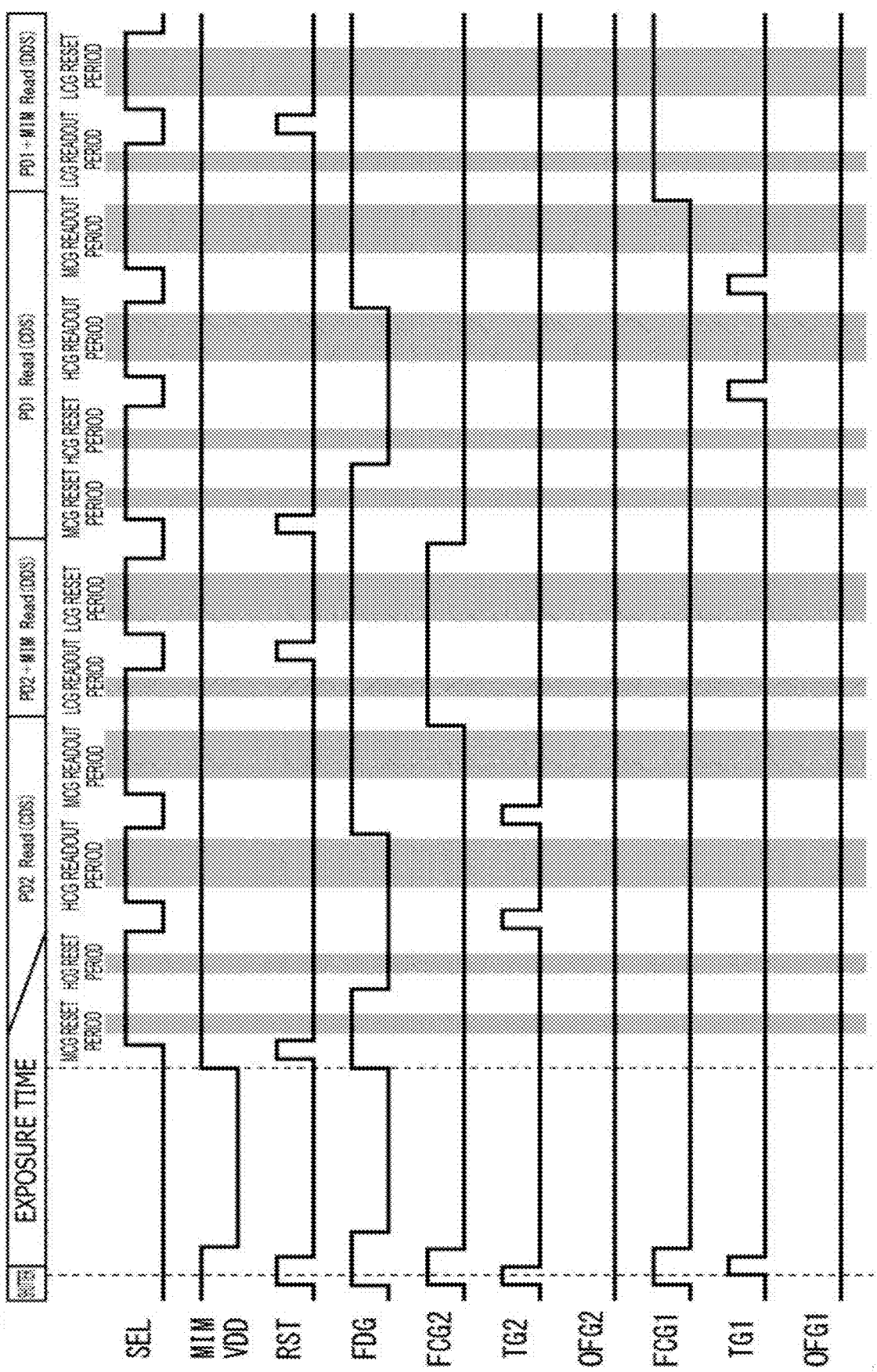
FIG. 17 is a diagram for explaining an operation of the pixel according to the fourth embodiment.

An operation performed by the pixel 2d depicted in FIGS. 12 to 16 will be described with reference to a timing chart illustrated in FIG. 17. For handling the pixel 2d corresponding to the type of sharing by two pixels, a readout operation for the pixel 2d-2 (indicated as PD2 in the figure) is initially performed, and subsequently a readout operation for the pixel 2d-1 (indicated as PD1 in the figure) is performed.

When the shutter is operated, the voltage MIMVDD supplied to the MIM capacitive elements 158, the drive signal RST supplied to the reset transistor 159, the drive signal FDG supplied to the second transfer transistor 154, the drive signal FCG2 supplied to the third transfer transistor 156-2, the drive signal TG2 supplied to the first transfer transistor 152-2, the drive signal FCG1 supplied to the third transfer transistor 156-1, and the drive signal TG1 supplied to the first transfer transistor 152-1 are turned on. Each of the drive signals is turned on for only a predetermined period, and subsequently is turned off.

After an elapse of an exposure time, the readout operation for the pixel 2d-2 (PD2) is executed by CDS driving. Initially, an MCG (middle conversion efficiency) reset period is provided. Thereafter, an HCG (high conversion efficiency) reset period is provided. The potential MIMVDD is supplied to the MIM capacitive element 158-1 and the MIM capacitive element 158-2 from a start point of the HCG (high conversion efficiency) reset period.

Before a start of the MCG reset period, the drive signal RST and the drive signal FCG are turned on for only a predetermined period. The MCG (middle conversion efficiency) is achieved using the first FD portion 153 and the second FD portion 155. The first FD portion 153 and the second FD portion 155 are reset in the MCG reset period.

The drive signal RST is turned off with the drive signal FDG kept on. In such a manner, the MCG reset is achieved. The reset potential at this time corresponds to the potential VDD.

After completion of the MCG reset, the HCG reset is carried out. The HCG (high conversion efficiency) is achieved using the first FD portion 153. Accordingly, the first FD portion 153 is reset in the HCG reset period. The HCG reset is executed by switching the on-state of the drive signal FDG to the off-state. After completion of the reset in such a manner, readout from the PD2 (pixel 2d-2) starts.

Readout from the photodiode (PD2) is achieved by CDS driving. With a start of readout from the photoelectric conversion unit 151-2 of the pixel 2d-2, the drive signal TG2 supplied to the first transfer transistor 152-2 is turned on for only a predetermined period to transfer charge from the photoelectric conversion unit 151-2 to the first FD portion 153.

When the drive signal TG is returned to the off-state after an elapse of a predetermined period, an HCG (high conversion efficiency) readout period starts. In the HGC readout period, the drive signal SEL is turned on to bring the selection transistor 61 into the on-state. The high conversion efficiency is produced by the first FD portion 153. Accordingly, charge stored in the first FD portion 153 is read during the HGC readout period.

The drive signal FDG is turned on at the time when the drive signal SEL is returned to the off-state to turn on the second transfer transistor 154. When the second transfer transistor 154 is turned on, the drive signal TG2 is turned on to turn on the first transfer transistor 152-2. Transfer of charge to the first FD portion 153 and the second FD portion 155 is allowed by turning on the first transfer transistor 152-2 and the second transfer transistor 154.

After the drive signal TR is returned to the off-state, an MCG (middle conversion efficiency) readout period starts. With the start of the MCG readout period, the selection transistor 61 is brought into the on-state by turning on the drive signal SEL. As a result, charge stored in the first FD portion 153 and the second FD portion 155 is read out.

After completion of the MCG readout period, the on-state of the drive signal FDG is still maintained. Accordingly, the on-state of the second transfer transistor 154 is maintained. After completion of the MCG readout period, the drive signal FCG2 is brought into the on-state to turn on the third transfer transistor 156-2.

Thereafter, an LCG (low conversion efficiency) readout period starts. The low conversion efficiency is achieved by the sum of the first FD portion 153, the second FD portion 155, and the third FD portion 157-2 (MIM capacitive element 158-2). Accordingly, charge stored in the sum of the first FD portion 153, the second FD portion 155, and the third FD portion 157-2 (MIM capacitive element 158-2) is read during the LCG readout period.

Charge overflowing from the photoelectric conversion unit 151-2 via the fourth transfer transistor 162-2 is stored in the MIN capacitive element 158-2.

Readout from the PD2 and the MIM capacitive element 158-2 is achieved by DDS driving. Accordingly, signals are read during the LCG readout period, and then an LCG reset period is provided to read the reset signal.

At an end of the LCG readout period, the drive signal SEL is turned off. After the drive signal SEL is turned off, the drive signal RST is turned on for only a predetermined time.

In such a manner, the reset transistor 159 is brought into the on-state. Thereafter, the drive signal SEL is turned on to execute readout of the reset signal during the LCG reset period. In the LCG reset period, the drive signal SEL, the drive signal FDG, and the drive signal FCG2 are brought into the on-state. In this state, reset designating the potential VDD as reset potential is executed.

At an end of the LCG reset period, the drive signal SEL is returned to the off-state. Signals during the HCG (high conversion efficiency), signals during the MCG (middle conversion efficiency), and signals during the LCG (low conversion efficiency) of the pixel 2*d*-2 are read by performing a series of the foregoing operations.

Similar processing is also performed for the pixel 2*d*-1. After completion of the processing for the pixel 2*d*-2, the readout operation for the pixel 2*d*-1 (PD1) is executed by CDS driving. Initially, an MCG (middle conversion efficiency) reset period is provided. Thereafter, an HCG (high conversion efficiency) reset period is provided. Supply potential to the MIM capacitive element 158-1 and the MIM capacitive element 158-1 is maintained at the potential MIMVDD.

Before a start of the MCG reset period, the drive signal RST and the drive signal FCG are turned on for only a predetermined period. Thereafter, the drive signal RST is turned off with the drive signal FDG kept on. In such a manner, the MCG reset is achieved, and reset signals of the first FD portion 153 and the second FD portion 155 are acquired.

After completion of the MCG reset, the HCG reset is carried out. The HCG reset is executed by switching the on-state of the drive signal FDG to the off-state. The HCG reset is achieved, and the reset signal of the first FD portion 153 is acquired. After the MCG reset and the HCG reset are completed in such a manner, readout from the PD1 (pixel 2*d*-1) starts.

With the start of readout from the photodiode (PD1), the drive signal TG1 supplied to the first transfer transistor 152-1 is turned on for only a predetermined period to transfer charge from the photoelectric conversion unit 151-1 to the first FD portion 53. When the drive signal TG1 is returned to the off-state after an elapse of the predetermined period, an HCG (high conversion efficiency) readout period starts. During the HGC readout period, the drive signal SEL is turned on for only a predetermined period. As a result, the selection transistor 61 is brought into the on-state, and charge stored in the first FD portion 153 is read out.

The drive signal FDG is turned on to turn on the second transfer transistor 154 at the time when the drive signal SEL is returned to the off-state after completion of the HGC readout period. After the second transfer transistor 154 is turned on, the drive signal TG2 is turned on to turn on the first transfer transistor 152-1 as well. Charge is transferred from the photoelectric conversion unit 151-1 to the first FD portion 153 and the second FD portion 155.

After the drive signal TRI is returned to the off-state, an MCG (middle conversion efficiency) readout period starts. With the start of the MCG readout period, the selection transistor 61 is brought into the on-state by turning on the drive signal SEL. As a result, charge stored in the first FD portion 153 and the second FD portion 155 is read out.

After completion of the MCG readout period, the on-state of the drive signal FDG is still maintained. Accordingly, the on-state of the second transfer transistor 154 is maintained. After completion of the MCG readout period, the drive signal FCG2 is brought into the on-state to turn on the third transfer transistor 156-1. Thereafter, an LCG (low conversion efficiency) readout period starts.

The low conversion efficiency is achieved by the sum of the first FD portion 153, the second FD portion 155, and the third FD portion 157-1 (MIM capacitive element 158-1). Accordingly, charge stored in the sum of the first FD portion 153, the second FD portion 155, and the third FD portion 157-1 (MIM capacitive element 158-1) is read during the LCG readout period.

Charge overflowing from the photoelectric conversion unit 151-1 via the fourth transfer transistor 162-1 is stored in the MIN capacitive element 158-1.

Readout from the PD and the MIM capacitive element 158-1 is achieved by DDS driving. Accordingly, signals are read during the LCG readout period, and then an LCG reset period is provided to read a reset signal.

At an end of the LCG readout period, the drive signal SEL is turned off. After the drive signal SEL is turned off, the drive signal RST is turned on for only a predetermined time. In such a manner, the reset transistor 159 is brought into the on-state. Thereafter, the drive signal SEL is turned on to execute readout of the reset signal during the LCG reset period. In the LCG reset period, the drive signal SEL, the drive signal FDG, and the drive signal FCG1 are brought into the on-state. In this state, reset designating the potential VDD as reset potential is executed.

At an end of the LCG reset period, the drive signal SEL is returned to the off-state. Signals during the HCG (high conversion efficiency), signals during the MCG (middle conversion efficiency), and signals during the LCG (low conversion efficiency) of the pixel 2*d*-1 are read by performing a series of the foregoing operations.

According to the configuration and the operation of the pixel 2*d* described above, the Qs (saturation charge quantity) can be expanded by overflow driving which uses the MIM capacitive element 158 as a capacitive element. The reset transistor 159 is turned on before execution of the reset operation during the MCG reset period and the HCG reset period. In this case, dark current is discarded by resets of the first FD portion 153 and the second FD portion 155. Accordingly, signals read during the MCG readout period and the HCG readout period executed after the reset period are not influenced by dark current.

Separation between the respective pixels by the penetration trench (FFTI 70) can prevent blooming to the adjoining pixels, and tighten potential under the transfer transistors. Accordingly, the Qs of the photodiode (photoelectric conversion unit 151) increases, and therefore reduction of S/N differences at high illuminance connection portions is achievable.

Separation of the pixel transistors is achieved not only by the STI 71 but also by the FFTI 70. Accordingly, the region for the pixel transistors is reliably produced even in a case where a penetration trench is formed. Neither the SCF 108 nor the P-type semiconductor region 107 is provided on the side wall of the FFTI 70 near the N+ diffusion layer region (FD portion). This configuration can reduce leak current from the N+ diffusion layer.

Readout is carried out three times by using the three types of conversion efficiency. This configuration can reduce deterioration of S/N differences at the connection portions.

While described in the above embodiment has been the case where the three FD portions are provided, a configuration including the three FD portions or more may be adopted. The one MIM capacitive element or more may be provided according to the number of the FD portions.

Fifth Embodiment

Figure 18:
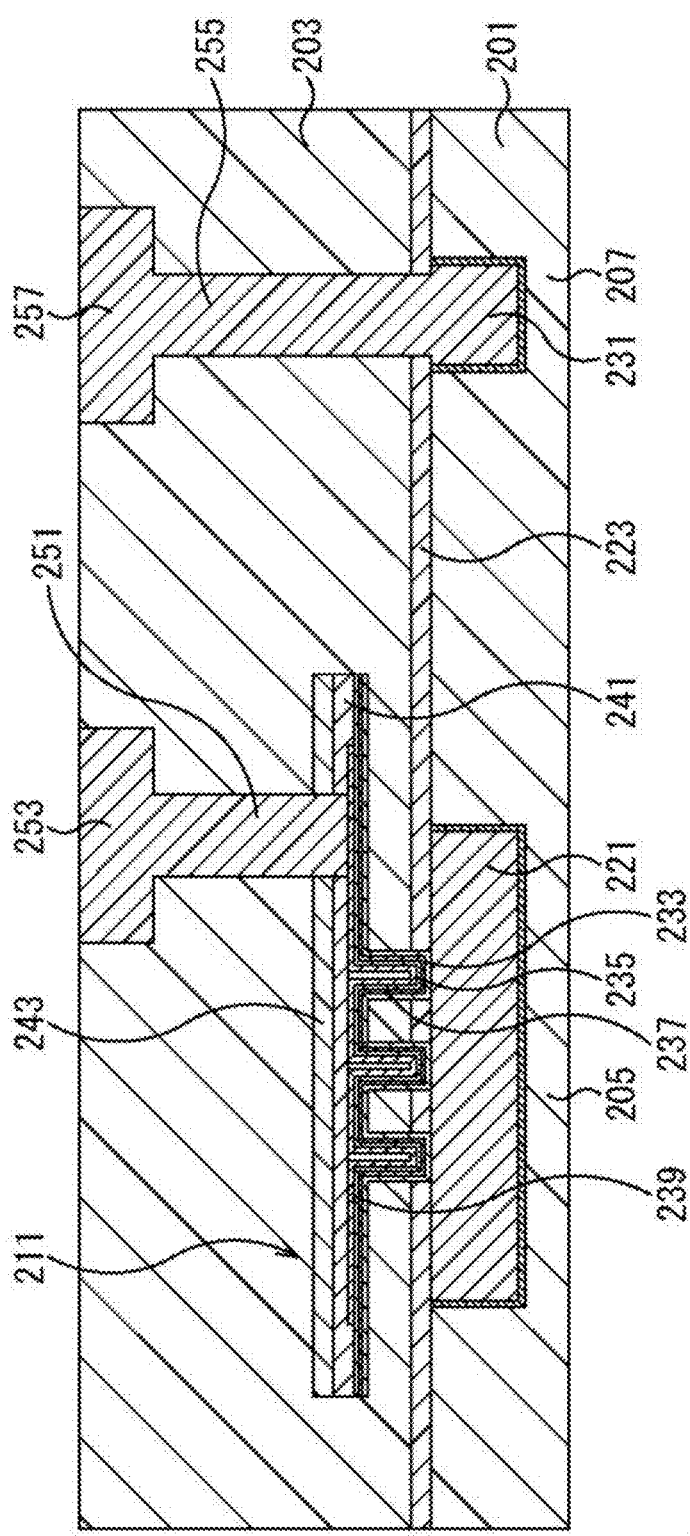
FIG. 18 is a diagram depicting a cross-sectional configuration example of an MIM capacitive element according to a fifth embodiment.

FIG. 18 is a diagram depicting a cross-sectional configuration example of an MIM capacitive element included in the pixel 2 according to a fifth embodiment. An MIM capacitive element 211 according to the fifth embodiment can be implemented by combining the first embodiment to the fourth embodiment.

A wiring layer 201 and a wiring layer 203 are laminated. The MIM capacitive element 211 is formed in the wiring layer 203. The wiring layer 201 and the wiring layer 203 will be referred to as a lower layer and an upper layer, respectively, where appropriate. The lower side of the MIM capacitive element 211 depicted in FIG. 18 in the figure corresponds to the light entrance surface side of the pixel 2. For example, the MIM capacitive element 211 in the figure is a vertically inverted illustration of the MIM capacitive element 58 in FIG. 7.

The lower side of the MIM capacitive element 211 in the figure is connected to a lower layer wire 221 formed in the wiring layer 201. The upper side of the MIM capacitive element 211 in the figure is connected by a via 251 to an upper layer wire 253 connected to a wiring layer in an upper layer. For example, a material constituting the lower layer wire 221 and the upper layer wire 253, and a material filling an interior of the via 251 may be Cu (copper).

An electrode provided for connecting to a wire within a different wiring layer is formed in a region other than a region where the MIM capacitive element 211 is provided, i.e., a region in a right part in FIG. 18. A lower layer wire 231 is formed in the wiring layer 201. An upper layer wire 257 is formed in the wiring layer 203. The lower layer wire 231 and the upper layer wire 257 are connected to each other by a via 255. For example, a material constituting the lower layer wire 231 and the upper layer wire 257, and a material filling an interior of the via 255 may be Cu (copper).

A block film 223 is formed between the wiring layer 201 and the wiring layer 203. For example, the block film 223 may include SiCN (silicon carbonitride) or SiN (silicon nitride).

The MIM capacitive element 211 has a U-shaped three-dimensional structure, and is configured to produce relatively large capacitance by using a small mounting area. The MIM capacitive element 211 has a such configuration where barrier metal 233, a lower electrode 235, an insulation film 237, and an upper electrode 239 are laminated in this order from the lower layer wire 221 side. The upper electrode 239 is covered with the block film 241 (SiCN or SiN). Moreover, an etching stopper film 243 is laminated on the block film 241.

For example, the barrier metal 233 may include Ta (tantalum). For example, the lower electrode 235 and the upper electrode 239 may include TiN (titanium nitride). For example, the insulation film 237 may include a material called high-k and may constitute a high permittivity insulation film (high permittivity film) including a material having higher relative permittivity than that of insulation films such as SiO2 (silicon dioxide). In a case where the insulation film 237 is a high-k film, the insulation film 237 may include a material such as Al2O3 (aluminum oxide) and HfO2 (hafnium oxide). Either a single layer including any one of these materials, or a multilayer structure including a combination of these materials may be adopted.

The etching stopper film 243 is a film provided to stop etching during formation of the via 251. For example, the etching stopper film 243 having high selectivity may include a metallic oxide or a metallic nitride containing Ti (titanium), Ta (tantalum), Al (aluminum), Zr (zirconium), Hf (hafnium), or the like.

The etching stopper film 243 is laminated on the MIM capacitive element 211. Accordingly, the via 251 and the via 255 are allowed to be simultaneously formed.

The via 251 is formed by processing the wiring layer 203 by only a length L1 from an upper surface of the wiring layer 203 to the block film 241. The via 255 is formed by processing the wiring layer 203 by only a length L2 from the upper surface of the wiring layer 203 to the block film 223. The length L1 and the length L2 are different lengths, and have a relation of "length L1<length L2."

If the etching stopper film 243 is not formed in a case of simultaneous formation of the via 251 and the via 255 having the length L1 and the length L2, respectively, which are different lengths to be processed, there is a possibility that the via having the shorter length L1 is more excessively processed than the via having the length L2. In the case of the configuration where the etching stopper film 243 is not laminated, the via 251 and the via 255 are formed by different steps.

For simultaneously forming the via 251 and the via 255, etching of the via 251 reaching the desired processing length earlier than etching of the via 255 needs to be stopped earlier than the etching of the via 255. Accordingly, the etching stopper film 243 is provided on the MIM capacitive element 211 side as depicted in FIG. 18 to provide a configuration capable of stopping the etching.

The etching stopper film 243 thus provided can stop the etching of the via 251 at the time of completion of processing by the length L1 to form the via 251. On the other hand, the etching of the via 255 is so controlled as to be stopped at the time of completion of processing by the length L2 to form the via 255. In other words, the via 251 and the via 255 can be simultaneously formed by adjusting time and intensity of etching to those sufficient for forming the via 255.

<Manufacture of Pixel According to Fifth Embodiment>

Manufacture of the pixel 2 which includes the MIM capacitive element 211 having the etching stopper film 243 depicted in FIG. 18 will be described with reference to FIG.

19. The description with reference to FIG. 19 will be explanation about simultaneous formation of a contact (via 251) connected to the MIM capacitive element 211, and a contact (via 255) formed in a region other than the MIM capacitive element 211.

In step S11, the wiring layer 203 including the MIM capacitive element 211 is prepared. In a step prior to step S11 herein, the wiring layer 201 containing the lower layer wire 231, and the wiring layer 203 containing the MIM capacitive element 211 are laminated, and the etching stopper film 243 is formed on these layers.

In step S12, the via 251 and the via 255 are formed. In step S12 herein, the via 251 formed in the region of the MIM capacitive element 211 is processed up to the etching stopper film 243, while the via 255 formed in the region other than the MIM capacitive element 211 is processed up to the block film 223. The etching stopper film 243 thus provided allows simultaneous formation of the vias having different processing lengths, i.e., the vias having different time lengths for processing.

In step S13, a region constituting the upper layer wire 253, and a region constituting the lower layer wire 257 are formed. During step S13, breaking of the block film 241 and the block film 223 is also performed. In the region where the MIM capacitive element 211 is formed, the etching stopper film 243 and the block film 223 within the region constituting the via 251 is removed to connect the via 251 and the upper electrode 239. The block film 223 within the region constituting the via 255 is removed to connect the via 255 and the lower layer wire 231.

In step S14, each of the via 251, the region constituting the upper layer wire 253, the via 255, and the region constituting the upper layer wire 257 is filled with a conductive material, such as Cu (copper), to form wires.

The etching stopper film 243 thus provided for the MIM capacitive element 211 as described above allows simultaneous formation of the vias having different processing lengths, i.e., the vias having different time lengths for processing.

Note that the block film 241 having a thickness larger than the thickness of the block film 223 may be provided rather than forming the etching stopper film 243. The via 251 and the via 255 have different lengths, and therefore require different time lengths for processing. The block film 241 may be configured to have a thickness sufficient for absorbing a difference between the required processing time lengths.

While the example of the via 251 formed in the region of the MIM capacitive element 211, and the via 255 formed in the region other than the MIM capacitive element 211 has been explained in the embodiment described above, the present embodiment is also applicable to a semiconductor substrate containing a mixture of vias requiring processing of different lengths. Vias having different lengths can be simultaneously formed by using a semiconductor substrate containing a mixture of regions including the etching stopper film 243, and regions not including the etching stopper film 243 according to time lengths necessary for processing.

Sixth Embodiment

Figure 20:
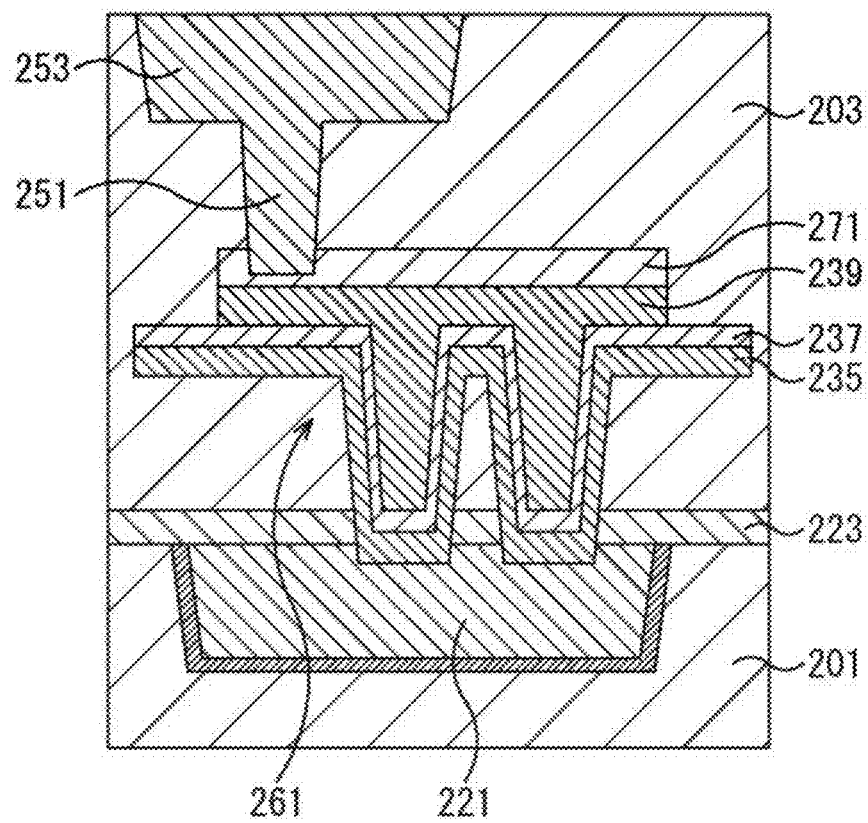
FIG. 20 is a diagram depicting a cross-sectional configuration example of an MIM capacitive element according to a sixth embodiment.

FIG. 20 is a diagram depicting a cross-sectional configuration example of an MIM capacitive element included in the pixel 2 according to a sixth embodiment. An MIM capacitive element 261 according to the sixth embodiment can be implemented by combining the first embodiment to the fifth embodiment.

Parts included in the MIM capacitive element 261 according to the sixth embodiment depicted in FIG. 20 and identical to the corresponding parts of the MIM capacitive element 211 of the fifth embodiment depicted in FIG. 18 will be given identical reference numbers, and will not be repeatedly explained. FIG. 20 is an enlarged illustration of a part of the MIM capacitive element 261. The MIM capacitive element 261 depicted in FIG. 20 is similar to the MIM capacitive element 211 depicted in FIG. 18 except for a point that a metallic film 271 include a metallic material is formed instead of the block film 223 and the etching stopper film 243.

The metallic film 271 thus formed can prevent generation of fluoride during processing of the via 251. Touched upon herein with reference to FIG. 21 will be generation of fluoride caused if a configuration not including the metallic film 271 is adopted. The MIM capacitive element 261 is depicted in a simplified form in FIG. 21 and following figures.

Figure 21:
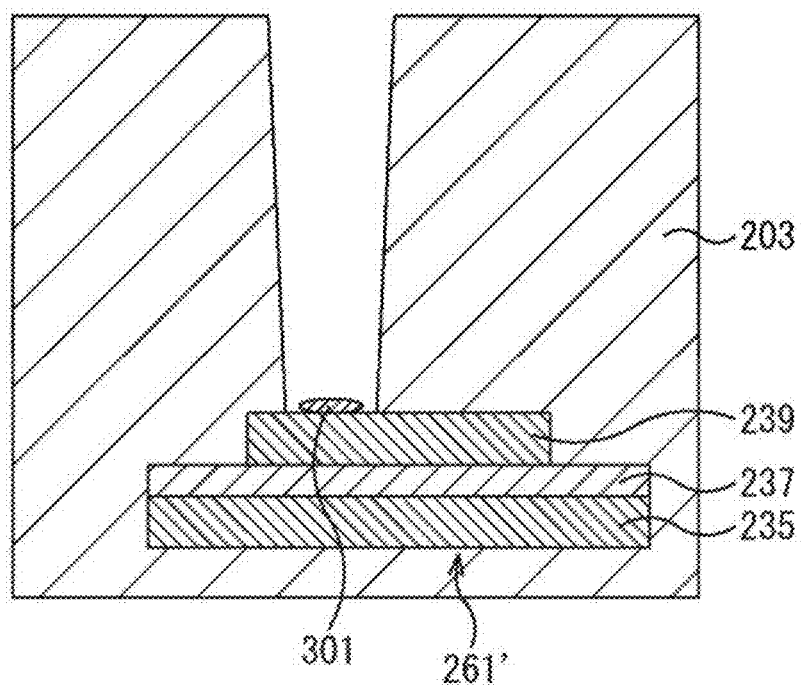
FIG. 21 is a diagram for explaining generation of a residue.

An MIM capacitive element 261' (the MIM capacitive element 261 not including the metallic film 271 will be hereinafter denoted with a dash) depicted in FIG. 21 has a configuration where the lower electrode 235, the insulation film 237, and the upper electrode 239 are laminated. Suppose that the wiring layer 203 is processed to form a via for the MIM capacitive element 261' having this laminated configuration.

The wiring layer 203 includes an oxide film including SiO or the like as an interlayer dielectric. For processing the wiring layer 203 which is an oxide film, F-based (fluorinated) gas is used. During processing using F-based gas, TiN (titanium nitride) constituting the upper electrode 239 may be processed. When TiN is processed by F-based gas, a TiF-based residue 301 may be generated. Generation of the residue 301 may deteriorate a yield and may increase resistance of the MIM capacitive element 261'. Accordingly, generation of the residue 301 needs to be prevented.

Figure 22:
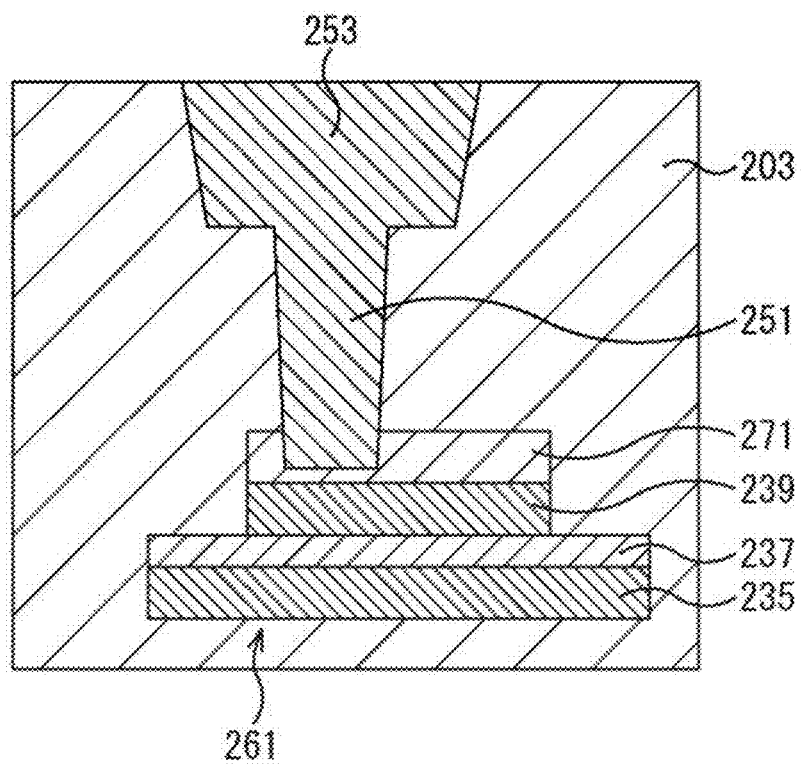
FIG. 22 is a diagram depicting a cross-sectional configuration example of the MIM capacitive element.

As depicted in FIGS. 20 and 22, generation of the residue 301 can be prevented by forming the metallic film 271 on the upper electrode 239 (TiN) of the MIM capacitive element 261. FIG. 22 is a simplified diagram of the MIM capacitive element 261 depicted in FIG. 20. As depicted in FIG. 22, a distal end of the via 251 is connected to the upper electrode 239 via the metallic film 271.

The via 251 is processed in a state where the metallic film 271 remains between the via 251 and the upper electrode 239. In such a manner, reaction between the F-based gas and the TiN constituting the upper electrode 239 is avoidable during processing of the via 251 by using the F-based gas. Accordingly, generation of the residue 301 is preventable.

The metallic film 271 may include a metal having lower bond energy with the F-based gas than Ti (titanium) (designated as condition 1). By using a metal meeting condition 1, bond energy produced at the time of bonding of the metallic film 271 by the F-based gas is low even if this bonding occurs. Accordingly, the bonding is easily decomposed, and therefore generation of the residue 301 is allowed to decrease by the presence of the metallic film 271.

The metallic film 271 includes a metal constituting fluoride having a higher vapor pressure of metal fluoride than a vapor pressure of TiF (titanium fluoride) (designated as condition 2). A metal meeting condition 2 is easily removable by heat. Accordingly, if the residue 301 is generated by reaction between the metallic film 271 and the F-based gas, the residue 301 can be easily removed by heat.

Metals meeting both or either one of condition 1 and condition 2 are adopted as the material of the metallic film 271. Examples of the metal constituting the metallic film 271 include W (tungsten), Ge (germanium), In (indium), Mo (molybdenum), Mn (manganese), Ni (nickel), Sb (antimony), Co (cobalt), Cu (copper), Lu (lutetium), Ru (ruthenium), Bi (bismuth), Ag (silver), Au (gold), Ir (iridium), Ta (tantalum), and Nb (niobium).

The metallic film 271 thus provided allows manufacture of the MIM capacitive element 261 while reducing generation of the residue 301.

The etching stopper film 243 of the MIM capacitive element 211 according to the fifth embodiment described above may be replaced with the metallic film 271. In this case, vias having different lengths can be formed by the same step as described in the fifth embodiment.

While described in the above embodiment has been the example where the two layers constituted by the upper electrode 239 including TiN and the metallic film 271 are formed, for example, adoptable is such a configuration where the upper electrode 239 itself is constituted by the metallic film 271, i.e., a configuration where only a single layer of the metallic film 271 is formed.

<Manufacture of Pixel According to Sixth Embodiment>

Figure 23:
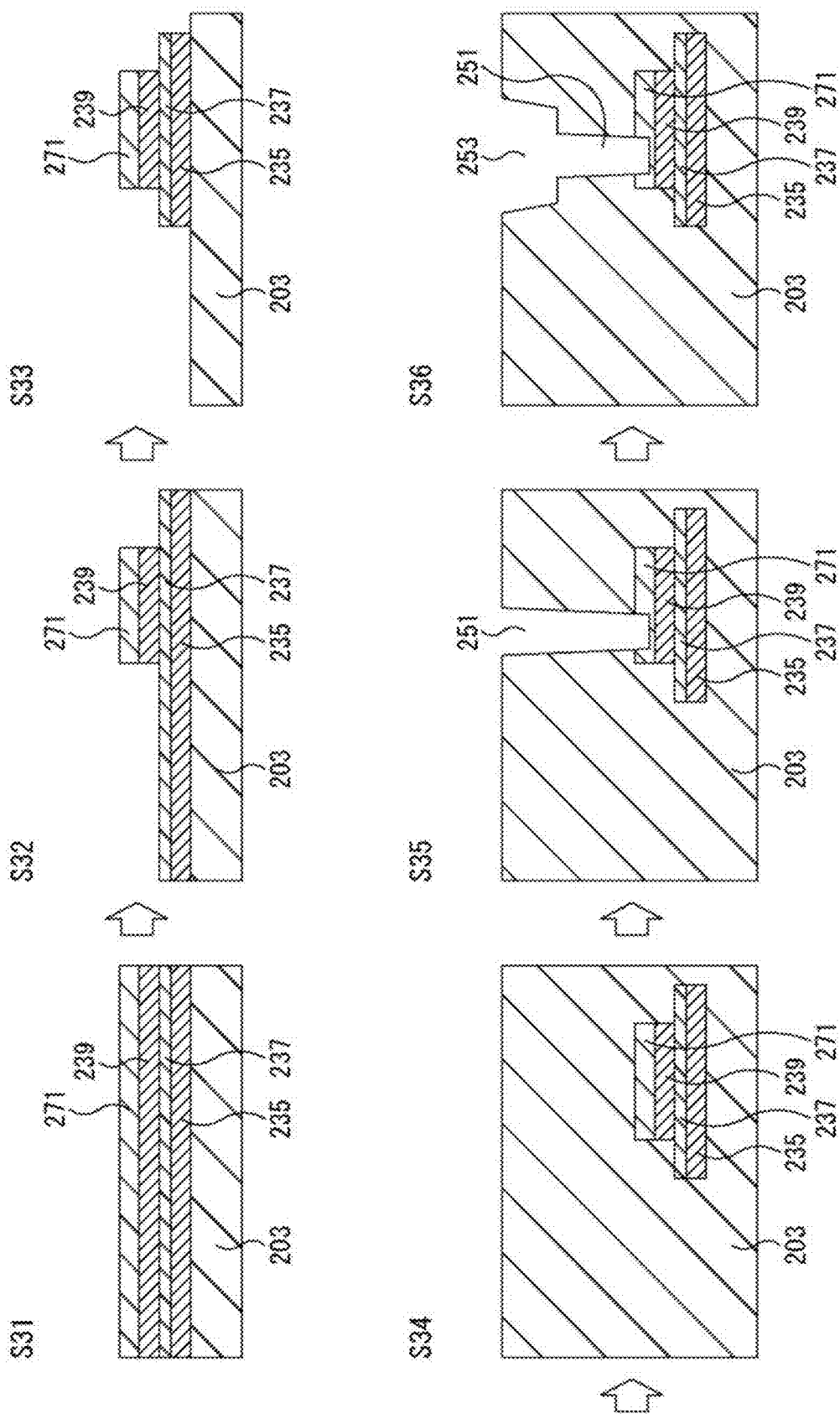
FIG. 23 is a diagram for explaining manufacture of the MIM capacitive element.

Manufacture of the pixel 2 which includes the MIM capacitive element 261 having the metallic film 271 depicted in FIG. 22 will be described with reference to FIG. 23.

In step S31, the lower electrode 235, the insulation film 237, the upper electrode 239, and the metallic film 271 each constituting the MIM capacitive element 261 are formed in the wiring layer 203.

In step S32, the upper electrode 239 and the metallic film 271 located in a region other than a region constituting the upper electrode 239 and a region constituting the metallic film 271 laminated on the upper electrode 239 are removed to form the upper electrode 239.

In step S33, the lower electrode 235 and the insulation film 237 located in a region other than a region constituting the lower electrode 235 and a region constituting the insulation film 237 laminated on the lower electrode 235 are removed to form the lower electrode 235.

In step S34, a lamination of the lower electrode 235, the insulation film 237, the upper electrode 239, and the metallic film 271 is enclosed within an interlayer dielectric formed in this step to form a portion corresponding to the wiring layer 203.

In step S35, the contact (via 251) for the MIM capacitive element 261 is formed. The via 251 is formed by processing the metallic film 271 such that a small amount of the metallic film 271 is left. If the metallic film 271 is not formed, reaction between F-based gas and TiN of the upper electrode 239 is caused during formation of the via 251 in step S35. In this case, the residue 301 may be generated by the reaction. However, the metallic film 271 formed while meeting condition 1 and condition 2 can prevent generation of the residue 301.

In step S36, a region constituting the upper layer wire 253 is formed. While not depicted in the figure, each of the regions constituting the via 251 and the upper layer wire 253 is subsequently filled with a conductive material such as Cu (copper) to form wires.

As described above, the metallic film 271 thus formed can prevent generation of the residue 301 during manufacture, and therefore can prevent deterioration of a yield, and an increase in resistance of the MIM capacitive element 261.

Seventh Embodiment

Figure 24:
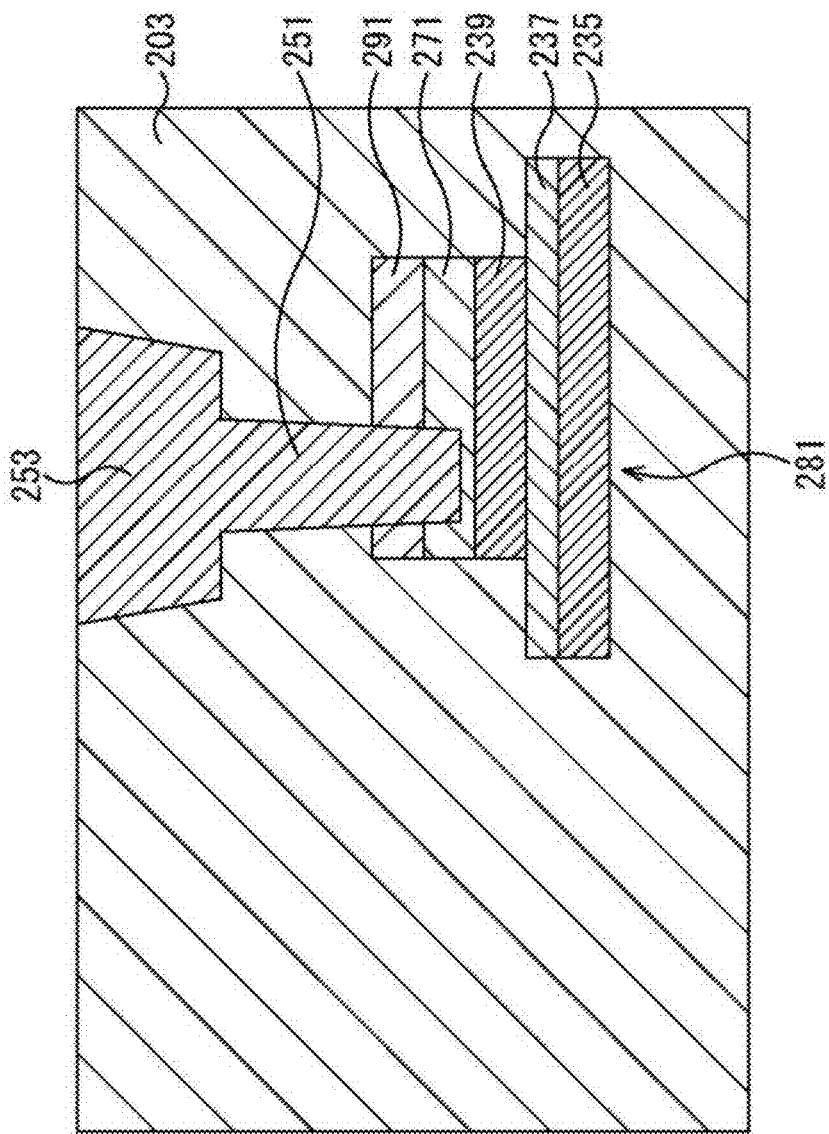
FIG. 24 is a diagram depicting a cross-sectional configuration example of an MIM capacitive element according to a seventh embodiment.

FIG. 24 is a diagram depicting a cross-sectional configuration example of an MIM capacitive element included in the pixel 2 according to a seventh embodiment. An MIM capacitive element 281 according to the seventh embodiment can be implemented by combining the first embodiment to the sixth embodiment.

Parts included in the MIM capacitive element 281 according to the seventh embodiment depicted in FIG. 24 and identical to the corresponding parts of the MIM capacitive element 261 of the sixth embodiment depicted in FIG. 22 will be given identical reference numbers, and will not be repeatedly explained. FIG. 24 is an enlarged illustration of a part of the MIM capacitive element 281. The MIM capacitive element 281 depicted in FIG. 24 is similar to the MIM capacitive element 261 depicted in FIG. 22 except for a point that an etching stopper film 291 is further formed on the metallic film 271 of the MIM capacitive element 261.

The etching stopper film 291 further provided on the metallic film 271 allows formation of vias requiring different processing lengths by the same step as described in the fifth embodiment. The etching stopper film 291 may include the same material as the material of the etching stopper film 243 (FIG. 18), such as a metallic oxide or a metallic nitride containing Ti (titanium), Ta (tantalum), Al (aluminum), Zr (zirconium), Hf (hafnium), or the like.

The etching stopper film 243 may also include the same material as the material of the block film 241 (FIG. 18), such as SiCN (silicon carbonitride) and SiN (silicon nitride).

In a configuration including the etching stopper film 291, vias having different lengths can be simultaneously formed. In addition, the metallic film 271 itself need not have a function as an etching stopper. Accordingly, the metal constituting the metallic film 271 can be selected from a wider range of choices.

<Manufacture of Pixel According to Seventh Embodiment>

Figure 25:
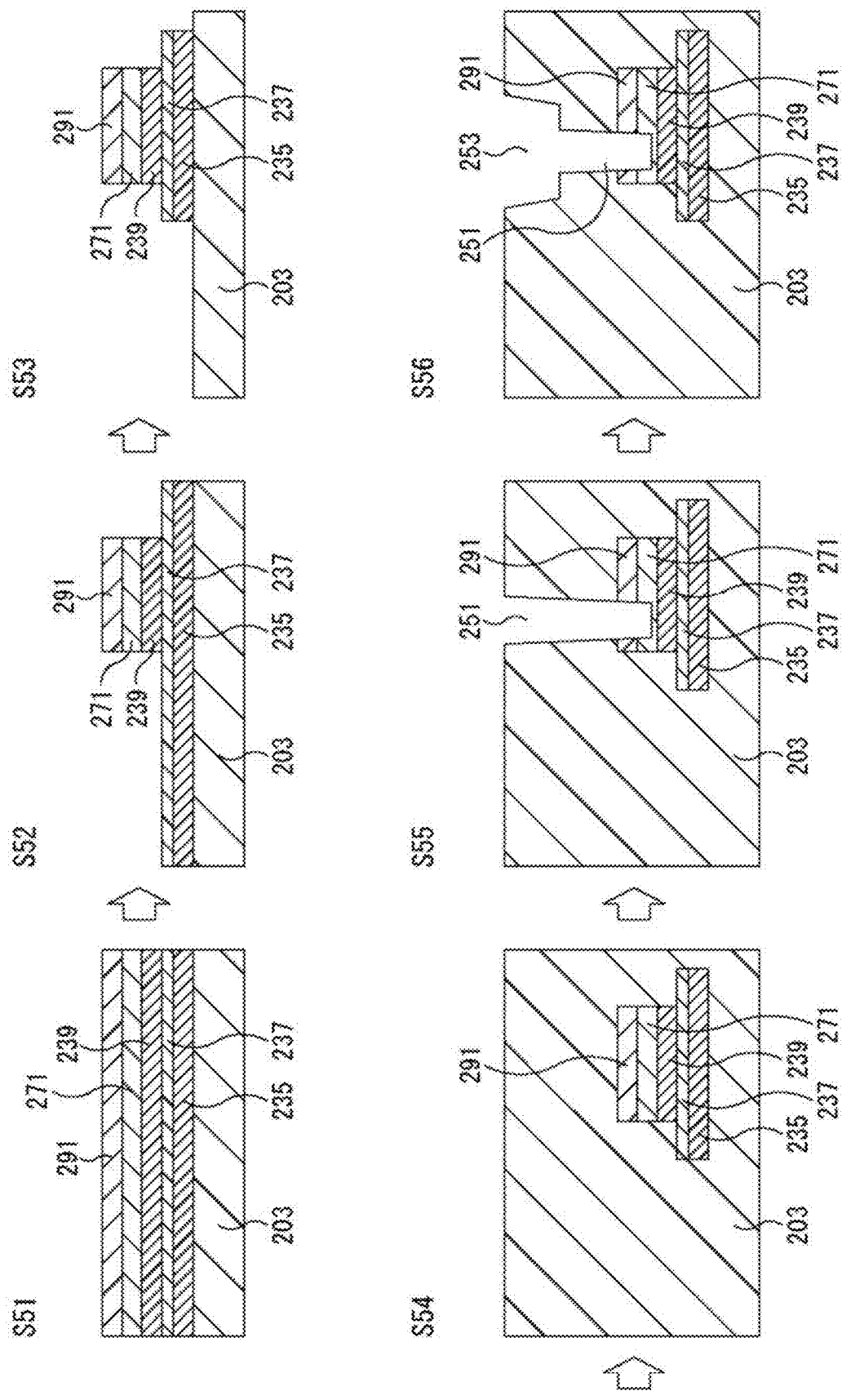
FIG. 25 is a diagram for explaining manufacture of the MIM capacitive element.

Manufacture of the pixel 2 which includes the MIM capacitive element 281 having the etching stopper film 291 and the metallic film 271 depicted in FIG. 24 will be described with reference to FIG. 25.

In step S51, the lower electrode 235, the insulation film 237, the upper electrode 239, the metallic film 271, and the etching stopper film 291 each constituting the MIM capacitive element 281 are formed in the wiring layer 203.

In step S52, the upper electrode 239, the metallic film 271, and the etching stopper film 291 located in a region other than a region constituting the upper electrode 239, and a region constituting the region of the metallic film 271 and the etching stopper film 291 laminated on the upper electrode 239 are removed to form the upper electrode 239.

In step S53, the lower electrode 235 and the insulation film 237 located in a region other than a region constituting the lower electrode 235 and a region constituting the insulation film 237 laminated on the lower electrode 235 are removed to form the lower electrode 235.

In step S54, a lamination of the lower electrode 235, the insulation film 237, the upper electrode 239, the metallic film 271, and the etching stopper film 291 is enclosed within an interlayer dielectric formed in this step to form a portion corresponding to the wiring layer 203.

In step S55, the contact (via 251) for the MIM capacitive element 281 is formed. The via 251 is formed by processing up to the etching stopper film 291. If the via 251 and a different via required to be processed up to a deeper position than the position of the via 251 are simultaneously formed during formation of the via 251 in step S55 herein in a configuration not including the etching stopper film 291, the via 251 may be excessively processed up to a deeper position beyond necessity. The configuration including the etching stopper film 291 allows simultaneous formation of the via 251 and a different via having a different processing length.

In step S56, a region constituting the upper layer wire 253 is formed. During step S56, the etching stopper film 291 is broken, and the via 251 is processed up to the metallic film 271. If the metallic film 271 is not formed, reaction between F-based gas and TiN of the upper electrode 239 is caused during formation of the via 251 in step S56 herein. In this case, the residue 301 may be generated by the reaction. However, the metallic film 271 meeting condition 1 and condition 2 formed as described above can prevent generation of the residue 301.

While not depicted in the figure, after step S56, each of the regions constituting the via 251 and the upper layer wire 253 is filled with a conductive material such as Cu (copper) to form wires.

As described above, the etching stopper film 291 thus provided allows simultaneous formation of the vias requiring different time lengths for processing. The metallic film 271 formed beforehand can prevent generation of the residue 301 during manufacture, and therefore can prevent deterioration of a yield, and an increase in resistance of the MIM capacitive element 281.

Eighth Embodiment

Figure 26:
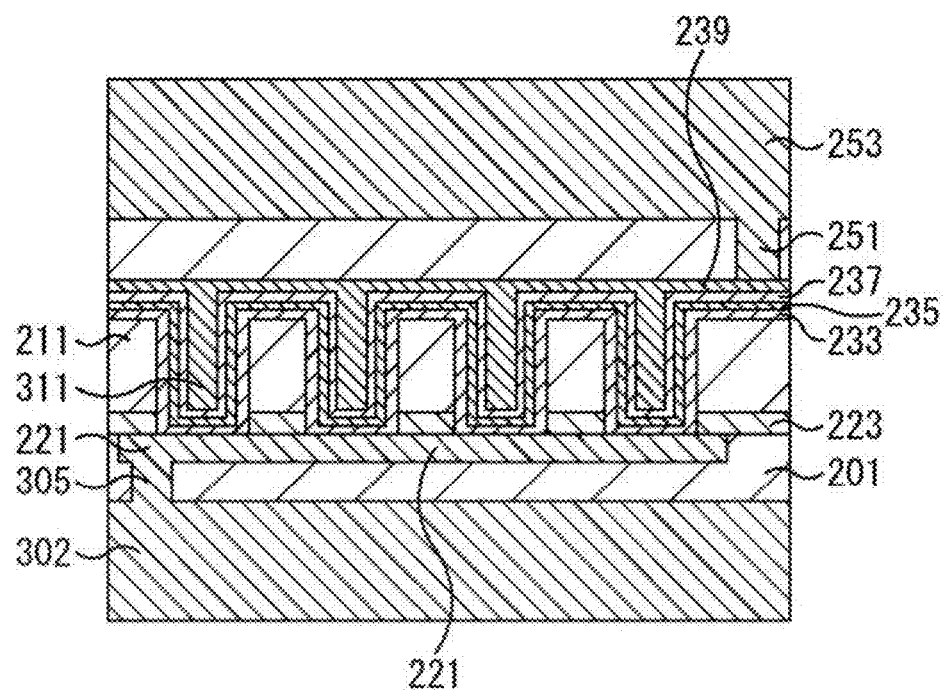
FIG. 26 is a diagram depicting a cross-sectional configuration example of an MIM capacitive element according to an eighth embodiment.

FIG. 26 is a diagram depicting a cross-sectional configuration example of an MIM capacitive element included in the pixel 2 according to an eighth embodiment. The MIM capacitive element 211 according to the eighth embodiment can be implemented by combining the first embodiment to the seventh embodiment.

FIG. 26 is an enlarged illustration of a part of the MIM capacitive element 211. Parts included in the MIM capacitive element 211 depicted in FIG. 26 and similar to the corresponding parts of the MIM capacitive element 211 depicted in FIG. 18 will be given similar reference numbers, and will not be repeatedly explained where appropriate.

The lower side of the MIM capacitive element 211 in the figure is connected to the lower layer wire 221 formed in the wiring layer 201. The lower layer wire 221 has a smaller thickness than the lower layer wire 221 depicted in FIG. 221. For example, the thickness of the lower layer wire 221 is larger than 20 nm, and smaller than 50 nm.

For example, the lower layer wire 221 is a Cu (copper) wire. For example, the lower layer wire 221 is produced by a generally-called damascene process, i.e., by forming a groove in an insulation film, embedding Cu into this groove, and removing unnecessary Cu located in an area other than the groove. CMP (chemical mechanical polishing) is applied to remove Cu. In this case, not a small amount of Cu embedded in the groove is removed by polishing carried out for the removal (Dishing). For controlling the amount of Cu removed during polishing (Dishing control), a thickness of approximately 10 nm of is necessary for Cu.

A portion for connection between the lower layer wire 221 and the MIM capacitive element 211 requires an etching step to embed the MIM capacitive element 211. Considering over-etching during etching, a thickness of approximately 10 nm is needed for Cu. Moreover, considering production variations, the lower layer wire 221 has a thickness larger than 20 nm as described above.

In a step including formation of the MIM capacitive element 211, a part of the lower layer wire 221 may be diffused within the MIM capacitive element 211 by heat or stress (warp) applied to the lower layer wire 221. In this case, desired characteristics of the MIM capacitive element 211 may be difficult to achieve. Defects caused by heat or stress can be reduced by reducing the thickness of the lower layer wire 221. A shift of Cu caused by thermal expansion force is more accelerated as the thickness of the lower layer wire 221, i.e., the amount of Cu increases. Accordingly, this shift can be reduced by reducing the amount of CU.

The lower layer wire 221 connected to the MIM capacitive element 211 is provided to apply potential to the MIM capacitive element 211, and does not supply current to the MIM capacitive element 211. Accordingly, performance of the image sensor is not lowered even by reduction of the thickness of the lower layer wire 221. The reduction of the thickness of the lower layer wire 221 can reduce coupling with the power voltage VDD. Accordingly, performance for pixel characteristics can also improve.

As apparent from above, defects can be reduced by reducing the thickness of the lower layer wire 221 to a thickness of 50 nm or smaller as described above, for example. For example, the lower layer wire 221 depicted in FIG. 26 has a film thickness approximately in a range from one fifth to a half of a film thickness of the lower layer wire 221 depicted in FIG. 18 and having an ordinary film thickness.

While the barrier metal 233 is provided on a portion included in the MIM capacitive element 211 and in contact with the lower layer wire 221 in the example depicted in FIG. 26 similarly to the case of FIG. 18, also adoptable is such a configuration which includes the lower electrode 235 having a diffusion preventive function for Cu and eliminating barrier metal 335, for example. The configuration eliminating the barrier metal 233 may be produced by increasing a thickness of TiN constituting the lower electrode 235, for example.

The lower layer wire 221 is connected to a wire 302 different from the lower layer wire 221 by via holes 305. Interiors of the via holes 305 are similarly filled with Cu. Accordingly, it is considered that the amount of Cu contained in the lower layer wire 221 is an amount including Cu within the via holes 305. In a case where protruded portions of the MIM capacitive element 211 correspond to trenches 311, the trenches 311 and the via holes 305 are arranged such that the trenches 311 do not overlap with the via holes 305 in a planar view, and that the trenches 311 are not aligned with the via holes 305 in a cross-sectional view.

Figure 27:
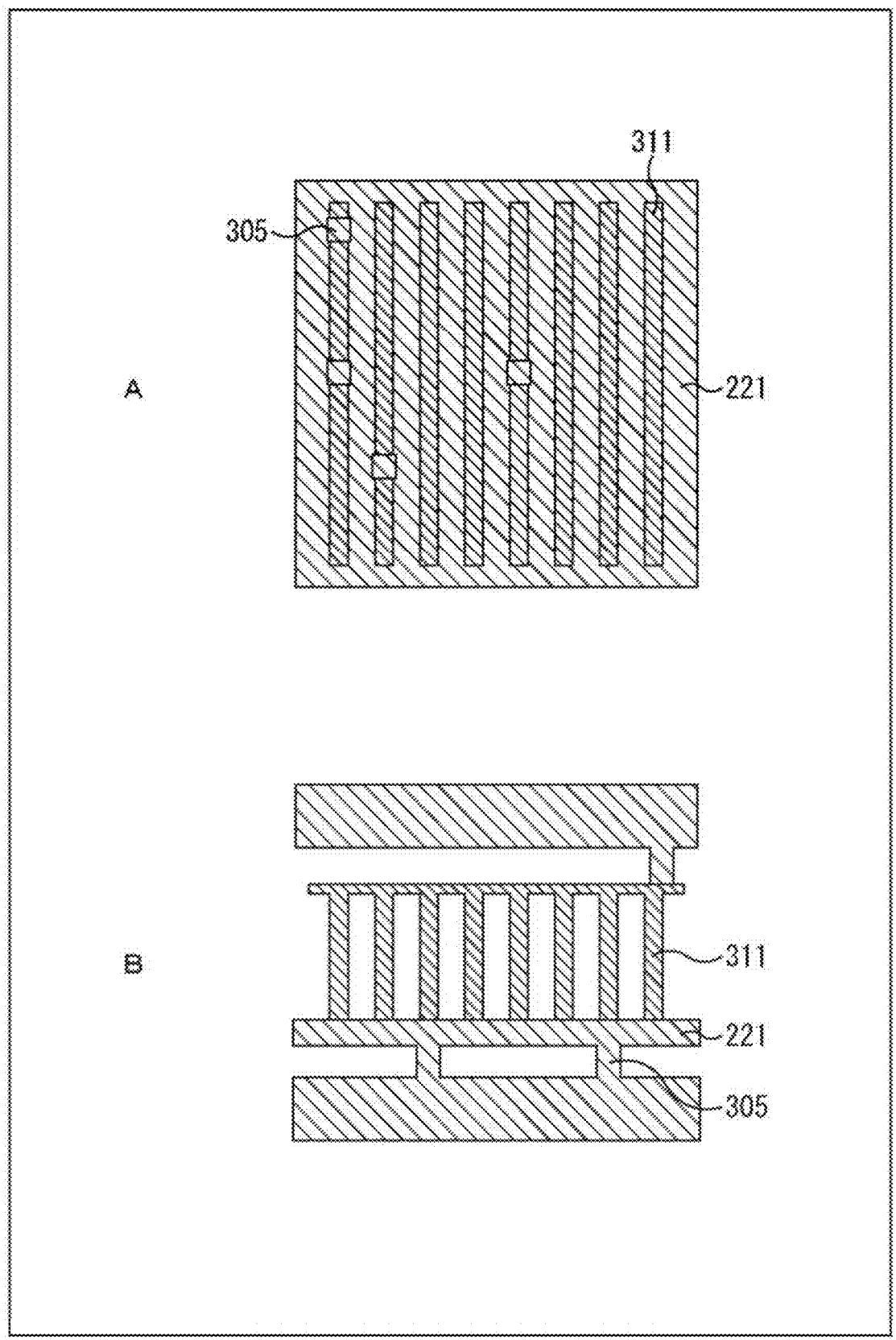
FIG. 27 is a diagram for explaining a positional relation between vias and trenches.

A in FIG. 27 depicts a planar configuration example of the MIM capacitive element 211 arranged such that the trenches 311 and the via holes 305 are overlapped with each other in the planar view, while B in FIG. 27 depicts a cross-sectional configuration example of the MIM capacitive element 211 arranged such that the trenches 311 and the via holes 305 are aligned with each other in the cross-sectional view.

As apparent from the planar configuration example and the cross-sectional configuration example depicted in A and B in FIG. 27, respectively, the multiple trenches 311 each having a linear shape are formed on the lower layer wire 221. The via holes 305 are formed at positions overlapping with the trenches 311.

As apparent from B in FIG. 27, a layer of Cu having a thickness of a sum of a height of the trench 311 and a height of the via hole 305 is formed at each overlap portion between the via hole 305 and the trench 311. Accordingly, the film thickness of Cu increases at the overlap portion between the via hole 305 and the trench 311. Stress increases at a junction portion between the lower layer wire 221 and the lower electrode 235 (trench 311) of the MIM capacitive element 211. This stress further increases as the film thickness of the lower layer wire 221 increases.

The film thickness of Cu is large at the overlap portion between the via hole 305 and the trench 311. Accordingly, stress applied to this portion is considered to increase. The via holes 305 are so arranged as to reduce this large stress portion as much as possible. Specifically, as depicted in FIG. 28, the via holes 305 are arranged at positions not overlapping with the trenches 311 in the planar view, and not aligned with the trenches 311 in the cross-sectional view.

Figure 28:
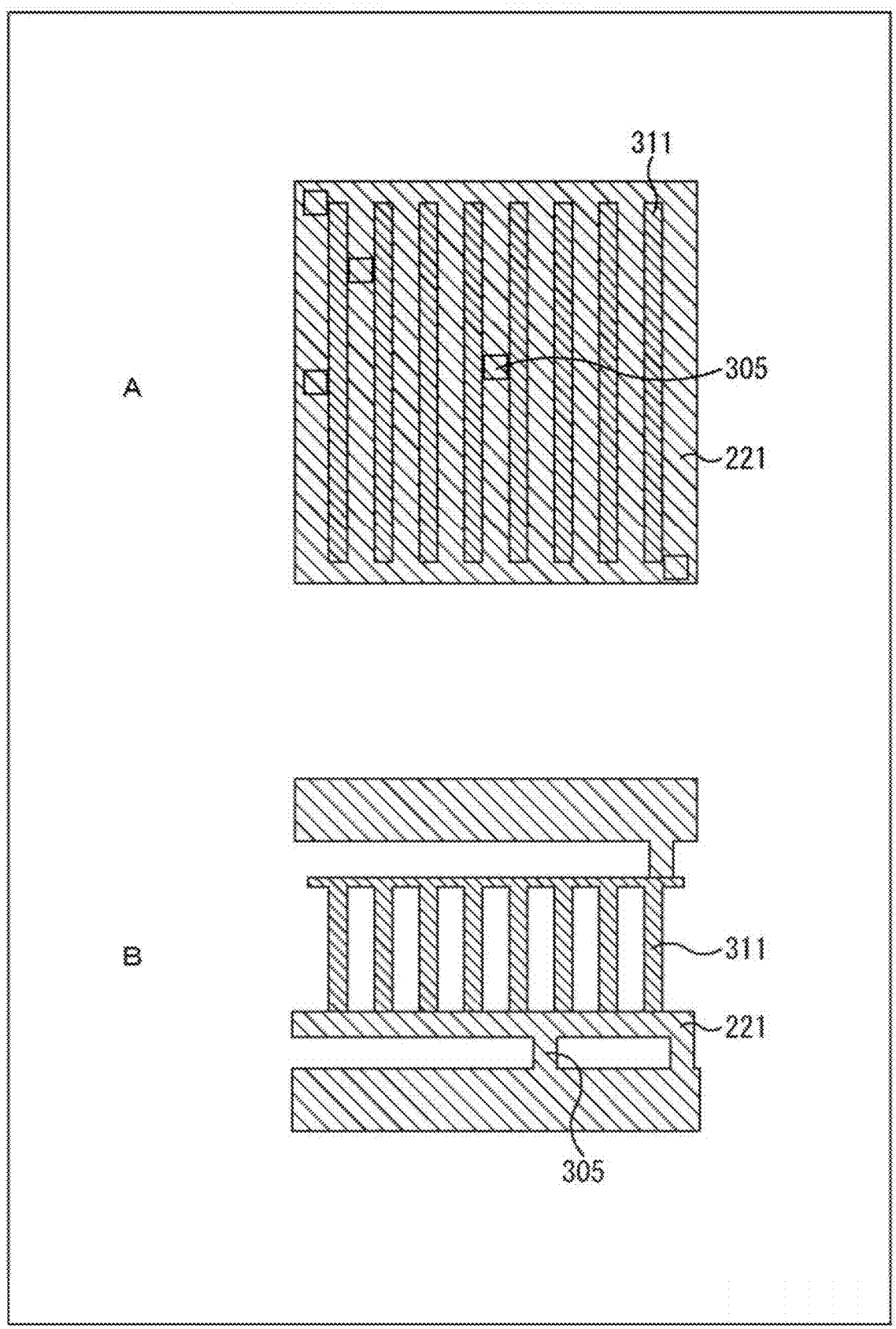
FIG. 28 is a diagram for explaining a positional relation between vias and trenches.

A in FIG. 28 depicts a planar configuration example of the MIM capacitive element 211 arranged such that the trenches 311 and the via holes 305 are not overlapped with each other in the planar view, while B in FIG. 28 depicts a cross-sectional configuration example of the MIM capacitive element 211 arranged such that the trenches 311 and the via holes 305 are not aligned with each other in the cross-sectional view.

As apparent from the planar configuration example and the cross-sectional configuration example depicted in A and B in FIG. 28, respectively, the multiple trenches 311 each having a linear shape are formed on the lower layer wire 221. The via holes 305 are formed at positions not overlapping with the trenches 311 in the planar view. In other words, the via holes 305 are formed between the respective trenches 311 in the planar view.

As apparent from B in FIG. 28, the via holes 305 are arranged such that no overlapping nor aligned portion is produced between the via holes 305 and the trenches 311.

In other words, the via holes 305 are arranged such that no portion having a film thickness of the sum of the height of the trench 311 and the height of the via hole 305 as the portion described with reference to FIG. 27 is produced. The film thickness of the lower layer wire 221 is reduced at the junction portion between the lower layer wire 221 and the lower electrode 235 (trench 311) of the MIM capacitive element 211. Accordingly, reduction of stress is achievable.

As depicted in FIG. 28, a plurality (five in FIG. 28) of the via holes 305 may be formed. In addition, as depicted in FIG. 28, the via holes 305 may be arranged not in a particular pattern.

Figure 29:
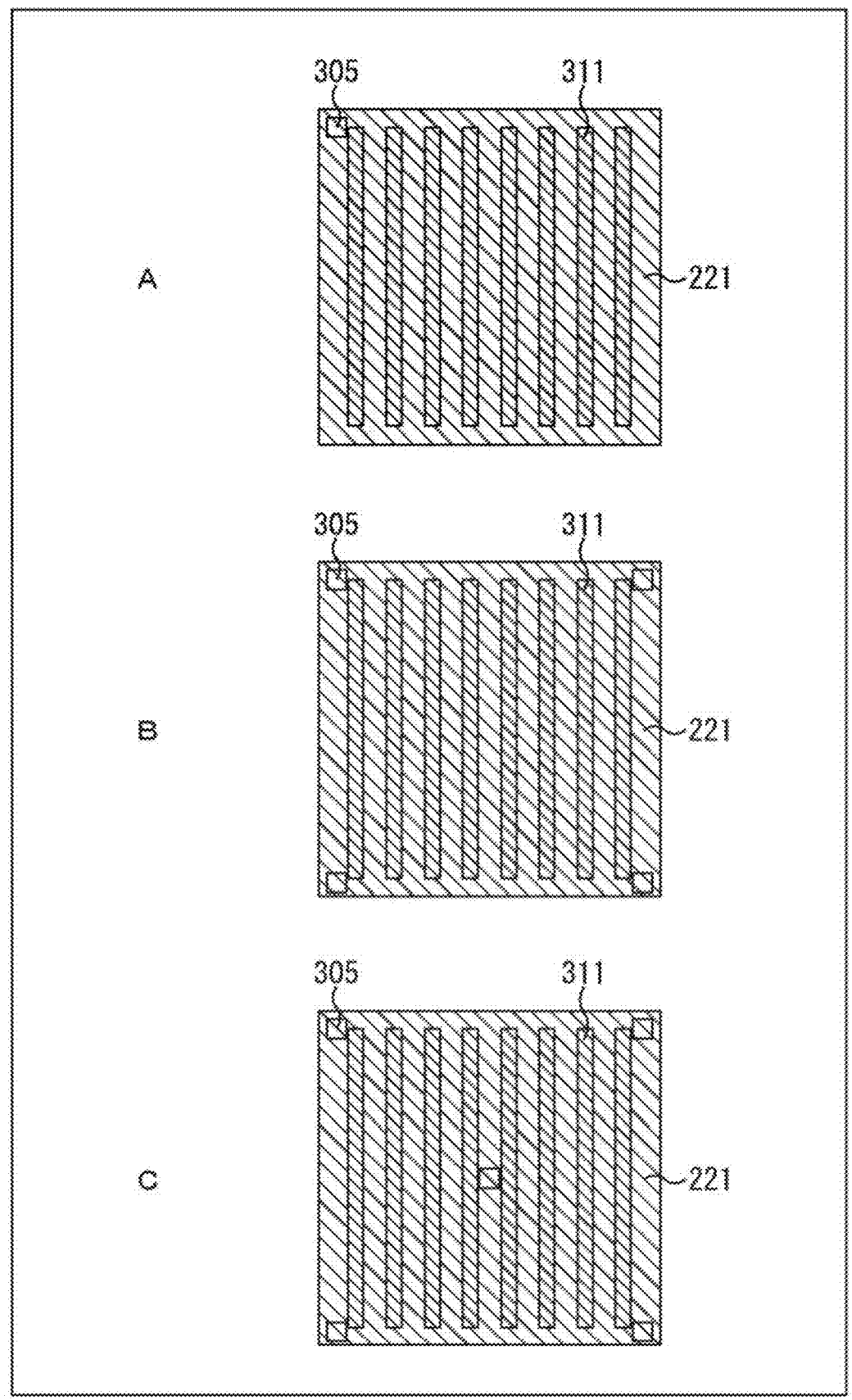
FIG. 29 is a diagram for explaining a positional relation between vias and trenches.

A in FIG. 29 is a diagram depicting a different arrangement example of the via holes 305. In the example depicted in A in FIG. 29, the one via hole 305 is formed at one corner of the region where the lower layer wire 221 is formed. The position and the number of the via holes 305 may be any position and number as long as potential can be supplied to the MIM capacitive element 211. In addition, a voltage drop need not be taken into consideration. Accordingly, the configuration including only the one via hole 305 as depicted in A in FIG. 29 may be adopted.

While A in FIG. 29 depicts the example where the one via hole 305 is formed at one corner of the region where the lower layer wire 221 is formed, i.e., out of the region where the trenches 311 are formed, the arrangement position of the one via hole 305 may be located at a portion other than the corner, such as the center of the region where the lower layer wire 221 is formed, and the center of one side of this region.

As depicted in B in FIG. 29, a configuration including the four via holes 305 may be adopted. As described above, the via holes 305 are only required to supply potential to the MIM capacitive element 211. Accordingly, the one via hole 305 is only required to be formed. However, a configuration including the multiple via holes 305 may be adopted as backup for any malfunction of the one via hole 305. For example, adoptable is such a configuration including the four via holes 305 arranged one for each of the four corners out of the region where the trenches 311 are formed as depicted in B in FIG. 29.

While the example forming the four via holes 305 has been described with reference to B in FIG. 29, a configuration including the two or three via holes 305 may be adopted.

As depicted in C in FIG. 29, a configuration including the five via holes 305 may be adopted. The example depicted in C in FIG. 29 is a configuration where the one via hole 305 located at the center of the region corresponding to the lower layer wire 221 is added to the four via holes 305 depicted in B in FIG. 9. In the example depicted in C in FIG. 29, the via holes 305 are formed one for each of the four corners and the center of the region corresponding to the lower layer wire 221.

According to the examples depicted in B and C in FIG. 29, the via holes 305 are equally arranged. By arranging the via holes 305 at equal positions within the region where the lower layer wire 221 is formed, potential supply can be equalized, and therefore the MIM capacitive element 211 functioning as a capacitive element can easily follow high-speed operations.

Figure 30:
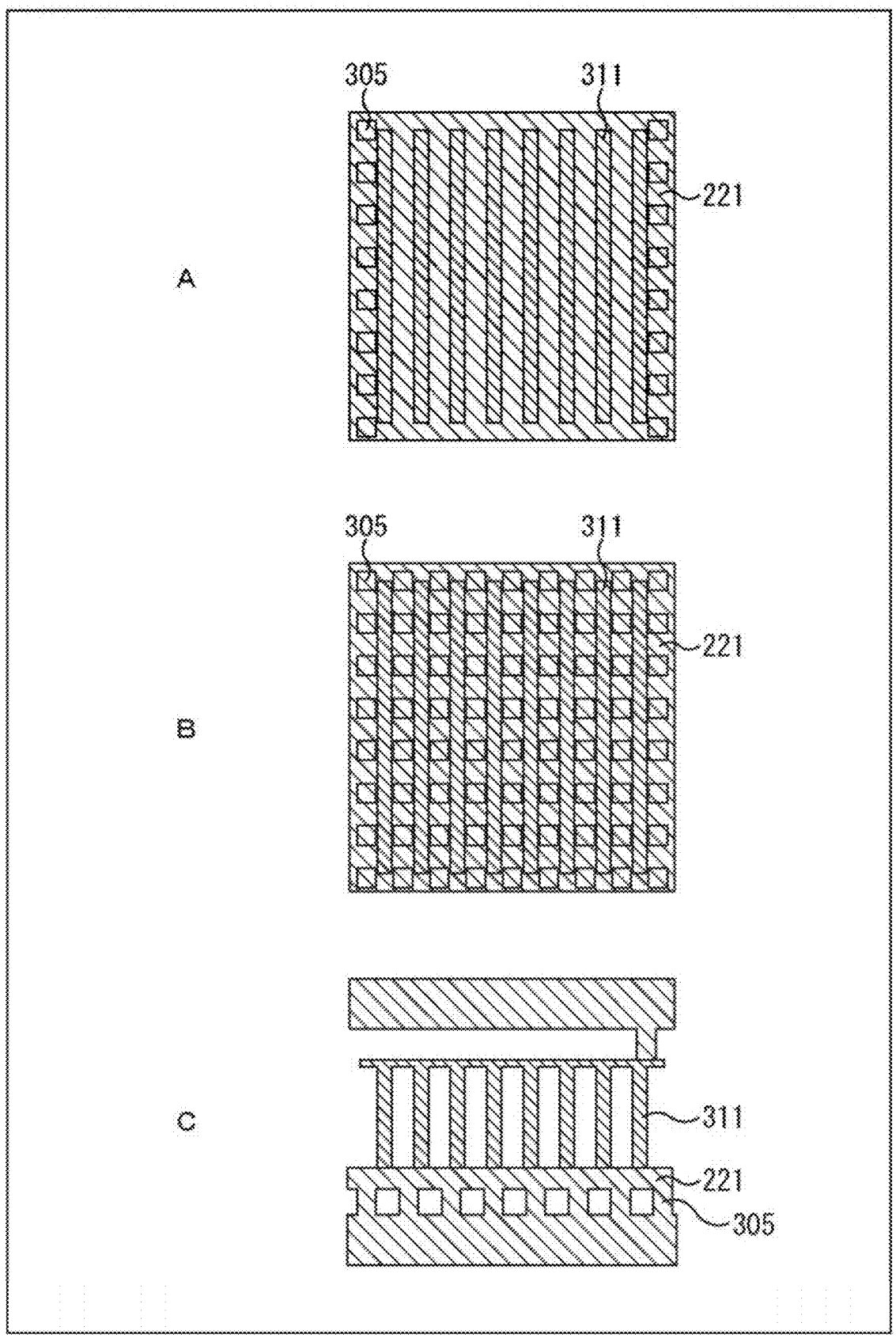
FIG. 30 is a diagram for explaining a positional relation between vias and trenches.

As depicted in A in FIG. 30, a configuration including the five or more via holes 305 may be adopted. In the example depicted in A in FIG. 30, the multiple via holes 305 are formed on two sides of the lower layer wire 221, i.e., on two sides out of the region where the trenches 311 are formed.

Furthermore, as depicted in B in FIG. 30, a configuration further including the multiple via holes 305 between the respective trenches 311 in addition to the via holes 305 depicted in A in FIG. 30 may be adopted. C in FIG. 30 is a cross-sectional configuration example corresponding to the planar configuration example depicted in B in FIG. 30. As depicted in B and C in FIG. 30, even in the case where the multiple via holes 305 are provided, the via holes 305 are arranged such that no overlap portion between the trenches 311 and the via holes 305 is produced in the planar configuration example, and that no alignment between the trenches 311 and the via holes 305 is produced in the cross-sectional configuration example.

As depicted in A and B in FIG. 30, stress can be diffused by adopting an arrangement including a larger (redundant) number of the via holes 305. In this case, stress concentration on connection portions between the lower layer wire 221 and the lower electrode 235 of the MIM capacitive element 211 (portions where distal ends of the trenches 311 are located) is avoidable.

According to the eighth embodiment, reduction of precipitation of Cu constituting the lower layer wire 221, and reduction of defective formation of the MIM capacitive element 211 are achievable. In this case, a yield of the image sensor is allowed to improve. In the Cu forming step during formation of the lower layer wire 221, the forming time and the materials required for etching and the film forming process can be reduced. Accordingly, cost reduction is achievable.

A warp of a wafer during manufacture can be reduced. In this case, a degree of freedom in an affixing process increases, and therefore a yield is allowed to improve. Coupling capacitance between the lower layer wire 221 connected to the MIM capacitive element 211 and the wire 302 of the power source voltage VDD can be reduced. The reduction of the coupling capacitance decreases parasitic capacitance. Accordingly, sensitivity of the image sensor is allowed to improve.

<First Example of Ninth Embodiment>

Figure 31:
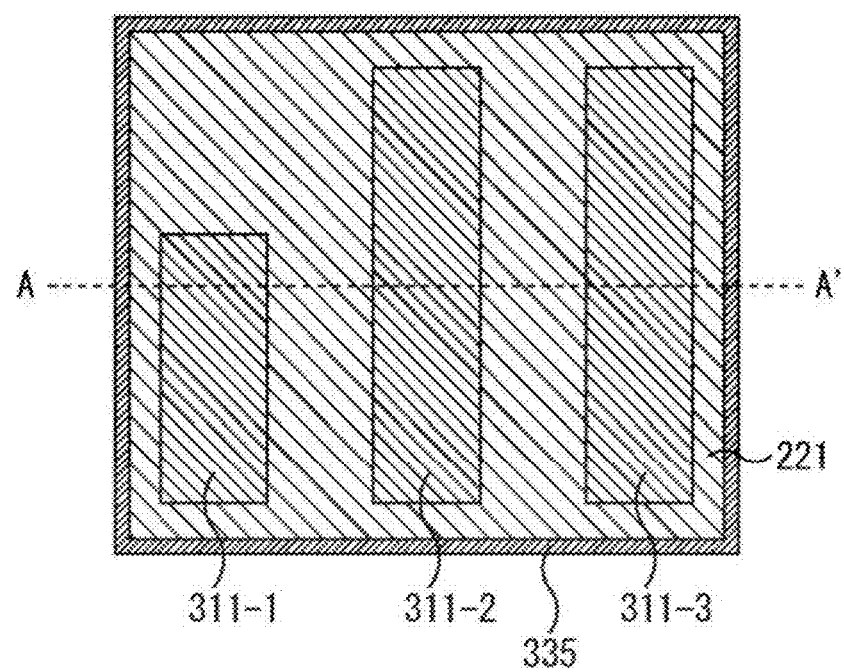
FIG. 31 is a diagram depicting a planar cross-sectional configuration example of an MIM capacitive element according to a first example of a ninth embodiment.
Figure 32:
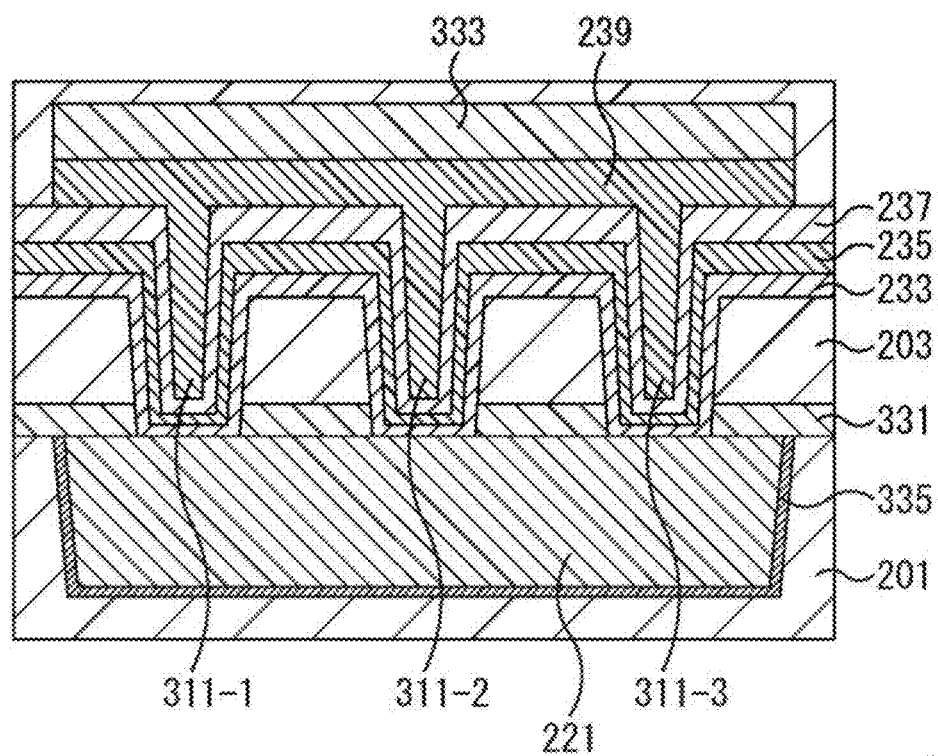
FIG. 32 is a diagram depicting a cross-sectional configuration example of the MIM capacitive element according to the first example of the ninth embodiment.

FIG. 31 is a diagram depicting a planar configuration example of an MIM capacitive element included in the pixel 2 according to a first example of a ninth embodiment, while FIG. 32 is a diagram depicting a cross-sectional example of this MIM capacitive element. The MIM capacitive element 211 according to the first example of the ninth embodiment can be implemented by combining the first embodiment to the eighth embodiment.

According to the example depicted in FIG. 31, the MIM capacitive element 211 includes the three trenches 311. Trenches 311-1 to 311-3 constituting the three trenches are provided within the region where the lower layer wire 221 is formed. The lower layer wire 221 is surrounded by the barrier metal 335.

FIG. 32 is a cross-sectional configuration example of the MIM capacitive element 211 taken along a line segment A-A' in the plan diagram of FIG. 31. The wiring layer 201 and the wiring layer 203 are laminated. The MIM capacitive element 211 is formed in the wiring layer 203. The lower side of the MIM capacitive element 211 in the figure is connected to the lower layer wire 221 formed in the wiring layer 201.

An insulation film 331 is formed between the wiring layer 201 and the wiring layer 203. The MIM capacitive element 211 has a configuration where the barrier metal 233, the lower electrode 235, the insulation film 237, the upper electrode 239, and the insulation film 333 are laminated in this order from the lower layer wire 221 side. For example, the insulation film 237 is a high-k film.

The lower layer wire 221 includes a simple substance such as Cu (copper), Al (aluminum), Ti (titanium), Ta (tantalum), W (tungsten), Ni (nickel), Co (cobalt), Ru (ruthenium), Mo (molybdenum), Mn (manganese), Ag (silver), and Au (gold), or a metal compound of these.

As can be seen from the plan diagram of FIG. 31, the trenches 311-1 to 311-3 are provided within the region where the lower layer wire 221 is formed. Paying attention to the one trench 311, the lower layer wire 221 has a larger width than the trench 311. By using a metal wire, or the lower layer wire 221 in this case, having a larger thickness than each of the trenches 311 to receive the trenches 311 constituting the MIM capacitive element 211 in the manner described above, separation of the trenches 311 of the MIM capacitive element 211 from the lower layer wire 221 can be reduced.

While the example described with reference to FIGS. 31 and 32 has been the case including the three trenches 311, it is obvious that the MIM capacitive element 211 may include three trenches 311 or more. While the three trenches 311 are similarly provided in examples of following description, the number of the trenches 311 may be any number.

Figure 33:
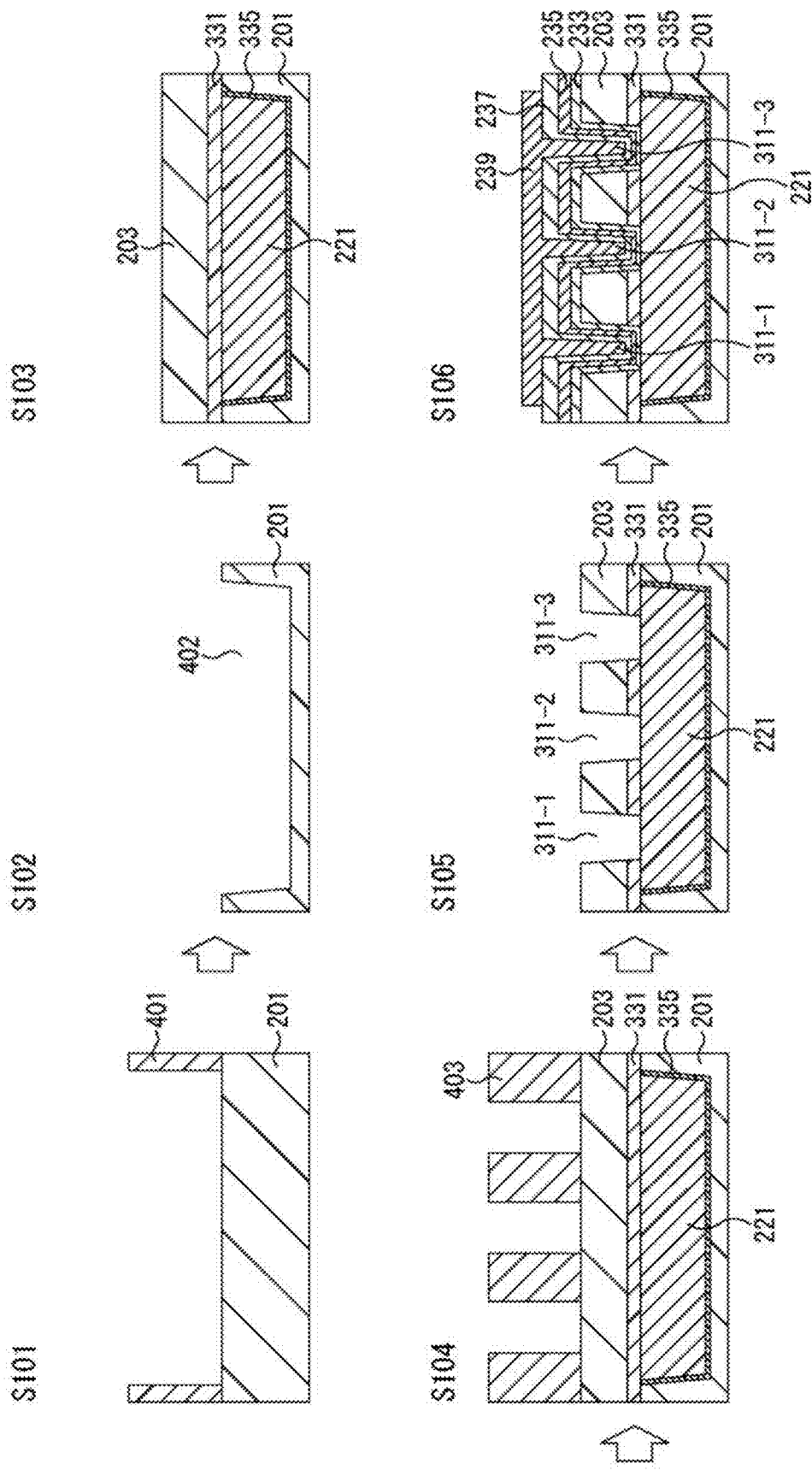
FIG. 33 is a diagram for explaining manufacture of the MIM capacitive element.

Manufacture of the MIM capacitive element 211 depicted in FIGS. 31 and 32 will be described with reference to FIG. 33. In step S101, a substrate constituting the wiring layer 201 is prepared, and a resist 401 is formed on the wiring layer 201. The resist 401 has a pattern opened in a region which is to be filled with Cu to constitute the lower layer wire 221. In step S102, etching is carried out to form a trench 402 constituting the lower layer wire 221.

In step S103, the barrier metal 335 is formed on a side wall and a bottom surface inside the trench 402, and the trench 402 is filled with Cu to form the lower layer wire 221. After the lower layer wire 221 is formed, the insulation film 331 is formed on the lower layer wire 221, and the wiring layer 203 is further formed on the insulation film 331.

In step S104, a resist 403 opened in regions constituting the trenches 311 of the MIM capacitive element 211 is formed. In step S105, etching is carried out to form the trenches 311-1 to 311-3.

In step S106, the barrier metal 233, the lower electrode 235, the insulation film 237, and the upper electrode 239 are formed to form the MIM capacitive element 211.

The MIM capacitive element 211 depicted in FIGS. 31 and 32 is formed by the foregoing steps.

<Second Example of Ninth Embodiment>

Figure 34:
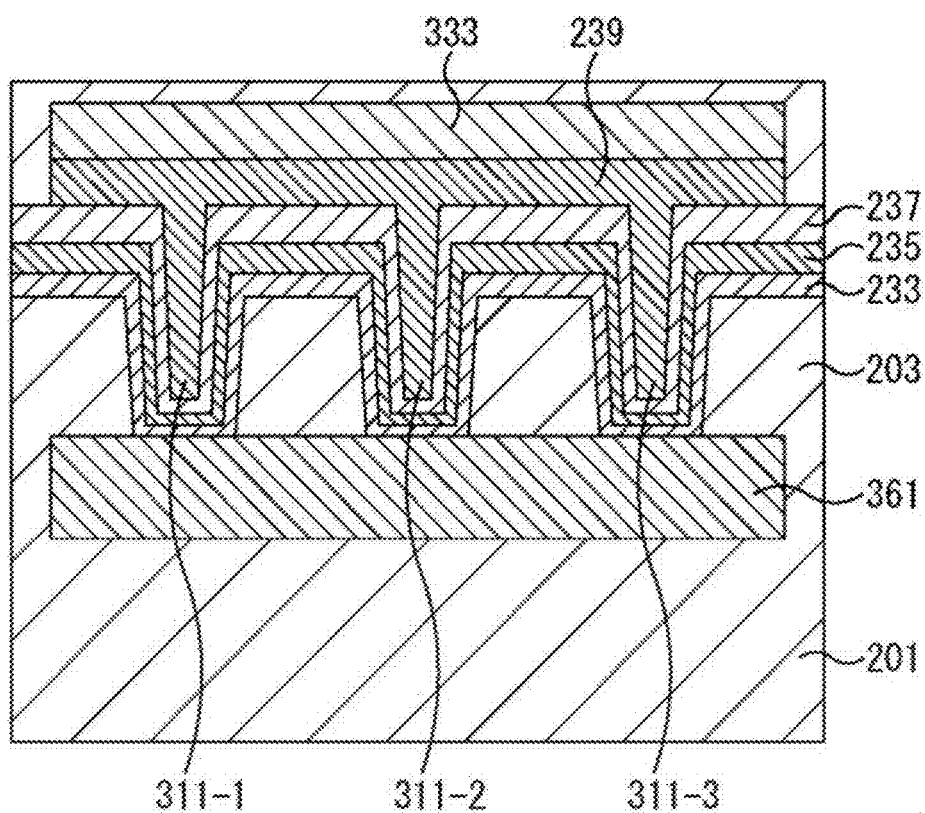
FIG. 34 is a diagram depicting a cross-sectional configuration example of an MIM capacitive element according to a second example of the ninth embodiment.

FIG. 34 is a diagram depicting a planar configuration of an MIM capacitive element included in the pixel 2 according to a second example of the ninth embodiment. The MIM capacitive element 211 according to the second example of the ninth embodiment can be implemented by combining the first embodiment to the eighth embodiment.

The MIM capacitive element 211 depicted in FIG. 34 is similar to the MIM capacitive element 211 depicted in FIG. 32 except for a point that the lower layer wire 221 is constituted by a metal pad 361, and a point that the insulation film 331 is eliminated. The planar configuration example of the MIM capacitive element 211 depicted in FIG. 34 is basically similar to the example depicted in FIG. 31. In the configuration of FIG. 34, the lower layer wire 221 is replaced with the metal pad 361.

The metal pad 361 includes a simple substance such as Cu (copper), Al (aluminum), Ti (titanium), Ta (tantalum), W (tungsten), Ni (nickel), Co (cobalt), Ru (ruthenium), Mo (molybdenum), Mn (manganese), Ag (silver), and Au (gold), or a metal compound of these.

The trenches 311-1 to 311-3 are provided within the region where the metal pad 361 is formed. Paying attention to the one trench 311, the metal pad 361 has a larger width than the trench 311. By using a metal wire, or the metal pad 361 in this case, having a larger thickness than each of the trenches 311 to receive the trenches 311 constituting the MIM capacitive element 211 in the manner described above, separation of the trenches 311 of the MIM capacitive element 211 from the metal pad 361 can be reduced.

Figure 35:
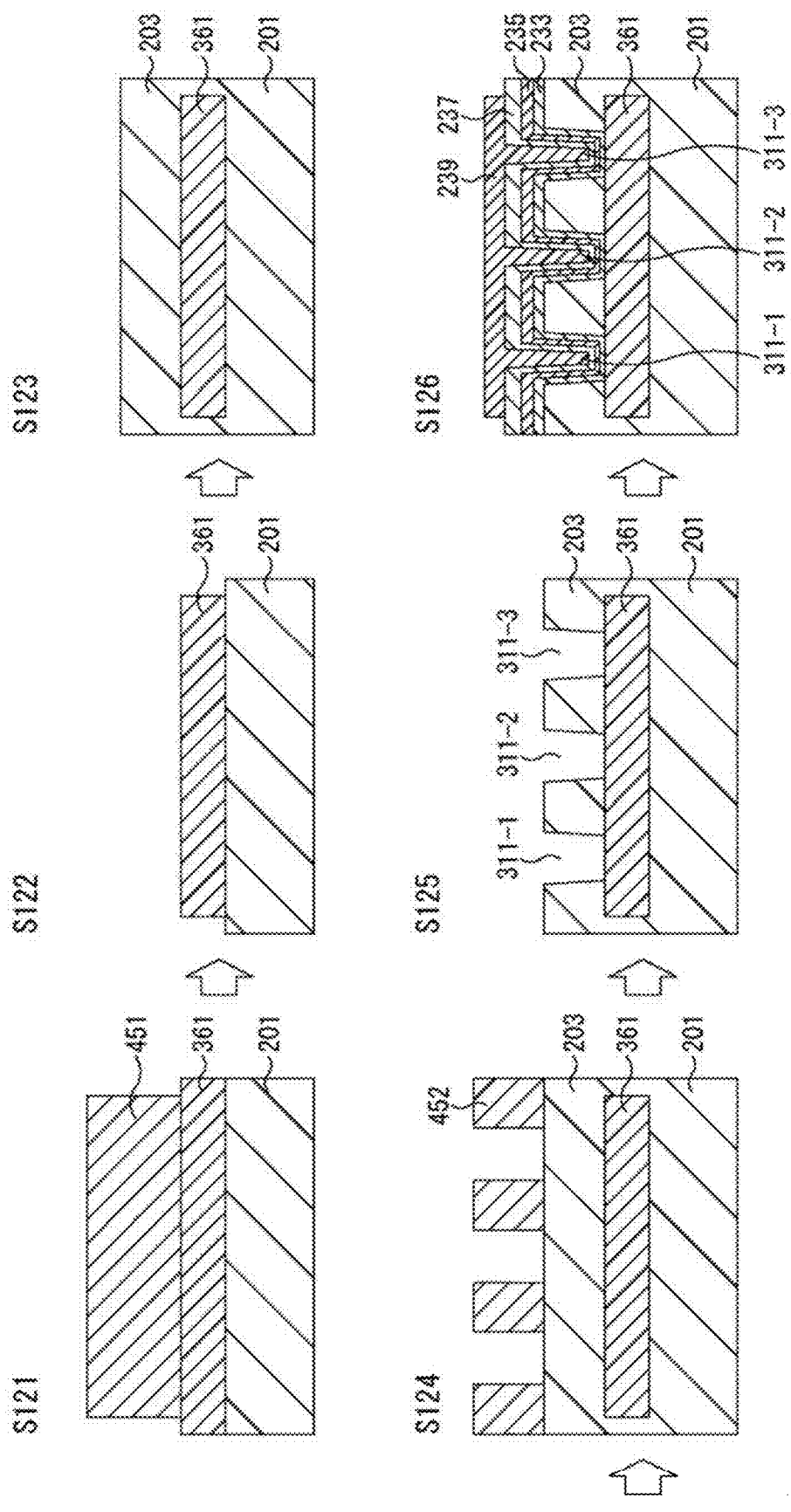
FIG. 35 is a diagram for explaining manufacture of the MIM capacitive element.

Manufacture of the MIM capacitive element 211 depicted in FIG. 34 will be described with reference to FIG. 35. In step S121, a substrate constituting the wiring layer 201 is prepared. Metal constituting the metal pad 361 is formed on the wiring layer 201. In addition, a resist 451 which has a pattern opened in a region other than a region left as the metal pad 361 is formed. In step S122, etching is carried out to form the metal pad 361.

In step S123, a region constituting the wiring layer 203 is formed. This region corresponds to a region where the MIM capacitive element 211 is formed. In step S124, a resist 452 opened in a region constituting the trenches 311 of the MIM capacitive element 211 is formed.

In step S125, etching is carried out to form the trenches 311-1 to 311-3. In step S126, the barrier metal 233, the lower electrode 235, the insulation film 237, and the upper electrode 239 are formed to form the MIM capacitive element 211.

The MIM capacitive element 211 depicted in FIG. 34 is formed by the foregoing steps.

<First Example of Tenth Embodiment>

Figure 36:
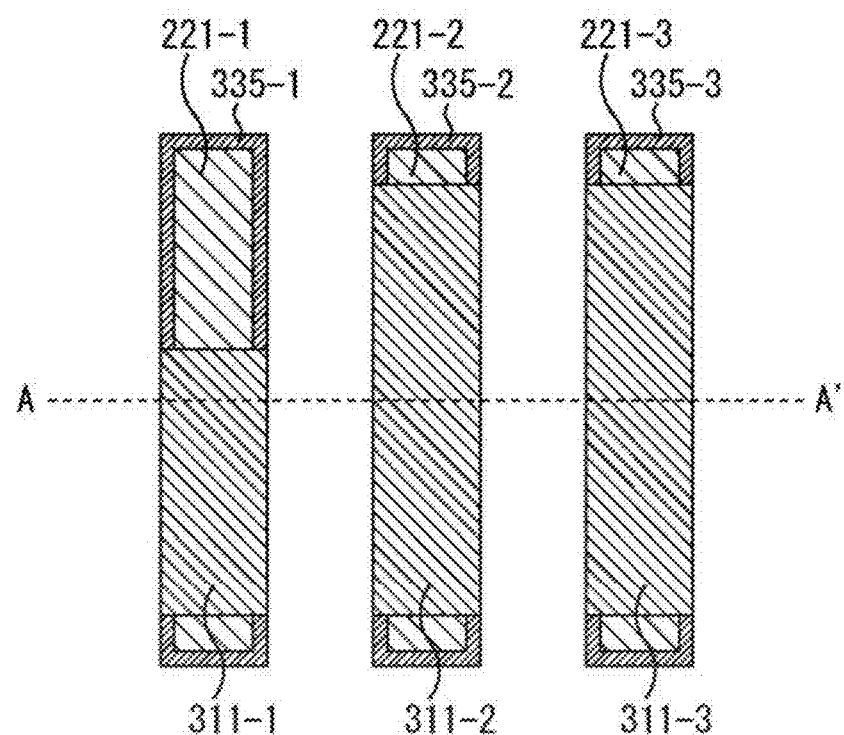
FIG. 36 is a diagram depicting a planar configuration example of an MIM capacitive element according to a first example of a tenth embodiment.
Figure 37:
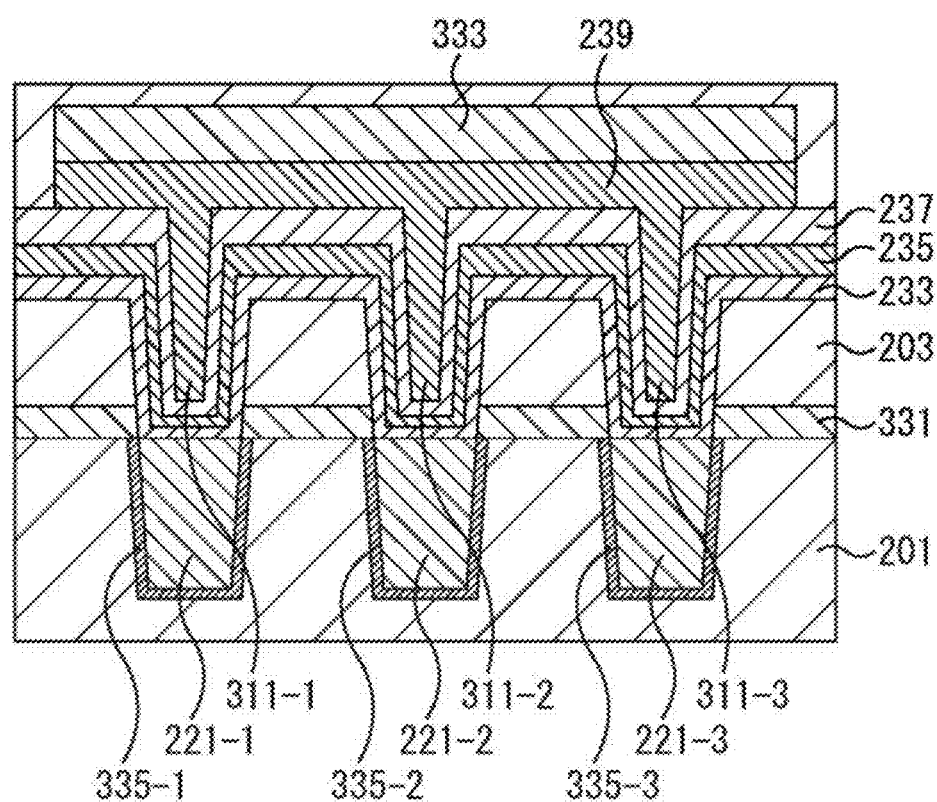
FIG. 37 is a diagram depicting a cross-sectional configuration example of the MIM capacitive element according to the first example of the tenth embodiment.

FIG. 36 is a diagram depicting a planar configuration example of an MIM capacitive element included in the pixel 2 according to a first example of a tenth embodiment, while FIG. 37 is a diagram depicting a cross-sectional example of this MIM capacitive element. The MIM capacitive element 211 according to the first example of the tenth embodiment can be implemented by combining the first embodiment to the eighth embodiment.

The MIM capacitive element 211 depicted in FIGS. 36 and 37 is similar to the MIM capacitive element 211 of the first example of the ninth embodiment depicted in FIGS. 31 and 32 except for a point that the lower layer wire 221 is provided for each of the trenches 311 of the MIM capacitive element 211.

According to the example depicted in FIG. 36, the MIM capacitive element 211 includes the three trenches 311-1 to 311-3. The three trenches 311-1 to 311-3 are connected to lower layer wires 221-1 to 221-3, respectively.

The trench 311-1 is formed on the lower layer wire 221-1 having a width substantially equivalent to a width of the trench 311-1. The trench 311-2 is formed on the lower layer wire 221-2 having a width substantially equivalent to a width of the trench 311-2. The trench 311-3 is formed on the lower layer wire 221-3 having a width substantially equivalent to a width of the trench 311-3.

In such a manner, the lower layer wire 221 having a thickness substantially equivalent to a thickness of the corresponding trench 311 is formed for each of the trenches 311. The lower layer wires 221-1 to 221-3 are surrounded by barrier metals 335-1 to 335-3, respectively.

According to comparison between the lower layer wire 221 of the first example of the ninth embodiment depicted in FIG. 31 and the lower layer wires 221 of the first example of the tenth embodiment depicted in FIG. 36, each of the lower layer wires 221 formed in the first example of the tenth embodiment depicted in FIG. 36 has a small area, and has a small amount of Cu constituting the lower layer wire 221. For example, as described in the eighth embodiment, Cu is precipitated by stress applied to each of the lower layer wires 221 in a case where the lower layer wire 221 has a large amount of Cu. In this case, a malfunction of the MIM capacitive element 211 may be caused. According to the first example of the tenth embodiment, the amount of Cu can be reduced by reducing each area of the lower layer wires 221. In such a manner, reduction of precipitation of Cu described above is achievable.

Figure 38:
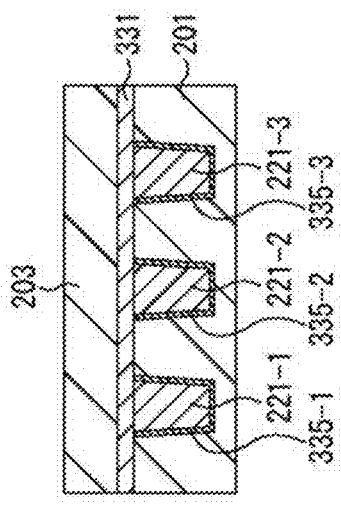
FIG. 38 is a diagram for explaining manufacture of the MIM capacitive element.
Figure 38:
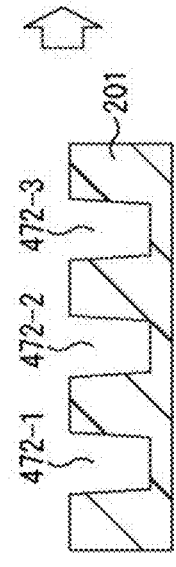
Figure 38:
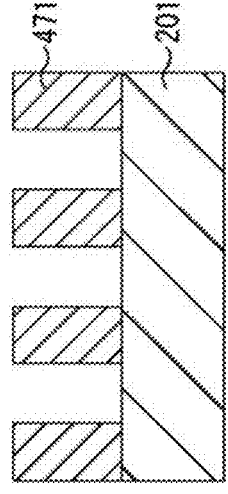
Figure 38:
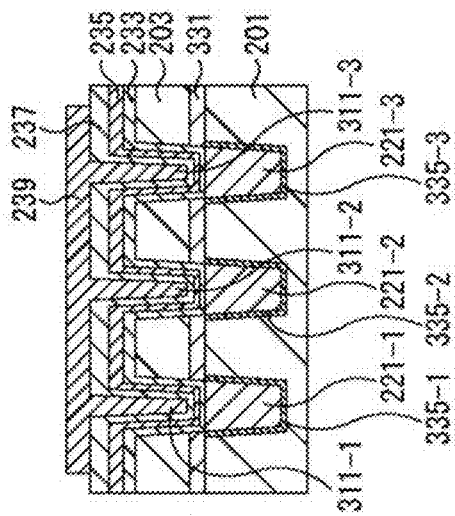
Figure 38:
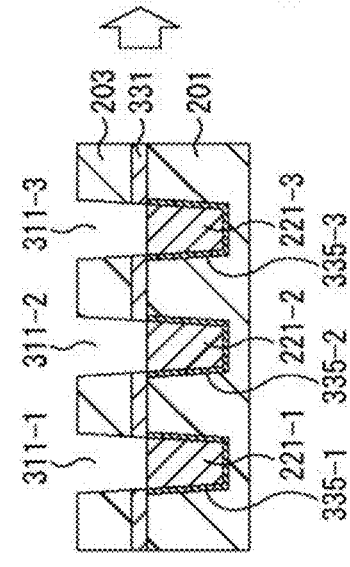
Figure 38:
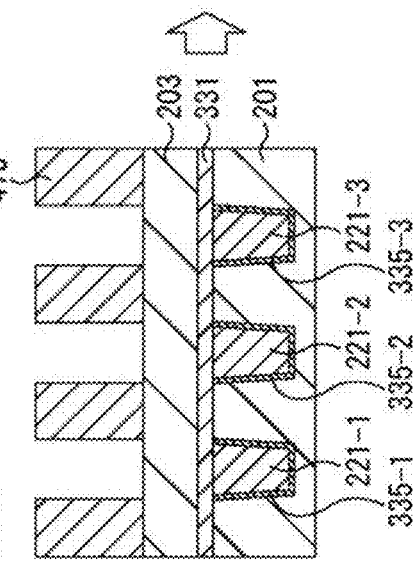

Manufacture of the MIM capacitive element 211 depicted in FIGS. 36 and 37 will be described with reference to FIG. 38. In step S141, a substrate constituting the wiring layer 201 is prepared, and a resist 471 is formed on the wiring layer 201. The resist 471 has a pattern opened in regions which are to be filled with Cu to constitute the lower layer wires 221-1 to 221-3. In step S142, etching is carried out to form trenches 472-1 to 472-3 constituting the lower layer wires 221.

In step S143, the barrier metal 335 is formed on a side wall and a bottom surface inside each of the trenches 471-1 to 472-3, and the trenches 472-1 to 472-3 are filled with Cu to form the lower layer wires 221-1 to 221-3. After the lower layer wires 221 are formed, the insulation film 331 is formed on the lower layer wires 221. The wiring layer 203 is further formed on the insulation film 331.

In step S144, a resist 473 opened in regions constituting the trenches 311-1 to 311-3 of the MIM capacitive element 211 is formed. In step S145, etching is carried out to form the trenches 311-1 to 311-3.

In step S146, the barrier metal 233, the lower electrode 235, the insulation film 237, and the upper electrode 239 are formed to form the MIM capacitive element 211.

The MIM capacitive element 211 depicted in FIGS. 36 and 37 is formed by the foregoing steps.

<Second Example of Tenth Embodiment>

Figure 39:
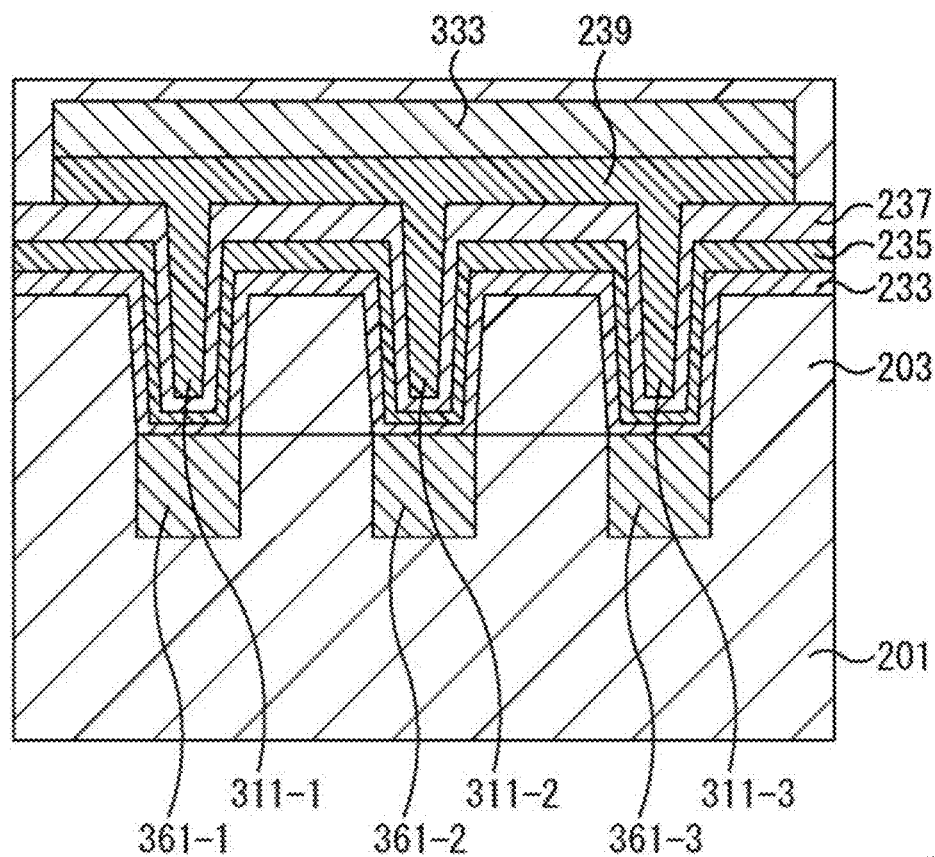
FIG. 39 is a diagram depicting a cross-sectional configuration example of an MIM capacitive element according to a second example of the tenth embodiment.

FIG. 39 is a diagram depicting a cross-sectional configuration example of an MIM capacitive element included in the pixel 2 according to a second example of the tenth embodiment. The MIM capacitive element 211 according to the second example of the tenth embodiment can be implemented by combining the first embodiment to the eighth embodiment.

The MIM capacitive element 211 depicted in FIG. 39 is similar to the MIM capacitive element 211 of the second example of the ninth embodiment depicted in FIG. 34 except for a point that the metal pad 361 is provided for each of the trenches 311 of the MIM capacitive element 211.

According to the example depicted in FIG. 39, the MIM capacitive element 211 includes the three trenches 311-1 to 311-3. The three trenches 311-1 to 311-3 are connected to metal pads 361-1 to 361-3, respectively.

The trench 311-1 is formed on the metal pad 361-1 having a width substantially equivalent to a width of the trench 311-1. The trench 311-2 is formed on the metal pad 361-2 having a width substantially equivalent to a width of the trench 311-2. The trench 311-3 is formed on the metal pad 361-3 having a width substantially equivalent to a width of the trench 311-3.

In such a manner, the metal pad 361 having a thickness substantially equivalent to the thickness of the corresponding trench 311 is formed for each of the trenches 311.

Figure 40:
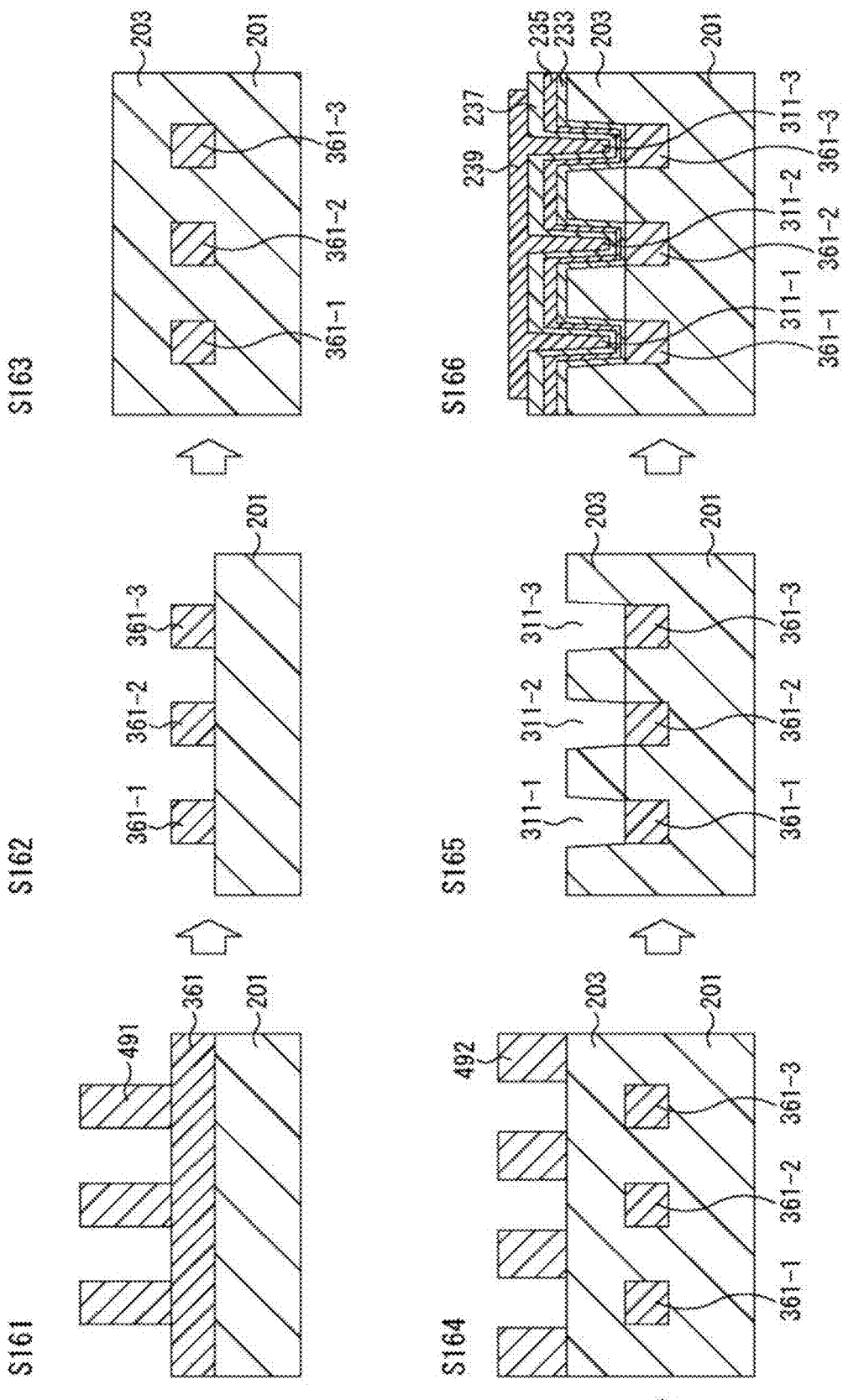
FIG. 40 is a diagram for explaining manufacture of the MIM capacitive element.

Manufacture of the MIM capacitive element 211 depicted in FIG. 39 will be described with reference to FIG. 40. In step S161, a substrate constituting the wiring layer 201 is prepared. Metal constituting the metal pads 361 is formed on the wiring layer 201. In addition, a resist 491 which has a pattern opened in a region other than regions left as the metal pads 361 is formed. In step S162, etching is carried out to form the metal pads 361-1 to 361-3.

In step S163, a region constituting the wiring layer 203 is formed. This region corresponds to a region where the MIM capacitive element 211 is formed. In step S164, a resist 492 opened in regions constituting the trenches 311 of the MIM capacitive element 211 is formed.

In step S165, etching is carried out to form the trenches 311-1 to 311-3. In step S166, the barrier metal 233, the lower electrode 235, the insulation film 237, and the upper electrode 239 are formed to form the MIM capacitive element 211.

The MIM capacitive element 211 depicted in FIG. 39 is formed by the foregoing steps.

<First Example of Eleventh Embodiment>

Figure 41:
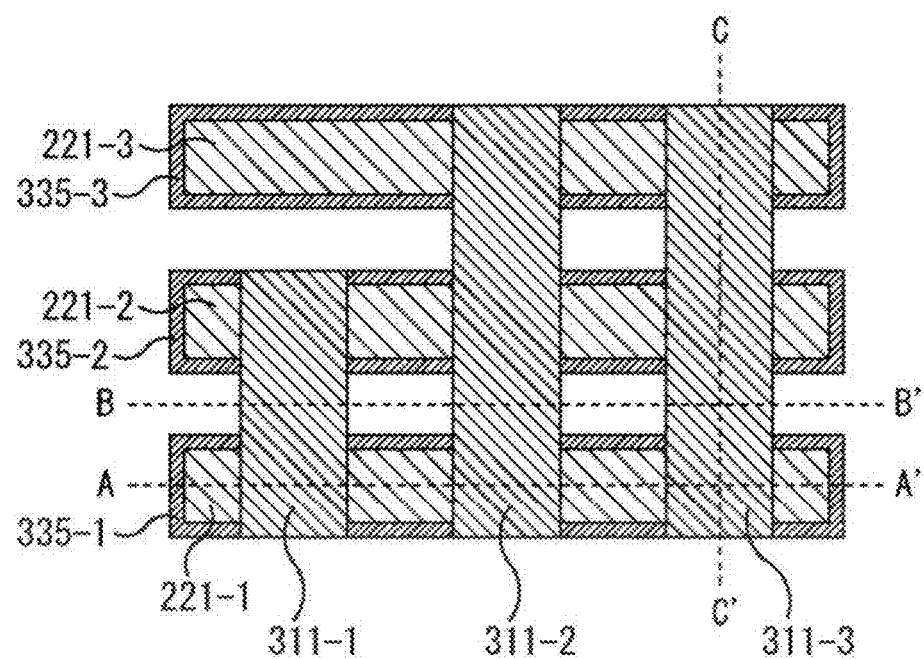
FIG. 41 is a diagram depicting a planar configuration example of an MIM capacitive element according to a first example of an eleventh embodiment.
Figure 42:
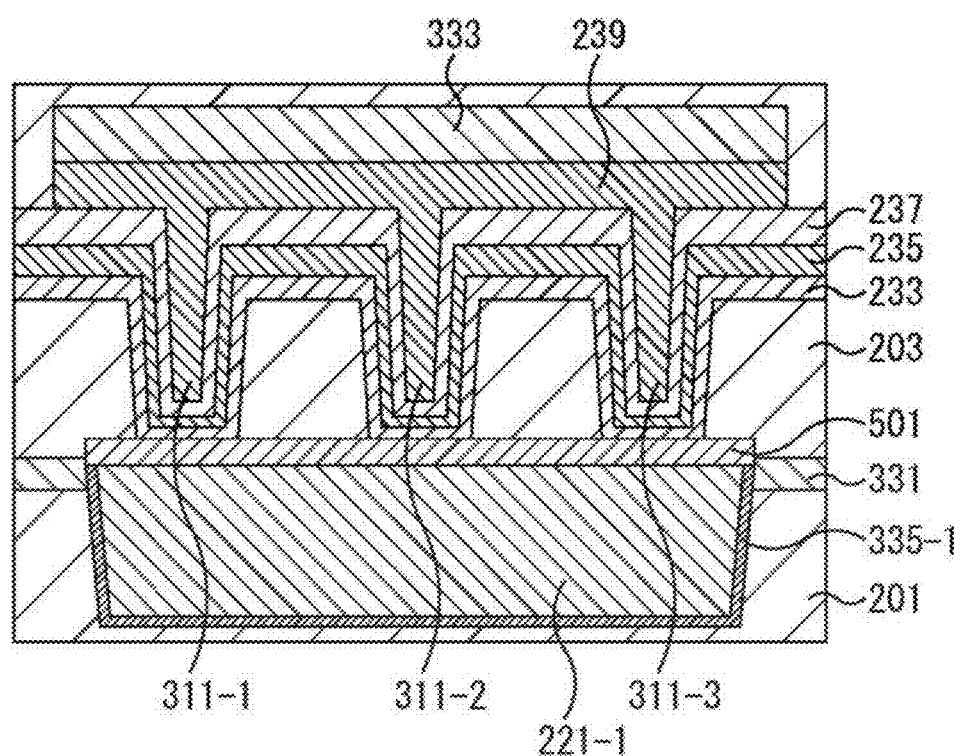
FIG. 42 is a diagram depicting a cross-sectional configuration example of the MIM capacitive element according to the first example of the eleventh embodiment.
Figure 43:
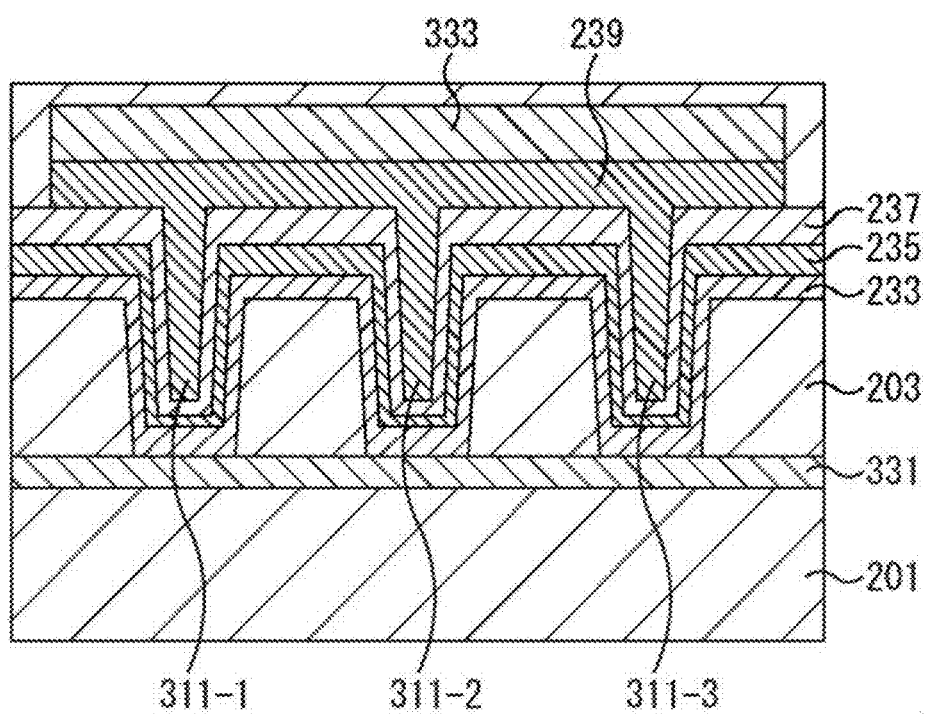
FIG. 43 is a diagram depicting a cross-sectional configuration example of the MIM capacitive element according to the first example of the eleventh embodiment.
Figure 44:
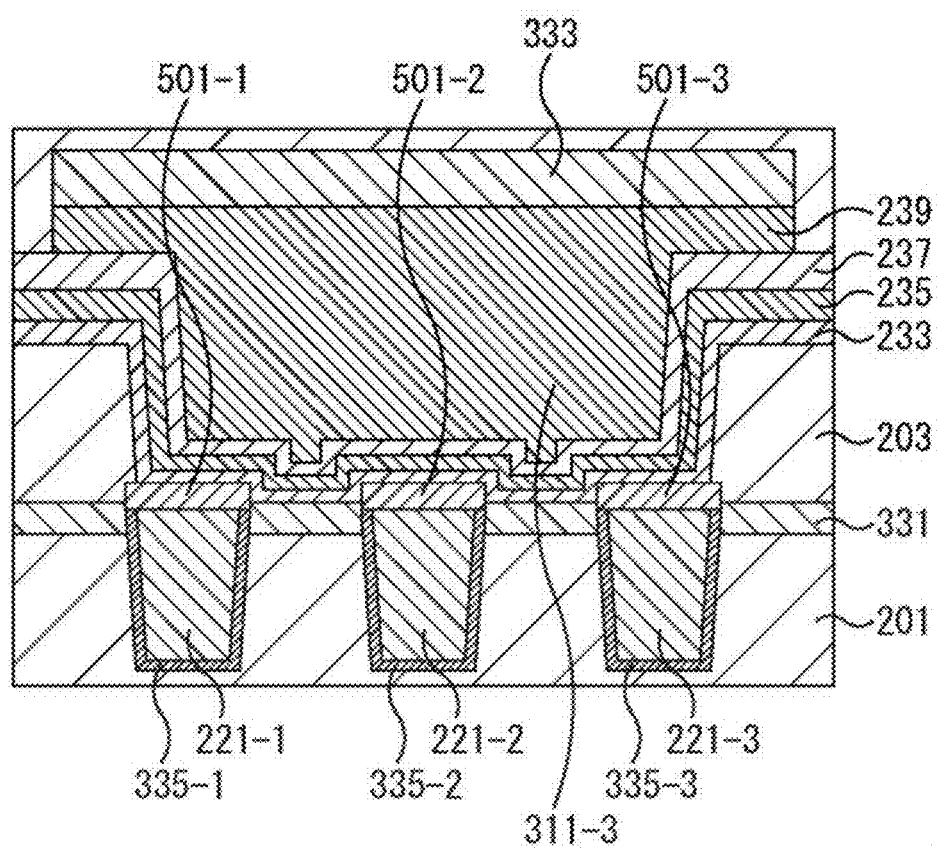
FIG. 44 is a diagram depicting a cross-sectional configuration example of the MIM capacitive element according to the first example of the eleventh embodiment.

FIG. 41 is a diagram depicting a planar configuration example of an MIM capacitive element included in the pixel 2 according to a first example of an eleventh embodiment. FIG. 42 is a cross-sectional configuration example of the MIM capacitive element 211 taken along a line segment A-A' in the planar configuration example depicted in FIG. 41. FIG. 43 is a cross-sectional configuration example of the MIM capacitive element 211 taken along a line segment B-B' in the planar configuration example depicted in FIG. 41. FIG. 44 is a cross-sectional configuration example of the MIM capacitive element 211 taken along a line segment C-C' in the planar configuration example depicted in FIG. 41.

The MIM capacitive element 211 according to the first example of the eleventh embodiment can be implemented by combining the first embodiment to the eighth embodiment.

According to comparison between the MIM capacitive element 211 depicted in FIG. 41 and the MIM capacitive element 211 depicted in FIG. 36, the MIM capacitive element 211 depicted in FIG. 41 is similar to the MIM capacitive element 211 depicted in FIG. 36 except for a following point. The trenches 311 and the lower layer wires 221 of the MIM capacitive element 211 depicted in FIG. 36 have long sides in the same direction and are formed in parallel to each other. On the other hand, the trenches 311 and the lower layer wires 221 of the MIM capacitive element 211 depicted in FIG. 41 have long sides in directions crossing at right angles, and therefore have a perpendicular positional relation.

According to the example depicted in FIG. 41, the lower layer wires 221-1 to 221-3 are provided at predetermined intervals in the planar view. The trench 311-1 of the MIM capacitive element 211 is disposed in such a position as to extend between the lower layer wire 221-1 and the lower layer wire 221-2, and cross each of the lower layer wire 221-1 and the lower layer wire 221-2 at right angles. A part of the trench 311-1 of the MIM capacitive element 211 is connected to the lower layer wire 221-1, while a different part is connected to the lower layer wire 221-2.

The trench 311-2 of the MIM capacitive element 211 is disposed in such a position as to extend between the lower layer wire 221-1 and the lower layer wire 221-3 across the lower layer wire 221-2, and cross each of the lower layer wire 221-1 to the lower layer wire 221-3 at right angles. A part of the trench 311-2 of the MIM capacitive element 211 is connected to the lower layer wire 221-1, a different part is connected to the lower layer wire 221-2, and a further different part is connected to the lower layer wire 221-3.

The trench 311-3 of the MIM capacitive element 211 is disposed in such a position as to extend between the lower layer wire 221-1 and the lower layer wire 221-3 across the lower layer wire 221-2, and cross each of the lower layer wire 221-1 to the lower layer wire 221-3 at right angles. A part of the trench 311-3 of the MIM capacitive element 211 is connected to the lower layer wire 221-1, a different part is connected to the lower layer wire 221-2, and a further different part is connected to the lower layer wire 221-3.

Refer to FIG. 42 depicting the cross-sectional configuration example of the MIM capacitive element 211 taken along the line segment A-A' in the planar configuration example depicted in FIG. 41. The line segment A-A' is a portion corresponding to a cross section of the lower layer wire 221-1. Each of the trenches 311-1, 311-2, and 311-3 is in contact with the lower layer wire 221-1.

According to the first example of the tenth embodiment, a metal cap 501 is formed in each of contact portions between the trenches 311 and the lower layer wires 221. The metal cap 501 functions as an etching stopper, and is capable of controlling etching such that etching does not proceed in excess of the metal cap 501 during manufacture. The metal cap 501 may be also formed in each of the corresponding portions in the configurations of the first embodiment to the ninth embodiment.

Refer to FIG. 43 depicting the cross-sectional configuration example of the MIM capacitive element 211 taken along the line segment B-B' in the planar configuration example depicted in FIG. 41. The line segment B-B' is a portion corresponding to a cross section of a region where the lower layer wires 221 are not formed. As depicted in FIG. 43, the lower layer wires 221 are not formed within the wiring layer 201. Each of the trenches 311-1 to 311-3 of the MIM capacitive element 211 is in contact with the insulation film 331.

Refer to FIG. 44 depicting the cross-sectional configuration example of the MIM capacitive element 211 taken along the line segment C-C' in the planar configuration example depicted in FIG. 41. The line segment C-C' is a portion corresponding to a cross section of the trench 311-3. The trench 311-3 of the MIM capacitive element 211 is connected to the lower layer wire 221-1 via a metal cap 501-1, connected to the lower layer wire 221-2 via a metal cap 501-2, and connected to the lower layer wire 221-3 via a metal cap 501-3.

As described above, paying attention to one of the trenches 311, the configuration connecting the corresponding trench 311 to the lower layer wires 221 crossing the corresponding trench 311 at right angles is adoptable. Variations in depth of the trenches 311 of the MIM capacitive element 211 can be reduced by using the insulation film 331 formed below the trenches 311. In such a manner, the degree of freedom of a layout of the lower layer wires 221 is allowed to improve.

While described with reference to FIGS. 41 to 44 has been the example where the three lower layer wires 221 are formed, the number of the lower layer wires 221 need not be equalized with the number of the trenches 311. A configuration including a smaller number of the lower layer wires 221 than the number of the trenches 311 may be adopted. Moreover, the width of the trenches 311 may be substantially equivalent to the width of the lower layer wires 221, or may be a different width. In such a manner, the layout of the lower layer wires 221, such as arrangement positions and sizes of the lower layer wires 221, may be freely determined.

According to the lower layer wires 221 of the first example of the eleventh embodiment depicted in FIGS. 41 to 44, the areas where the lower layer wires 221 are formed can be reduced, and therefore the amount of Cu constituting the lower layer wires 221 can be reduced. In this case, stress applied to the lower layer wires 221 is allowed to decrease. Accordingly, precipitation of Cu in the region where the MIM capacitive element 211 is formed can be reduced.

Figure 45:
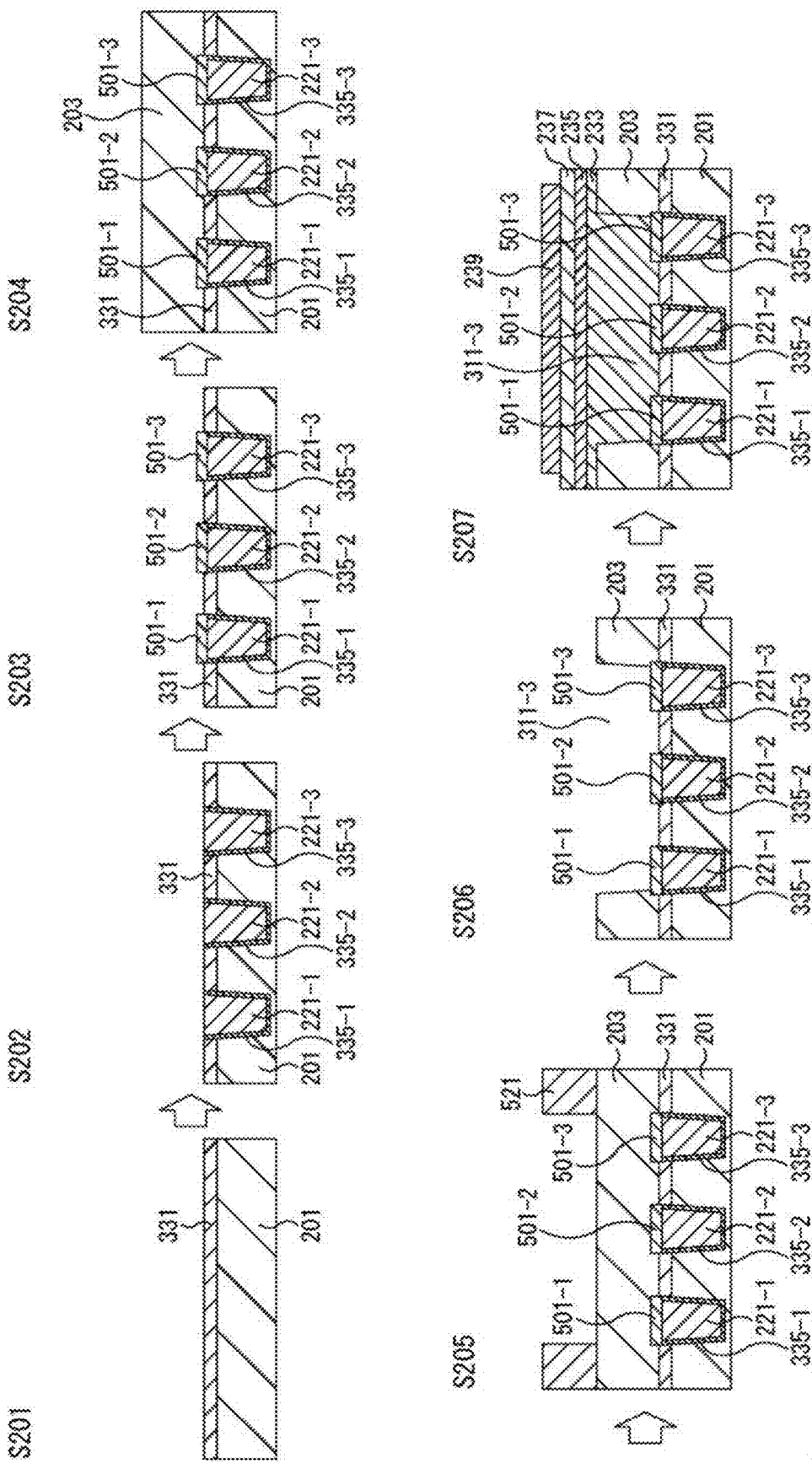
FIG. 45 is a diagram for explaining manufacture of the MIM capacitive element.

Manufacture of the MIM capacitive element 211 depicted in FIGS. 41 to 44 will be described with reference to FIG. 45. Described with reference to FIG. 45 by way of example will be a part included in the cross-sectional configuration example of the MIM capacitive element 211 depicted in FIG. 44.

In step S201, a substrate constituting the wiring layer 201 is prepared. The insulation film 331 is formed on the wiring layer 201. The insulation film 331 needs to function as an etching stopper.

In step S202, the lower layer wires 221-1 to 221-3 are formed. While not depicted in the figure, for example, a resist which has a pattern opened in regions which are to be filled with Cu to constitute the lower layer wires 221-1 to 221-3 is formed similarly to steps S141 and S142 in FIG. 38. Thereafter, etching is carried out to form trenches constituting the lower layer wires 221.

During formation of the trenches, the insulation film 331 formed beforehand is also processed. The barrier metal 335 is formed on a side wall and a bottom surface inside each of the formed trenches, and the trenches are filled with Cu to form the lower layer wires 221-1 to 221-3.

In step S203, the metal caps 501-1 to 501-3 are formed on the lower layer wires 221-1 to 221-3, respectively. In step S204, the wiring layer 203 is formed as a layer where the MIM capacitive element 211 is provided.

In step S205, a resist 521 which is opened in regions constituting the trenches 311-1 to 311-3 of the MIM capacitive element 211 is formed. In step S206, etching is carried out to form the trench 311-3.

In step S207, the barrier metal 233, the lower electrode 235, the insulation film 237, and the upper electrode 239 are formed to form the MIM capacitive element 211.

The MIM capacitive element 211 depicted in FIGS. 41 to 44 is formed by the foregoing steps.

<Second Example of Eleventh Embodiment>

The MIM capacitive element 211 of the first example of the eleventh embodiment and the MIM capacitive element 211 of the second example of the ninth embodiment depicted in FIG. 34 may be combined to produce a configuration where the metal pads 361 are provided as components constituting the lower layer wires 221 connected to the MIM capacitive element 211 described with reference to FIGS. 41 to 44 (defined as a second example of the eleventh embodiment).

While not depicted in the figure, a configuration including the metal pads 361-1 to 361-2 as components constituting the lower layer wires 221-1 to 221-3 depicted in FIGS. 41 to 44 may be also adopted.

Twelfth Embodiment

Figure 46:
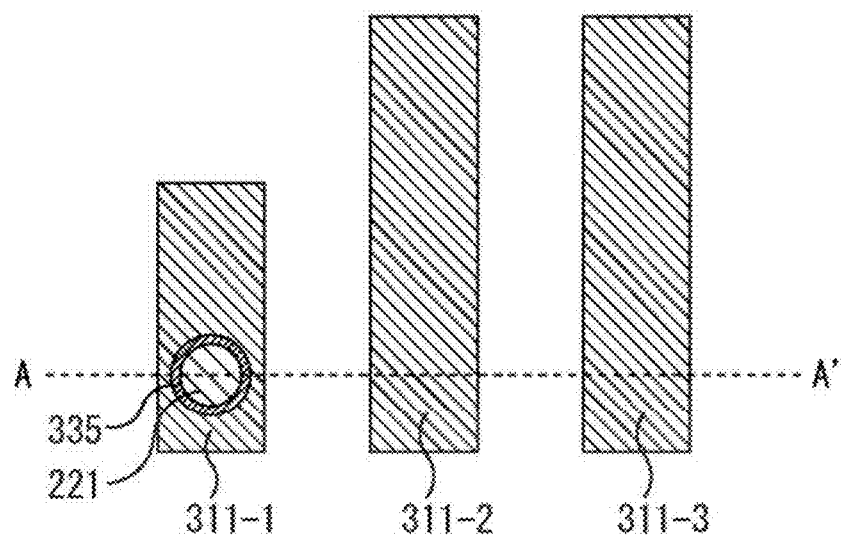
FIG. 46 is a diagram depicting a planar configuration example of an MIM capacitive element according to a twelfth embodiment.
Figure 47:
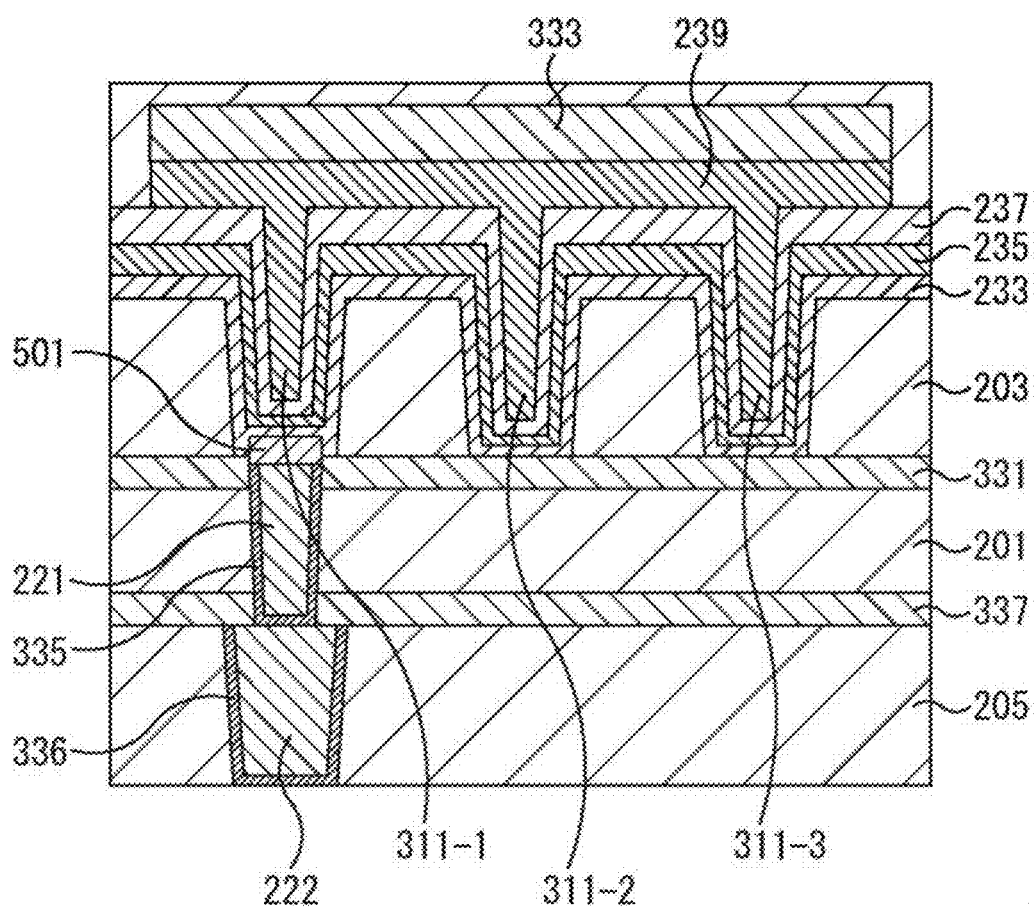
FIG. 47 is a diagram depicting a cross-sectional configuration example of the MIM capacitive element according to the twelfth embodiment.

FIG. 46 is a diagram depicting a planar configuration example of an MIM capacitive element included in the pixel 2 according to a twelfth embodiment, while FIG. 47 is a diagram depicting a cross-sectional example of this MIM capacitive element. The MIM capacitive element 211 according to the twelfth embodiment can be implemented by combining the first embodiment to the eighth embodiment.

For example, the MIM capacitive element 211 depicted in FIGS. 46 and 47 has a configuration similar to the configuration of the MIM capacitive element 211 of the first example of the ninth embodiment depicted in FIGS. 31 and 32 except for a point that the lower layer wire 221 is provided only for the one trench 311 included in the multiple trenches 311 of the MIM capacitive element 211.

According to the example depicted in FIGS. 46 and 47, the lower layer wire 221 is connected to the trench 311-1 of the MIM capacitive element 211. As depicted in FIG. 46, the lower layer wire 221 has a circular shape in the planar view, for example. In this configuration, the barrier metal 335 is formed on a side surface of the circular trench, and an interior of the barrier metal 335 is filled with Cu.

In other words, the trench 311-1 of the MIM capacitive element 211 is connected to a metal via including metal such as Cu. The metal cap 501 (FIG. 47) is formed between this metal via (lower layer wire 221) and the trench 311-1.

The wiring layer 205 is laminated on the wiring layer 201 via an insulation film 337. A wire 222 is formed in the wiring layer 205. In this configuration, the wire 222 is surrounded by the barrier metal 336. For example, the wire 222 is a wire provided for supplying potential to the MIM capacitive element 211.

As described in the above configuration, the trench 311 of the MIM capacitive element 211 may be received by the lower layer wire 221 constituted by the via. Similarly to the lower layer wires 221 of the first example of the eleventh embodiment depicted in FIG. 41, for example, the lower layer wire 221 constituted by the via can reduce the area of the region forming the lower layer wire 221, and therefore can reduce the amount of Cu constituting the lower layer wire 221. In this case, stress applied to the lower layer wire 221 is allowed to decrease. Accordingly, reduction of precipitation of Cu in the region forming the MIM capacitive element 211 is achievable.

Figure 48:
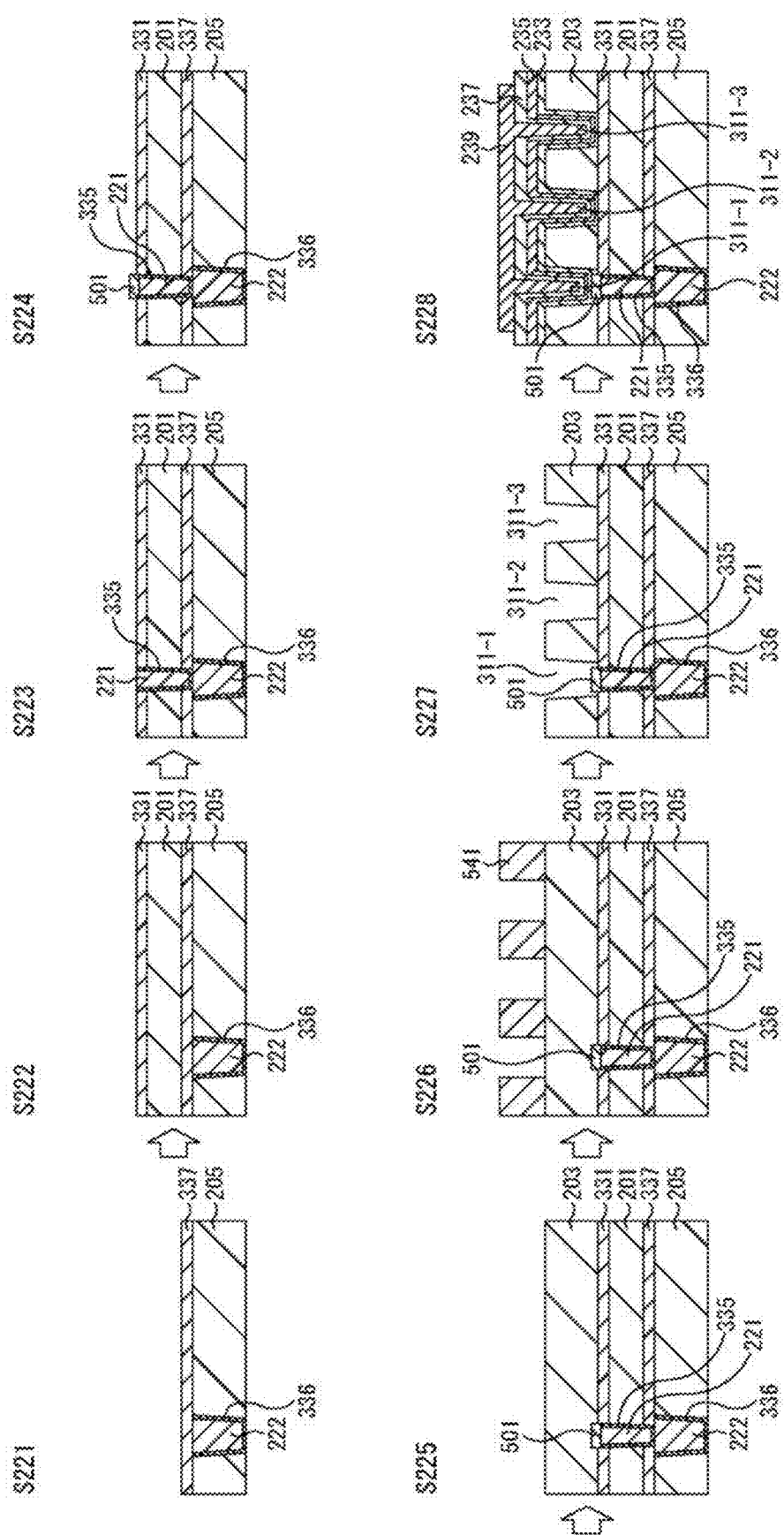
FIG. 48 is a diagram for explaining manufacture of the MIM capacitive element.

Manufacture of the MIM capacitive element 211 depicted in FIGS. 46 and 47 will be described with reference to FIG. 48.

In step S221, a substrate constituting the wiring layer 205 which includes the wire 222 surrounded by the barrier metal 366 is prepared. The insulation film 337 is formed on the wiring layer 205. In step S222, the wiring layer 201 is formed on the insulation film 337. The insulation film 331 is formed on the wiring layer 201.

In step S223, the lower layer wire 221 is formed. While not depicted in the figure, for example, a resist which has a pattern opened in a region which is to be filled with Cu to constitute the lower layer wire 221 is formed similarly to steps S141 and S142 in FIG. 38. Thereafter, etching is carried out to form a via constituting the lower layer wire 221.

During formation of the via, the insulation film 331 formed beforehand is also processed. The barrier metal 335 is formed on a side wall and a bottom surface inside the formed via, and the via is filled with Cu to form the lower layer wire 221 having a via shape.

In step S224, the metal cap 501 is formed on the lower layer wire 221. In step S225, the wiring layer 203 is formed as a layer where the MIM capacitive element 211 is provided.

In step S226, a resist 541 which is opened in regions constituting the trenches 311-1 to 311-3 of the MIM capacitive element 211 is formed. In step S227, etching is carried out to form the trenches 311-1 to 311-3.

In step S228, the barrier metal 233, the lower electrode 235, the insulation film 237, and the upper electrode 239 are formed to form the MIM capacitive element 211.

The MIM capacitive element 211 depicted in FIGS. 46 and 47 is formed by the foregoing steps.

While not depicted in the figure, the metal pad 361 may be provided as a component constituting the lower layer wire 221.

<First Example of Thirteenth Embodiment>

Figure 49:
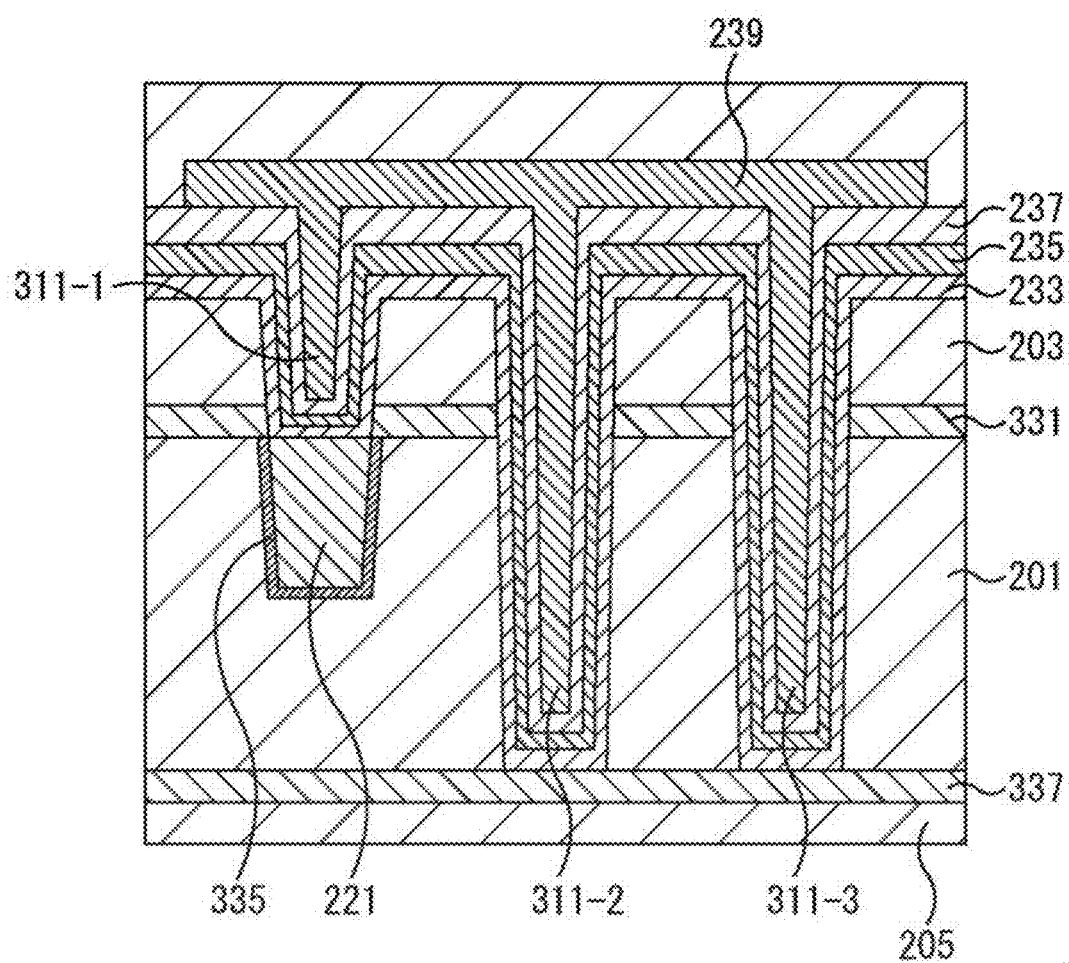
FIG. 49 is a diagram depicting a cross-sectional configuration example of an MIM capacitive element according to a first example of a thirteenth embodiment.

FIG. 49 is a diagram depicting a planar configuration example of an MIM capacitive element included in the pixel 2 according to a first example of a thirteenth embodiment. The MIM capacitive element 211 according to the first example of the thirteenth embodiment can be implemented by combining the first embodiment to the twelfth embodiment.

According to comparison between the MIM capacitive element 211 depicted in FIG. 49 and the MIM capacitive element 211 depicted in FIG. 47, the MIM capacitive element 211 depicted in FIG. 49 is similar to the MIM capacitive element 211 depicted in FIG. 47 in a point that the trench 311-1 of the MIM capacitive element 211 is connected to the lower layer wire 221, and a point that each of the trenches 311-2 and 311-3 is not connected to the lower layer wire 221, but is different in a point that the trenches 311-2 and 311-3 are extended to the wiring layer 201.

While the trench 311-1 of the MIM capacitive element 211 depicted in FIG. 49 is extended up to the wiring layer 203, each of the trenches 311-2 and 311-3 penetrates the wiring layer 203, and reaches the wiring layer 201 laminated on the wiring layer 203. Accordingly, each of the trenches 311-2 and 311-3 is larger than the trench 311-1.

As described above, each of the trenches 311 included in the MIM capacitive element 211 and not connected to the lower layer wire 221 is allowed to penetrate the wiring layer containing the lower layer wire 221 and extend up to a deep position. This configuration, i.e., the configuration including the large trenches 311 of the MIM capacitive element 211 allows the MIM capacitive element 211 to have a three-dimensional structure having larger capacitance, and therefore increases capacitance of the MIM capacitive element 211.

Manufacture of the MIM capacitive element 211 depicted in FIG. 49 will be described with reference to FIG. 50. In step S241, a substrate constituting the wiring layer 201 is prepared, and a resist 561 is formed on the wiring layer 201. The resist 561 has a pattern opened in a region which is to be filled with Cu to constitute the lower layer wire 221. Etching is carried out in this state to form a trench 562 constituting the lower layer wire 221. In step S242, the resist 561 is removed to form the wiring layer 201 including the trench 562.

In step S243, the barrier metal 335 is formed on a side wall and a bottom surface inside the trench 562, and the trench 562 is filled with Cu to form the lower layer wire 221. After the lower layer wire 221 is formed, the insulation film 331 is formed on the lower layer wire 221. The wiring layer 203 is further formed on the insulation film 331.

In step S244, a resist 563 which has a pattern opened in regions constituting the trenches 311-1 to 311-3 of the MIM capacitive element 211 is formed. In step S245, etching is carried out to form the trenches 311-1 to 311-3. The trenches 311-2 and 311-3 included in the trenches 311-1 to 311-3 formed in step S245 are extended up to substantially the same depth which is a position deeper than a position of the trench 311-1.

Figure 19:
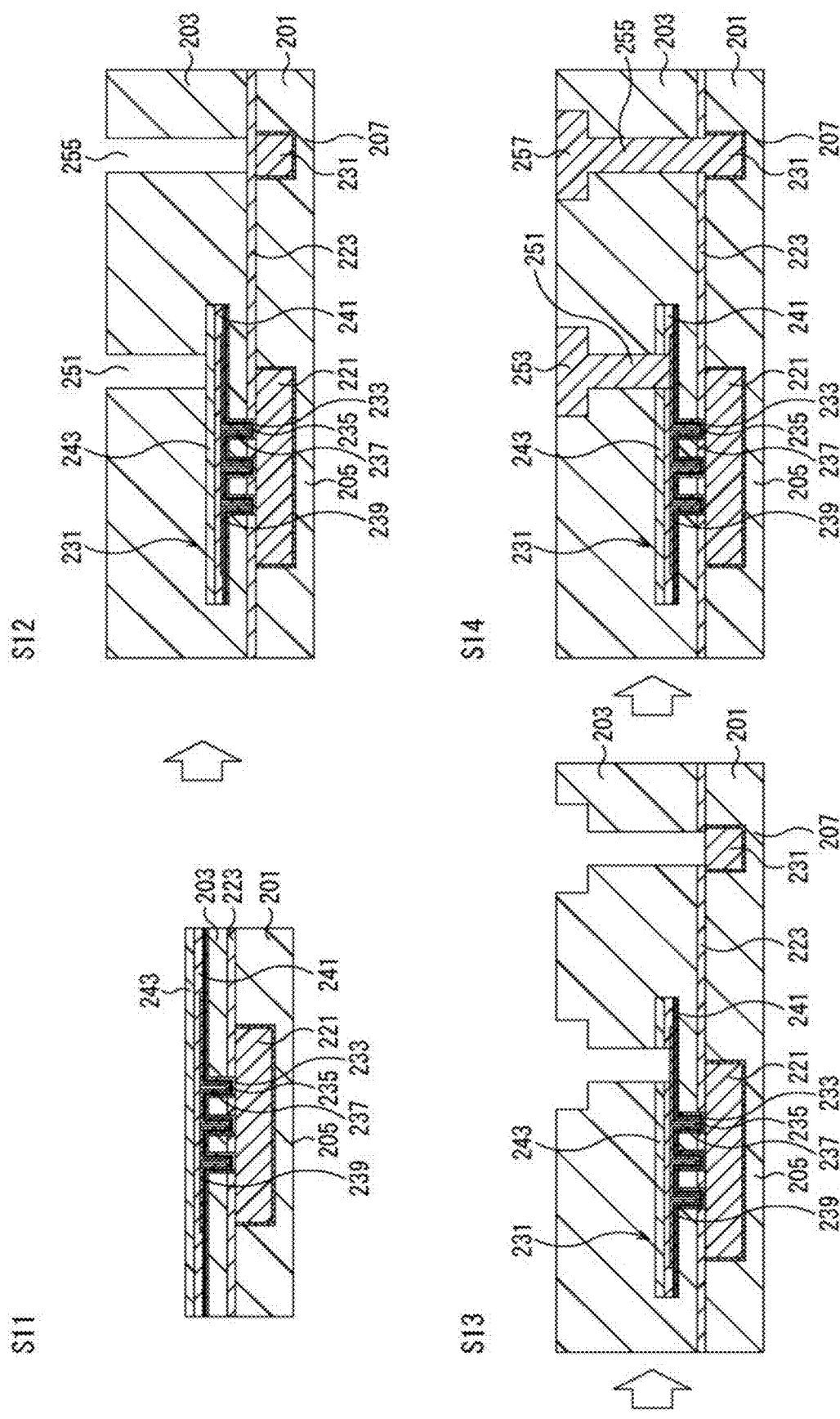
FIG. 19 is a diagram for explaining manufacture of the MIM capacitive element.

In a case where the trenches 311 having different depths as described above are formed by the same step, the fifth embodiment described with reference to FIGS. 18 and 19 is applicable.

In step S246, the barrier metal 233, the lower electrode 235, the insulation film 237, and the upper electrode 239 are formed to form the MIM capacitive element 211.

The MIM capacitive element 211 depicted in FIG. 49 is formed by the foregoing steps.

<Second Example of Thirteenth Embodiment>

Figure 51:
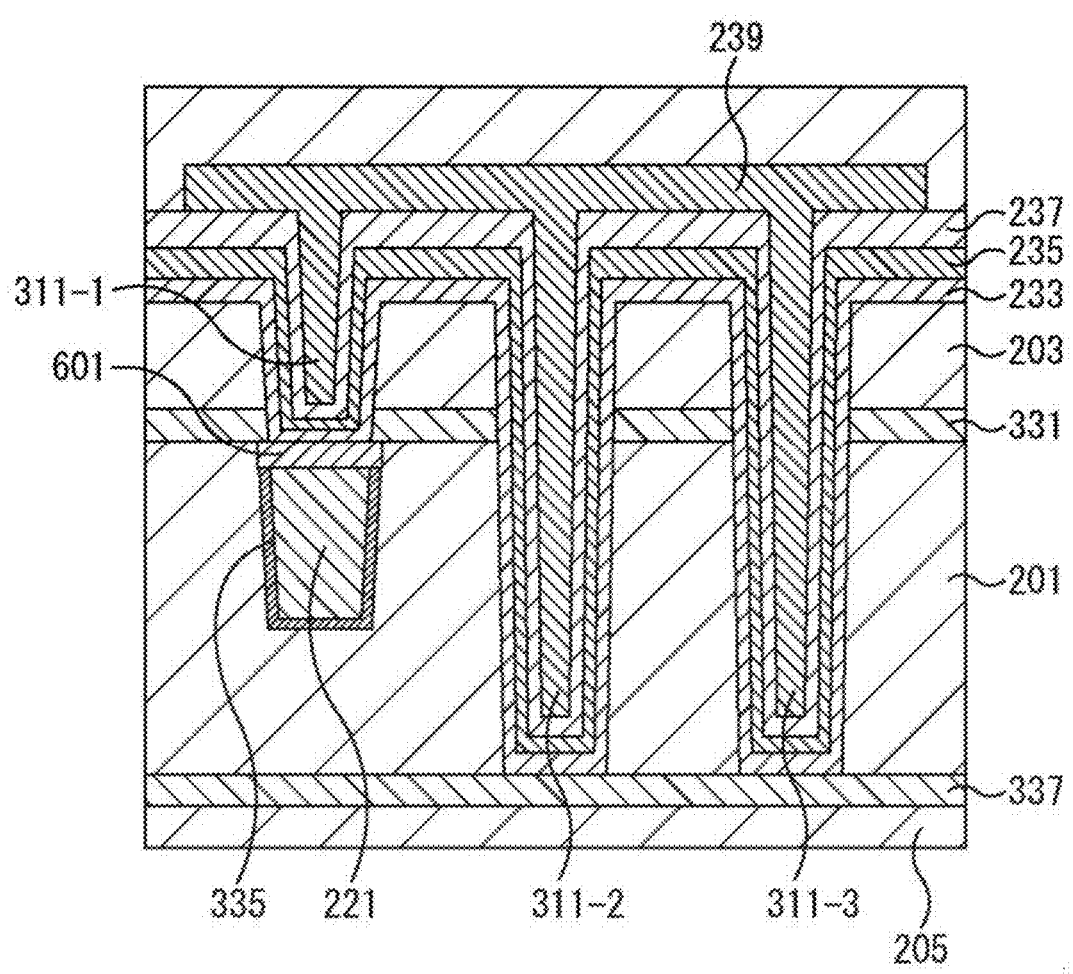
FIG. 51 is a diagram depicting a cross-sectional configuration example of an MIM capacitive element according to a second example of the thirteenth embodiment.

FIG. 51 is a diagram depicting a planar configuration example of an MIM capacitive element included in the pixel 2 according to a second example of the thirteenth embodiment. The MIM capacitive element 211 according to the second example of the thirteenth embodiment can be implemented by combining the first embodiment to the twelfth embodiment.

The MIM capacitive element 211 of the second example of the thirteenth embodiment depicted in FIG. 51 is similar to the MIM capacitive element 211 of the first example of the thirteenth embodiment depicted in FIG. 49 except for a point that a metal cap 601 is provided between the trench 311-1 of the MIM capacitive element 211 and the lower layer wire 221.

Figure 50:
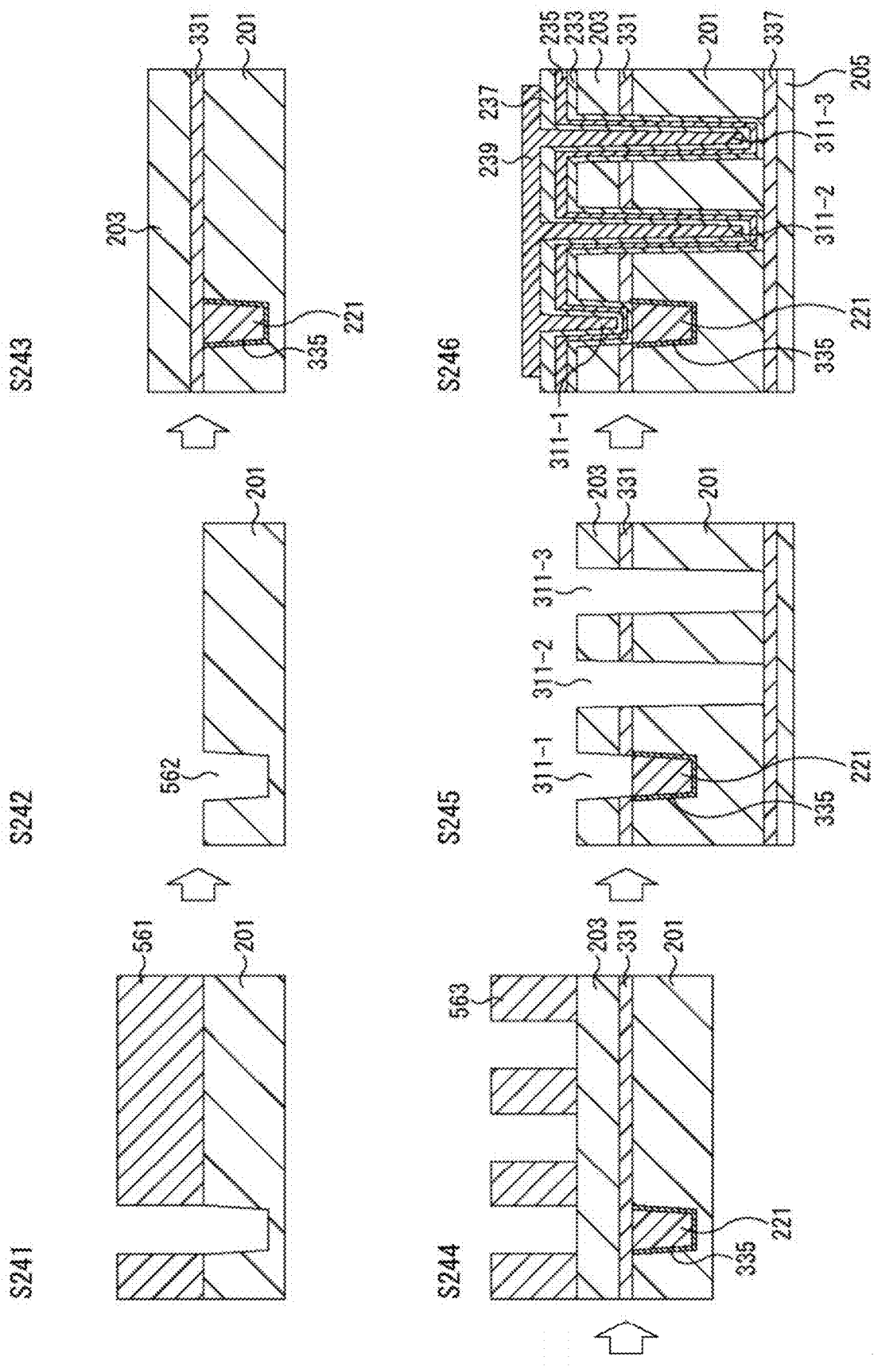
FIG. 50 is a diagram for explaining manufacture of the MIM capacitive element.

As described in steps S244 and S245 in FIG. 50, the metal cap 601 may be formed beforehand on the lower layer wire 221 to use the metal cap 601 as an etching stop film at the time of formation of the trenches 311 having different depths. Etching in excess of a depth position of the metal cap 601 is prevented in a portion where the metal cap 601 is formed.

Even in a case where etching continues up to positions desired to etch to form the trenches 311-2 and 311-3, etching of the trench 311-1 is so controllable as to stop at the position of the metal cap 601. In such a manner, the trenches 311-1 to 311-3 are allowed to be formed by the same step.

<Third Example of Thirteenth Embodiment>

Figure 52:
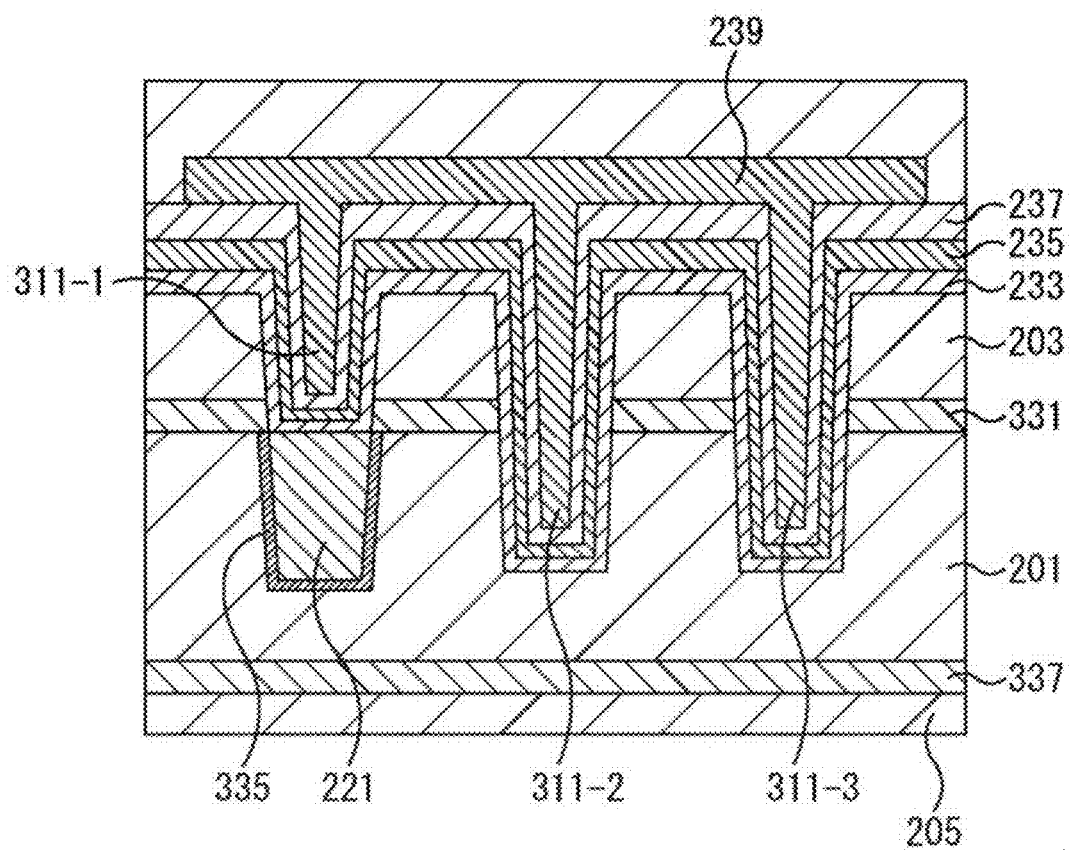
FIG. 52 is a diagram depicting a cross-sectional configuration example of an MIM capacitive element according to a third example of the thirteenth embodiment.

FIG. 52 is a diagram depicting a planar configuration example of an MIM capacitive element included in the pixel 2 according to a third example of the thirteenth embodiment. The MIM capacitive element 211 according to the third example of the thirteenth embodiment can be implemented by combining the first embodiment to the twelfth embodiment.

The MIM capacitive element 211 of the third example of the thirteenth embodiment depicted in FIG. 52 is similar to the MIM capacitive element 211 of the first example of the thirteenth embodiment depicted in FIG. 49 except for a point that the trenches 311-2 and 311-3 of the MIM capacitive element 211 are extended to intermediate positions of the wiring layer 201.

The capacitance of the MIM capacitive element 211 can be adjusted by adjusting the depths of the trenches 311-2 and 311-3. The depth of the trench 311 not connected to the lower layer wire 221 is adjustable so as to produce desired capacitance of the MIM capacitive element 211. This adjustment is achievable by increasing the depth to increase capacitance, and decreasing the depth to decrease capacitance.

<Fourth Example of Thirteenth Embodiment>

Figure 53:
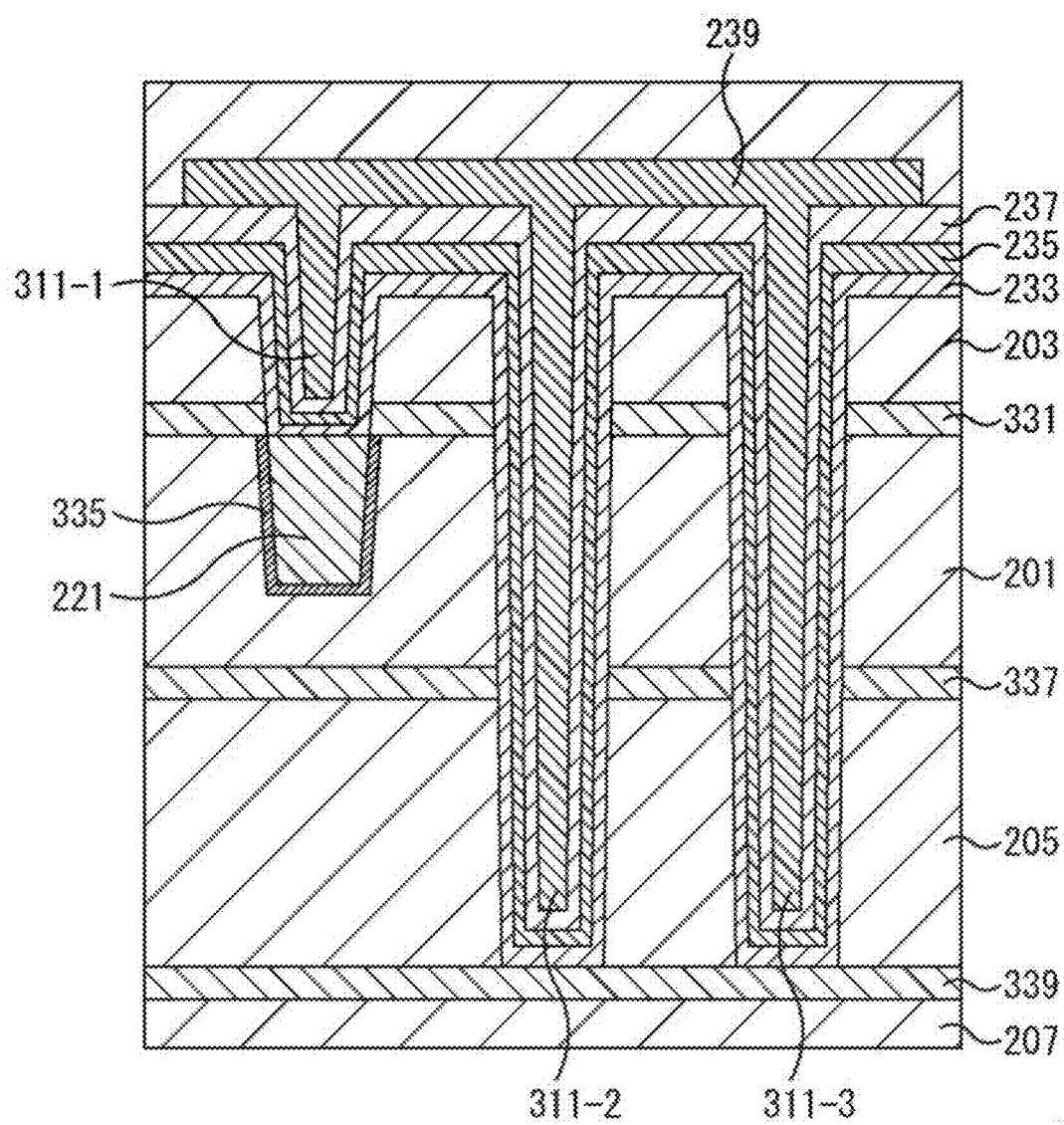
FIG. 53 is a diagram depicting a cross-sectional configuration example of an MIM capacitive element according to a fourth example of the thirteenth embodiment.

FIG. 53 is a diagram depicting a planar configuration example of an MIM capacitive element included in the pixel 2 according to a fourth example of the thirteenth embodiment. The MIM capacitive element 211 according to the fourth example of the thirteenth embodiment can be implemented by combining the first embodiment to the twelfth embodiment.

The MIM capacitive element 211 of the fourth example of the thirteenth embodiment depicted in FIG. 53 is similar to the MIM capacitive element 211 of the first example of the thirteenth embodiment depicted in FIG. 49 except for a point that the trenches 311-2 and 311-3 of the MIM capacitive element 211 are extended to a depth penetrating the wiring layer 201, and further penetrating the wiring layer 205.

As described above, the capacitance of the MIM capacitive element 211 can be adjusted by adjusting the depths of the trenches 311-2 and 311-3. The depth of the trench 311 not connected to the lower layer wire 221 is adjustable so as to produce desired capacitance of the MIM capacitive element 211. The capacitance is allowed to increase as the depth increases. The trench 311 may be configured to penetrate multiple wiring layers. The capacitance of the MIM capacitive element 211 is allowed to increase as the trench 311 reaches a deep position, i.e., as the trench 311 is made longer.

While not depicted in FIG. 53, a wire may be formed in a region included in the wiring layer 205 and not having the trenches 311, i.e., a region on the lower side of the region including the lower layer wire 221 in the figure. In this case, a wire is allowed to be disposed in a region where the trenches 311 are not formed within the wiring layer. Accordingly, the degree of freedom of the wiring layout improves.

According to the examples of the thirteenth embodiment described with reference to FIGS. 49 and 53, both the trenches 311-2 and 311-3 are extended to the same depth. However, the trenches 311-2 and 311-3 may have different depths.

<Application Example to Electronic Apparatus>

Application of the present technology is not limited to application to an imaging device. Specifically, the present technology is applicable to electronic apparatuses in general, which are of a type including an imaging device as an image capturing unit (photoelectric conversion unit), such as an imaging apparatus including a digital still camera and a video camera, a portable terminal device having an imaging function, and a copy machine including an imaging device as an image reading unit. The imaging device may have either a form of one-chip, or a module-shaped form having an imaging function and produced by collectively packaging an imaging unit and either a signal processing unit or an optical system.

Figure 54:
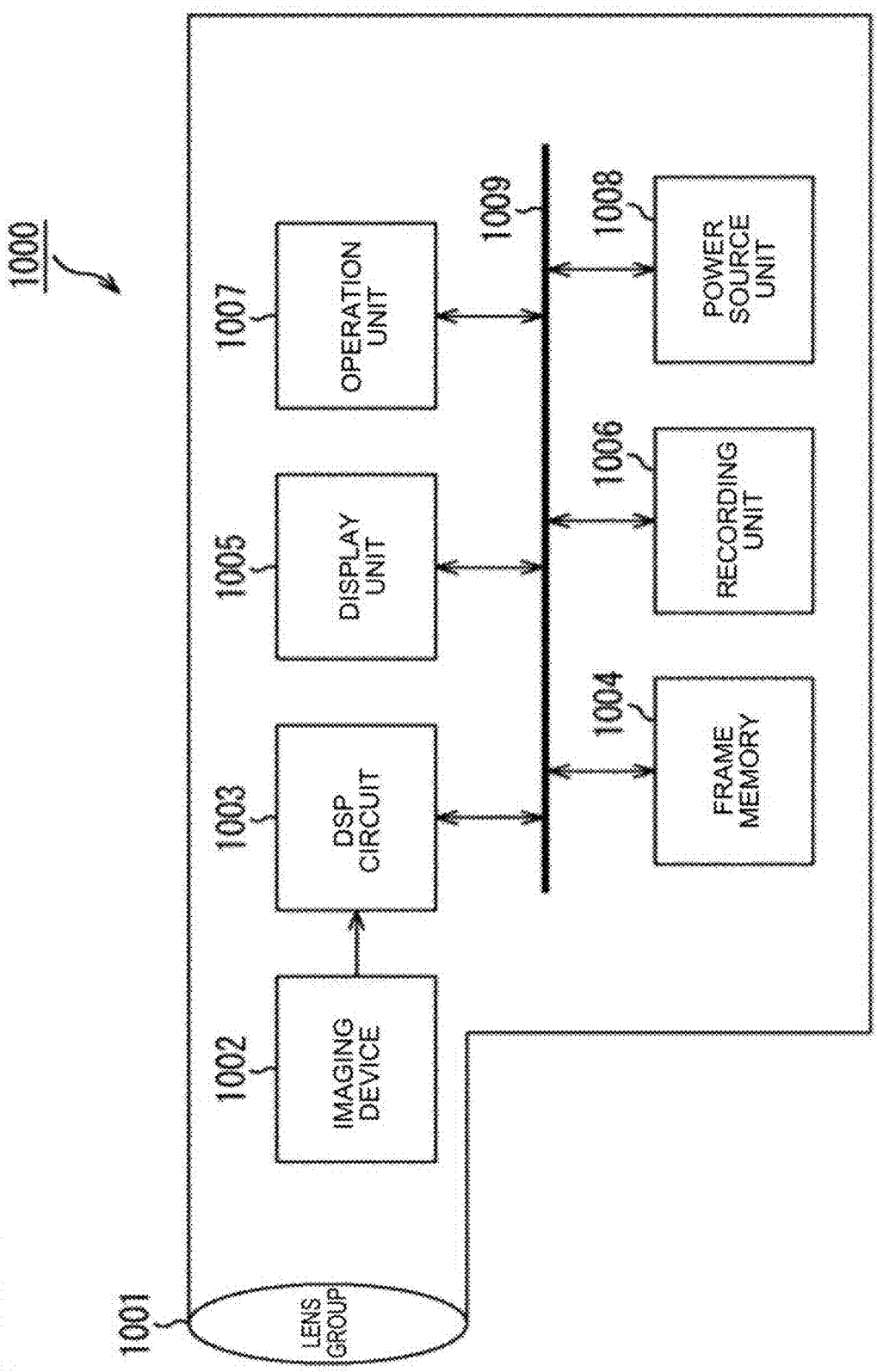
FIG. 54 is a diagram depicting an example of an electronic apparatus.

FIG. 54 is a block diagram depicting a configuration example of an imaging apparatus functioning as an electronic apparatus to which the present technology is applied.

An imaging device 1000 depicted in FIG. 54 includes an optical unit 1001 including a lens group and the like, an imaging device (image pickup device) 1002 adopting the configuration of the imaging apparatus 1 in FIG. 1, and a DSP (Digital Signal Processor) circuit 1003 which is a camera signal processing circuit. In addition, an imaging device 1000 further includes a frame memory 1004, a display unit 1005, a recording unit 1006, an operation unit 1007, and a power source unit 1008. The DSP circuit 1003, the frame memory 1004, the display unit 1005, the recording unit 1006, the operation unit 1007, and the power source unit 1008 are connected to one another via a bus line 1009.

The optical unit 1001 captures incident light (image light) coming from a subject, and forms an image of the incident light on an imaging surface of the imaging device 1002. After the optical unit 1001 forms the image of the incident light on the imaging surface, the imaging device 1002 converts a quantity of the incident light into an electric signal for each pixel, and outputs the electric signal as a pixel signal. The imaging apparatus 1 depicted in FIG. 1 is applicable to the imaging device 1002.

For example, the display unit 1005 includes a thin display such as an LCD (Liquid Crystal Display) and an organic EL (Electro Luminescence) display, and displays a moving image or a still image captured by the imaging device 1002. The recording unit 1006 records the moving image or the still image captured by the imaging device 1002 in a recording medium such as a hard disk and a semiconductor memory.

The operation unit 1007 issues operation commands associated with various functions of the imaging device 1000 under an operation performed by a user. The power source unit 1008 appropriately supplies various types of power sources corresponding to operation power sources of the DSP circuit 1003, the frame memory 1004, the display unit 1005, the recording unit 1006, and the operation unit 1007 to these supply targets.

<Application Example to Endoscopic Surgery System>

The technology according to the present disclosure (present technology) is applicable to various products. For example, the technology according to the present disclosure may be applied to an endoscopic surgery system.

Figure 55:
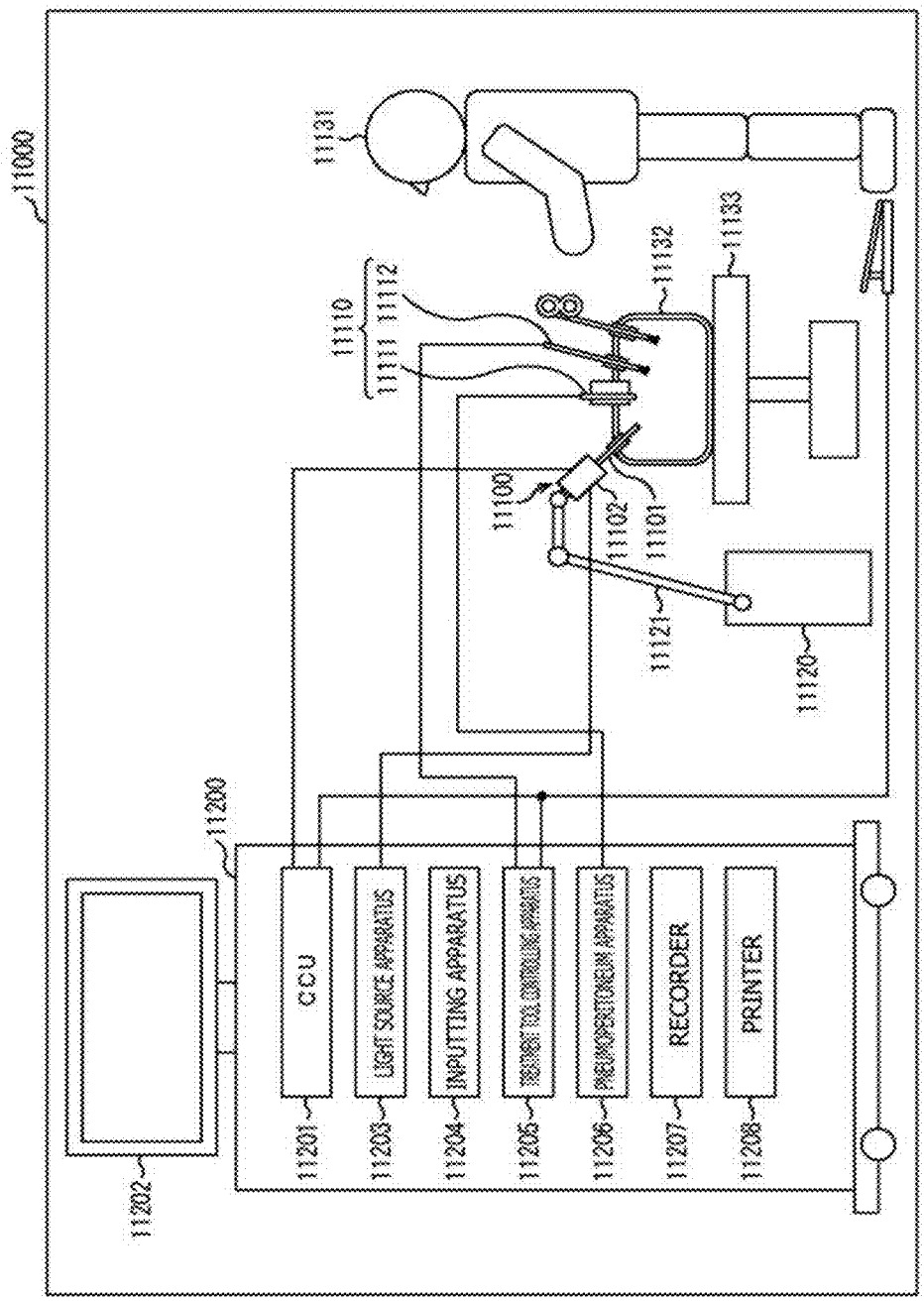
FIG. 55 is a view depicting an example of a schematic configuration of an endoscopic surgery system.

FIG. 55 is a view depicting an example of a schematic configuration of an endoscopic surgery system to which the technology according to an embodiment of the present disclosure (present technology) can be applied.

In FIG. 55, a state is illustrated in which a surgeon (medical doctor) 11131 is using an endoscopic surgery system 11000 to perform surgery for a patient 11132 on a patient bed 11133. As depicted, the endoscopic surgery system 11000 includes an endoscope 11100, other surgical tools 11110 such as a pneumoperitoneum tube 11111 and an energy device 11112, a supporting arm apparatus 11120 which supports the endoscope 11100 thereon, and a cart 11200 on which various apparatus for endoscopic surgery are mounted.

The endoscope 11100 includes a lens barrel 11101 having a region of a predetermined length from a distal end thereof to be inserted into a body cavity of the patient 11132, and a camera head 11102 connected to a proximal end of the lens barrel 11101. In the example depicted, the endoscope 11100 is depicted which includes as a rigid endoscope having the lens barrel 11101 of the hard type. However, the endoscope 11100 may otherwise be included as a flexible endoscope having the lens barrel 11101 of the flexible type.

The lens barrel 11101 has, at a distal end thereof, an opening in which an objective lens is fitted. A light source apparatus 11203 is connected to the endoscope 11100 such that light generated by the light source apparatus 11203 is introduced to a distal end of the lens barrel 11101 by a light guide extending in the inside of the lens barrel 11101 and is irradiated toward an observation target in a body cavity of the patient 11132 through the objective lens. It is to be noted that the endoscope 11100 may be a forward-viewing endoscope or may be an oblique-viewing endoscope or a side-viewing endoscope.

An optical system and an image pickup element are provided in the inside of the camera head 11102 such that reflected light (observation light) from the observation target is condensed on the image pickup element by the optical system. The observation light is photo-electrically converted by the image pickup element to generate an electric signal corresponding to the observation light, namely, an image signal corresponding to an observation image. The image signal is transmitted as RAW data to a CCU 11201.

The CCU 11201 includes a central processing unit (CPU), a graphics processing unit (GPU) or the like and integrally controls operation of the endoscope 11100 and a display apparatus 11202. Further, the CCU 11201 receives an image signal from the camera head 11102 and performs, for the image signal, various image processes for displaying an image based on the image signal such as, for example, a development process (demosaic process).

The display apparatus 11202 displays thereon an image based on an image signal, for which the image processes have been performed by the CCU 11201, under the control of the CCU 11201.

The light source apparatus 11203 includes a light source such as, for example, a light emitting diode (LED) and supplies irradiation light upon imaging of a surgical region to the endoscope 11100.

An inputting apparatus 11204 is an input interface for the endoscopic surgery system 11000. A user can perform inputting of various kinds of information or instruction inputting to the endoscopic surgery system 11000 through the inputting apparatus 11204. For example, the user would input an instruction or a like to change an image pickup condition (type of irradiation light, magnification, focal distance or the like) by the endoscope 11100.

A treatment tool controlling apparatus 11205 controls driving of the energy device 11112 for cautery or incision of a tissue, sealing of a blood vessel or the like. A pneumoperitoneum apparatus 11206 feeds gas into a body cavity of the patient 11132 through the pneumoperitoneum tube 11111 to inflate the body cavity in order to secure the field of view of the endoscope 11100 and secure the working space for the surgeon. A recorder 11207 is an apparatus capable of recording various kinds of information relating to surgery. A printer 11208 is an apparatus capable of printing various kinds of information relating to surgery in various forms such as a text, an image or a graph.

It is to be noted that the light source apparatus 11203 which supplies irradiation light when a surgical region is to be imaged to the endoscope 11100 may include a white light source which includes, for example, an LED, a laser light source or a combination of them. Where a white light source includes a combination of red, green, and blue (RGB) laser light sources, since the output intensity and the output timing can be controlled with a high degree of accuracy for each color (each wavelength), adjustment of the white balance of a picked up image can be performed by the light source apparatus 11203. Further, in this case, if laser beams from the respective RGB laser light sources are irradiated time-divisionally on an observation target and driving of the image pickup elements of the camera head 11102 are controlled in synchronism with the irradiation timings. Then images individually corresponding to the R, G and B colors can be also picked up time-divisionally. According to this method, a color image can be obtained even if color filters are not provided for the image pickup element.

Further, the light source apparatus 11203 may be controlled such that the intensity of light to be outputted is changed for each predetermined time. By controlling driving of the image pickup element of the camera head 11102 in synchronism with the timing of the change of the intensity of light to acquire images time-divisionally and synthesizing the images, an image of a high dynamic range free from underexposed blocked up shadows and overexposed highlights can be created.

Further, the light source apparatus 11203 may be configured to supply light of a predetermined wavelength band ready for special light observation. In special light observation, for example, by utilizing the wavelength dependency of absorption of light in a body tissue to irradiate light of a narrow band in comparison with irradiation light upon ordinary observation (namely, white light), narrow band observation (narrow band imaging) of imaging a predetermined tissue such as a blood vessel of a superficial portion of the mucous membrane or the like in a high contrast is performed. Alternatively, in special light observation, fluorescent observation for obtaining an image from fluorescent light generated by irradiation of excitation light may be performed. In fluorescent observation, it is possible to perform observation of fluorescent light from a body tissue by irradiating excitation light on the body tissue (autofluorescence observation) or to obtain a fluorescent light image by locally injecting a reagent such as indocyanine green (ICG) into a body tissue and irradiating excitation light corresponding to a fluorescent light wavelength of the reagent upon the body tissue. The light source apparatus 11203 can be configured to supply such narrow-band light and/or excitation light suitable for special light observation as described above.

Figure 56:
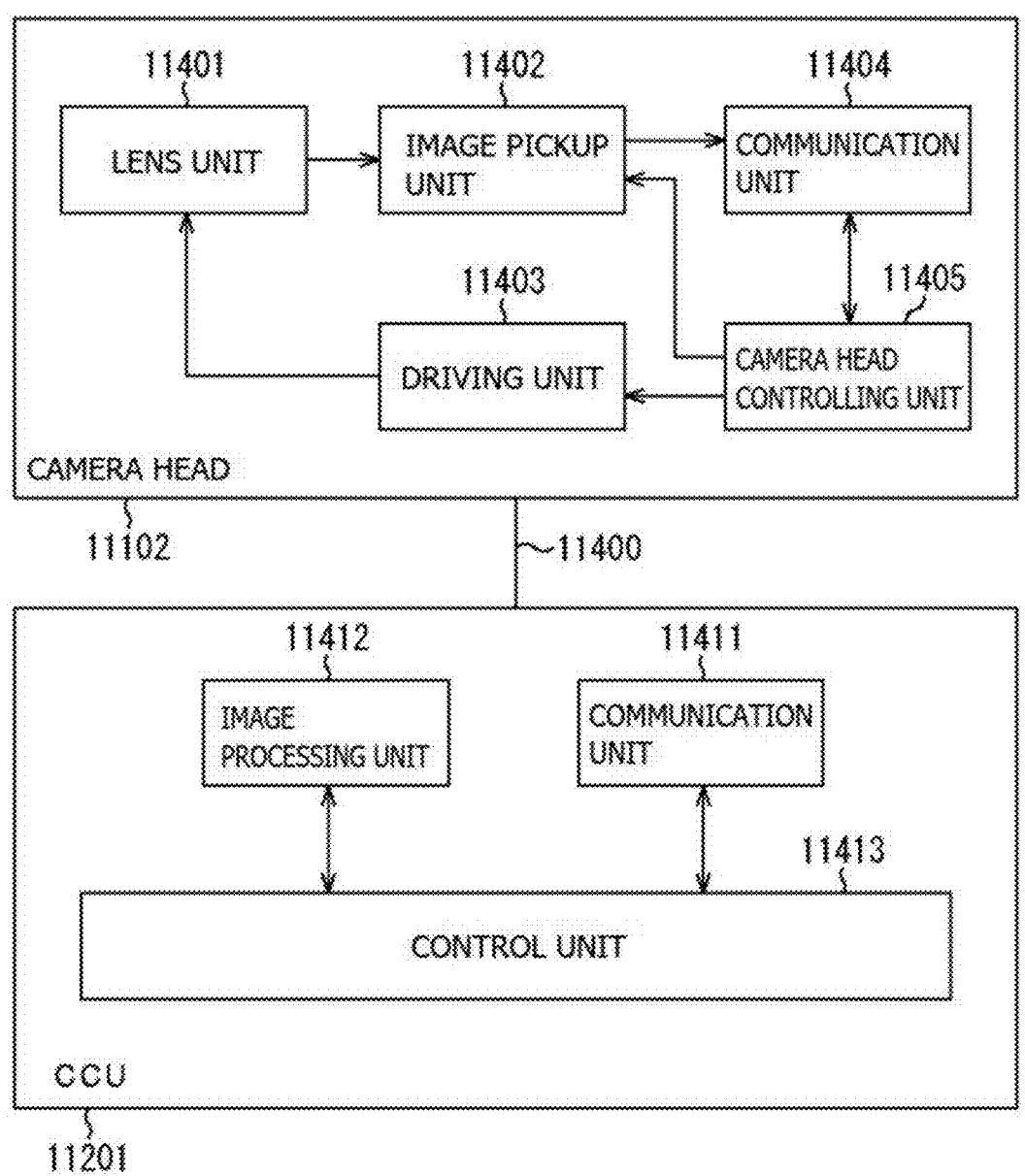
FIG. 56 is a block diagram depicting an example of a functional configuration of a camera head and a camera control unit (CCU).

FIG. 56 is a block diagram depicting an example of a functional configuration of the camera head 11102 and the CCU 11201 depicted in FIG. 55.

The camera head 11102 includes a lens unit 11401, an image pickup unit 11402, a driving unit 11403, a communication unit 11404 and a camera head controlling unit 11405. The CCU 11201 includes a communication unit 11411, an image processing unit 11412 and a control unit 11413. The camera head 11102 and the CCU 11201 are connected for communication to each other by a transmission cable 11400.

The lens unit 11401 is an optical system, provided at a connecting location to the lens barrel 11101. Observation light taken in from a distal end of the lens barrel 11101 is guided to the camera head 11102 and introduced into the lens unit 11401. The lens unit 11401 includes a combination of a plurality of lenses including a zoom lens and a focusing lens.

The number of image pickup elements which is included by the image pickup unit 11402 may be one (single-plate type) or a plural number (multi-plate type). Where the image pickup unit 11402 is configured as that of the multi-plate type, for example, image signals corresponding to respective R, G and B are generated by the image pickup elements, and the image signals may be synthesized to obtain a color image. The image pickup unit 11402 may also be configured so as to have a pair of image pickup elements for acquiring respective image signals for the right eye and the left eye ready for three dimensional (3D) display. If 3D display is performed, then the depth of a living body tissue in a surgical region can be comprehended more accurately by the surgeon 11131. It is to be noted that, where the image pickup unit 11402 is configured as that of stereoscopic type, a plurality of systems of lens units 11401 are provided corresponding to the individual image pickup elements.

Further, the image pickup unit 11402 may not necessarily be provided on the camera head 11102. For example, the image pickup unit 11402 may be provided immediately behind the objective lens in the inside of the lens barrel 11101.

The driving unit 11403 includes an actuator and moves the zoom lens and the focusing lens of the lens unit 11401 by a predetermined distance along an optical axis under the control of the camera head controlling unit 11405. Consequently, the magnification and the focal point of a picked up image by the image pickup unit 11402 can be adjusted suitably.

The communication unit 11404 includes a communication apparatus for transmitting and receiving various kinds of information to and from the CCU 11201. The communication unit 11404 transmits an image signal acquired from the image pickup unit 11402 as RAW data to the CCU 11201 through the transmission cable 11400.

In addition, the communication unit 11404 receives a control signal for controlling driving of the camera head 11102 from the CCU 11201 and supplies the control signal to the camera head controlling unit 11405. The control signal includes information relating to image pickup conditions such as, for example, information that a frame rate of a picked up image is designated, information that an exposure value upon image picking up is designated and/or information that a magnification and a focal point of a picked up image are designated.

It is to be noted that the image pickup conditions such as the frame rate, exposure value, magnification or focal point may be designated by the user or may be set automatically by the control unit 11413 of the CCU 11201 on the basis of an acquired image signal. In the latter case, an auto exposure (AE) function, an auto focus (AF) function and an auto white balance (AWB) function are incorporated in the endoscope 11100.

The camera head controlling unit 11405 controls driving of the camera head 11102 on the basis of a control signal from the CCU 11201 received through the communication unit 11404.

The communication unit 11411 includes a communication apparatus for transmitting and receiving various kinds of information to and from the camera head 11102. The communication unit 11411 receives an image signal transmitted thereto from the camera head 11102 through the transmission cable 11400.

Further, the communication unit 11411 transmits a control signal for controlling driving of the camera head 11102 to the camera head 11102. The image signal and the control signal can be transmitted by electrical communication, optical communication or the like.

The image processing unit 11412 performs various image processes for an image signal in the form of RAW data transmitted thereto from the camera head 11102.

The control unit 11413 performs various kinds of control relating to image picking up of a surgical region or the like by the endoscope 11100 and display of a picked up image obtained by image picking up of the surgical region or the like. For example, the control unit 11413 creates a control signal for controlling driving of the camera head 11102.

Further, the control unit 11413 controls, on the basis of an image signal for which image processes have been performed by the image processing unit 11412, the display apparatus 11202 to display a picked up image in which the surgical region or the like is imaged. Thereupon, the control unit 11413 may recognize various objects in the picked up image using various image recognition technologies. For example, the control unit 11413 can recognize a surgical tool such as forceps, a particular living body region, bleeding, mist when the energy device 11112 is used and so forth by detecting the shape, color and so forth of edges of objects included in a picked up image. The control unit 11413 may cause, when it controls the display apparatus 11202 to display a picked up image, various kinds of surgery supporting information to be displayed in an overlapping manner with an image of the surgical region using a result of the recognition. Where surgery supporting information is displayed in an overlapping manner and presented to the surgeon 11131, the burden on the surgeon 11131 can be reduced and the surgeon 11131 can proceed with the surgery with certainty.

The transmission cable 11400 which connects the camera head 11102 and the CCU 11201 to each other is an electric signal cable ready for communication of an electric signal, an optical fiber ready for optical communication or a composite cable ready for both of electrical and optical communications.

Here, while, in the example depicted, communication is performed by wired communication using the transmission cable 11400, the communication between the camera head 11102 and the CCU 11201 may be performed by wireless communication.

According to the present description, a system refers to an entire apparatus including multiple devices.

Note that advantageous effects to be offered are not limited to those described in the present description only by way of example. Other advantageous effects may be further produced.

In addition, embodiments according to the present technology are not limited to the embodiments described above, but may be modified in various manners without departing from the subject matters of the present technology.

The present technology can also be implemented in such following configurations.

(1)
An imaging device including:
a photoelectric conversion unit that converts light into charge;
multiple storage portions that temporarily store charge;
multiple transfer units that transfer charge to the storage portions; and
a penetration trench that separates pixels, in which
at least one of the multiple storage portions is a capacitive element, and
at least one of the multiple storage portions stores charge overflowing from the photoelectric conversion unit.

(2)
The imaging device according to (1) above, in which
the capacitive element is an MIM (Metal-Insulator-Metal) capacitive element.

(3)
The imaging device according to (1) or (2) above, further including:
a solid-phase diffusion layer provided up to an intermediate position of the penetration trench.

(4)
The imaging device according to any one of (1) to (3) above, further including:
a fixed charge film provided up to an intermediate position of the penetration trench.

(5)
The imaging device according to any one of (1) to (4) above, further including:
a light shielding wall provided up to an intermediate position of the penetration trench.

(6)
The imaging device according to any one of (1) to (5) above, in which
each of the transfer units that transfer charge from the photoelectric conversion unit to the storage portions is a vertical transistor.

(7)
The imaging device according to any one of (1) to (6) above, in which
a contact of each of the storage portions is an advanced contact.

(8)
The imaging device according to any one of (1) to (7) above, in which
the multiple storage portions are connected in series, and store charge transferred from the photoelectric conversion unit and charge overflowing from the photoelectric conversion unit.

(9)
The imaging device according to any one of (1) to (7) above, in which
at least one of the multiple storage portions stores charge overflowing from the photoelectric conversion unit, and
a different one of the storage portions stores charge transferred from the photoelectric conversion unit.

(10)
The imaging device according to any one of (1) to (9) above, in which
the three storage portions are provided, and read charge from the photoelectric conversion unit to achieve each of high conversion efficiency, middle conversion efficiency, and low conversion efficiency.

(11)
The imaging device according to any one of (2) to (10) above, further including:
a first via connected to a first electrode of the MIM capacitive element; and
a second via connected to a second electrode different from the first electrode, in which
a depth of the first via from a predetermined plane is different from a depth of the second via from the predetermined plane, and
a thickness of a first film laminated on the first electrode is different from a thickness of a second film laminated on the second electrode.

(12)
The imaging device according to (11) above, in which the first film has a configuration formed by laminating a third film including a material identical to a material of the second film, and a fourth film including a material different from the material of the second film.

(13)
The imaging device according to (12) above, in which the fourth film is an etching stopper film.

(14)
The imaging device according to (12) above, in which the fourth film is a metallic film including a metallic material.

(15)
The imaging device according to (14) above, in which the metallic film is a film including a metallic oxide or a metallic nitride each containing a material having lower bond energy with fluorine-based gas than a material of the first electrode.

(16)
The imaging device according to (14) or (15) above, in which the metallic film is a film that contains a material having a vapor pressure higher than a vapor pressure of fluoride produced by bonding of a material contained in the first electrode and fluorine-based gas.

(17)
The imaging device according to any one of (14) to (16) above, further including:
an etching stopper film on the fourth film.

(18)
An electronic apparatus including:
an imaging device including
a photoelectric conversion unit that converts light into charge,
multiple storage portions that temporarily store charge,
multiple transfer units that transfer charge to the storage portions, and
a penetration trench that separates pixels,
at least one of the multiple storage portions being a capacitive element, and
at least one of the multiple storage portions storing charge overflowing from the photoelectric conversion unit; and
a processing unit that processes a signal received from the imaging device.

REFERENCE SIGNS LIST

1: Imaging apparatus
2: Pixel
3: Pixel array unit
4: Vertical driving circuit
5: Column signal processing circuit
6: Horizontal driving circuit
7: Output circuit
8: Control circuit
9: Vertical signal line
10: Pixel drive line
11: Horizontal signal line
13: Input/output terminal
31: Selection transistor
51: Photoelectric conversion unit
52: First transfer transistor
53: First FD portion
54: Second transfer transistor
55: Second FD portion
56: Third transfer transistor
57: Third FD portion
58: MIM capacitive element
59: Reset transistor
60: Amplification transistor
61: Selection transistor
72: VSS region
100: Semiconductor substrate
101: Micro-lens
103: Flattening film
104: Light shielding film
105: N-type semiconductor region
106: P-type semiconductor region
107: P-type semiconductor region
108: Fixed charge film
109: Pixel separation portion
120: Wiring layer
121: Local wire
122: Wire
123: Insulation layer
124: Via
131: Light shielding wall
151: Photoelectric conversion unit
152: First transfer transistor
153: First FD portion
154: Second transfer transistor
155: Second FD portion
156: Third transfer transistor
157: Third FD portion
158: MIM capacitive element
159: Reset transistor
160: Amplification transistor
161: Selection transistor
162: Fourth transfer transistor
201, 203: Wiring layer
211: MIM capacitive element
221: Lower layer wire
223: Block film
231: Lower layer wire
233: Barrier metal
235: Lower electrode
237: Insulation film
239: Upper electrode
241: Block film
243: Etching stopper film
251: Via
253: Upper layer wire
255: Via
257: Upper layer wire
261: MIM capacitive element
271: Metallic film
281: MIM capacitive element
291: Etching stopper film
301: Residue
305: via hole

What is claimed is:
1. An imaging device, comprising:
a photoelectric conversion unit that converts light into charge;
multiple storage portions that temporarily store charge,
wherein a first one of the charge storage portions includes a first floating diffusion region,
wherein a second one of the charge storage portions includes a second floating diffusion, and
wherein a third one of the charge storage portions includes a capacitive element;

multiple transfer units that transfer charge to the storage portions,
  wherein a first one of the transfer units selectively transfers charge between the photoelectric conversion unit and the first floating diffusion region,
  wherein a second one of the transfer units selectively transfers charge between the first floating diffusion region and the second floating diffusion region,
  wherein a third one of the transfer units selectively transfers charge between the second floating diffusion region and the capacitive element; and
a penetration trench that separates adjacent pixels,
  wherein at least one of the multiple storage portions stores charge overflowing from the photoelectric conversion unit.

2. The imaging device according to claim 1, wherein the capacitive element is an MIM (Metal-Insulator-Metal) capacitive element.

3. The imaging device according to claim 1, further comprising:
a solid-phase diffusion layer provided up to an intermediate position of the penetration trench.

4. The imaging device according to claim 1, further comprising:
a fixed charge film provided up to an intermediate position of the penetration trench.

5. The imaging device according to claim 1, further comprising:
a light shielding wall provided up to an intermediate position of the penetration trench.

6. The imaging device according to claim 1, wherein each of the transfer units that transfer charge from the photoelectric conversion unit to the storage portions is a vertical transistor.

7. The imaging device according to claim 1, wherein a contact of each of the storage portions is an advanced contact.

8. The imaging device according to claim 1, wherein the multiple storage portions are connected in series, and store charge transferred from the photoelectric conversion unit and charge overflowing from the photoelectric conversion unit.

9. The imaging device according to claim 1, wherein at least one of the multiple storage portions stores charge overflowing from the photoelectric conversion unit, and
a different one of the storage portions stores charge transferred from the photoelectric conversion unit.

10. The imaging device according to claim 1, wherein the three storage portions are provided, and read charge from the photoelectric conversion unit to achieve each of high conversion efficiency, middle conversion efficiency, and low conversion efficiency.

11. The imaging device according to claim 2, further comprising:
a first via connected to a first electrode of the MIM capacitive element; and
a second via connected to a second electrode different from the first electrode, wherein a depth of the first via from a predetermined plane is different from a depth of the second via from the predetermined plane, and wherein a thickness of a first film laminated on the first electrode is different from a thickness of a second film laminated on the second electrode.

12. The imaging device according to claim 11, wherein the first film has a configuration formed by laminating a third film including a material identical to a material of the second film, and a fourth film including a material different from the material of the second film.

13. An imaging device, comprising:
a photoelectric conversion unit that converts light into charge;
multiple storage portions that temporarily store charge;
multiple transfer units that transfer charge to the storage portions; and
a penetration trench that separates pixels, wherein at least one of the multiple storage portions is a capacitive element, wherein the capacitive element is an MIM (Metal-Insulator-Metal) capacitive element, and wherein at least one of the multiple storage portions stores charge overflowing from the photoelectric conversion unit;
a first via connected to a first electrode of the MIM capacitive element; and
a second via connected to a second electrode different from the first electrode, wherein a depth of the first via from a predetermined plane is different from a depth of the second via from the predetermined plane, and wherein a thickness of a first film laminated on the first electrode is different from a thickness of a second film laminated on the second electrode.

14. The imaging device according to claim 13, wherein the first film has a configuration formed by laminating a third film including a material identical to a material of the second film, and a fourth film including a material different from the material of the second film.

15. The imaging device according to claim 14, wherein the fourth film is an etching stopper film.

16. The imaging device according to claim 14, wherein the fourth film is a metallic film including a metallic material.

17. The imaging device according to claim 16, wherein the metallic film is a film including a metallic oxide or a metallic nitride each containing a material having lower bond energy with fluorine-based gas than a material of the first electrode.

18. The imaging device according to claim 16, wherein the metallic film is a film that contains a material having a vapor pressure higher than a vapor pressure of fluoride produced by bonding of a material contained in the first electrode and fluorine-based gas.

19. The imaging device according to claim 16, further comprising:
an etching stopper film on the fourth film.

20. An electronic apparatus, comprising:
an imaging device, including:
  a photoelectric conversion unit that converts light into charge;
  multiple storage portions that temporarily store charge,
    wherein a first one of the charge storage portions includes a first floating diffusion region,
    wherein a second one of the charge storage portions includes a second floating diffusion, and
    wherein a third one of the charge storage portions includes a capacitive element;
  multiple transfer units that transfer charge to the storage portions,
    wherein a first one of the transfer units selectively transfers charge between the photoelectric conversion unit and the first floating diffusion region,
    wherein a second one of the transfer units selectively transfers charge between the first floating diffusion region and the second floating diffusion region, wherein a third one of the transfer units selectively transfers charge between the second floating diffusion region and the capacitive element; and a penetration trench that separates adjacent pixels, wherein at least one of the multiple storage portions storing charge overflowing from the photoelectric conversion unit; and a processing unit that processes a signal received from the imaging device.

* * * * *